US011182769B2

(12) United States Patent
Oh et al.

(10) Patent No.: US 11,182,769 B2
(45) Date of Patent: Nov. 23, 2021

(54) PAYMENT PROCESSING METHOD AND ELECTRONIC DEVICE SUPPORTING THE SAME

(71) Applicant: Samsung Electronics Co., Ltd., Suwon-si (KR)

(72) Inventors: Sae Ah Oh, Seoul (KR); Han Na Kim, Seongnam-si (KR); Mi Yeon Park, Seongnam-si (KR); Yong Man Park, Yongin-si (KR); You Bi Seo, Seoul (KR); Hwa Youn Suh, Seoul (KR); Byung In Yu, Seoul (KR); Byoung Tack Roh, Suwon-si (KR); Seok Hyun Yoon, Yongin-si (KR); Yo Han Lee, Seongnam-si (KR); Seong Min Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 648 days.

(21) Appl. No.: 15/042,671

(22) Filed: Feb. 12, 2016

(65) Prior Publication Data

US 2016/0247144 A1  Aug. 25, 2016

Related U.S. Application Data

(60) Provisional application No. 62/126,121, filed on Feb. 27, 2015.

(30) Foreign Application Priority Data

Feb. 12, 2015 (KR) .................. 10-2015-0021808
Dec. 15, 2015 (KR) .................. 10-2015-0179430

(51) Int. Cl.
*G06Q 20/32* (2012.01)
*G06Q 20/40* (2012.01)
(Continued)

(52) U.S. Cl.
CPC ....... *G06Q 20/3278* (2013.01); *G06K 7/0004* (2013.01); *G06K 7/083* (2013.01);
(Continued)

(58) Field of Classification Search
CPC ............ G06Q 20/3278; G06Q 20/227; G06Q 20/3829; G06Q 20/3229; G06Q 20/4014;
(Continued)

(56) References Cited

U.S. PATENT DOCUMENTS 5,649,115 A  7/1997 Schrader et al.
5,815,657 A  9/1998 Williams et al.
(Continued)

FOREIGN PATENT DOCUMENTS

AU   2015200102 A1   2/2015
CN      1820279 A    8/2006
(Continued)

OTHER PUBLICATIONS

Reddy et al., A Practical Approach for Implementation of Public Key Infrastructure for Digital Signatures, Journal of Information Engineering and Applications, ISSN 2224-5758 (print) ISSN 2224-896X (online), vol. 1, No. 2, 2011.
(Continued)

*Primary Examiner* — Johann Y Choo
(74) *Attorney, Agent, or Firm* — Jefferson IP Law, LLP

(57) ABSTRACT

An electronic device and method of processing a payment at the electronic device are provided. The electronic device includes a security memory configured to store payment information of a near field communication (NFC) method, payment information of a magnetic security transmit (MST) method, and fingerprint information, and a processor configured to control a multiple payment operation of the NFC method and the MST method when fingerprint information obtained through fingerprint detection is valid. The proces-
(Continued)

sor is further configured to control a signal processing information according to the NFC method operation and a signal processing information according to the MST method operation to be outputted as one screen interface.

8 Claims, 41 Drawing Sheets

(51) Int. Cl.
  *G06Q 20/34* (2012.01)
  *G06Q 20/36* (2012.01)
  *G06Q 20/20* (2012.01)
  *G06K 7/08* (2006.01)
  *G06K 7/00* (2006.01)
  *G06K 19/06* (2006.01)

(52) U.S. Cl.
  CPC ....... *G06K 19/06187* (2013.01); *G06Q 20/20* (2013.01); *G06Q 20/3224* (2013.01); *G06Q 20/3255* (2013.01); *G06Q 20/3274* (2013.01); *G06Q 20/351* (2013.01); *G06Q 20/36* (2013.01); *G06Q 20/405* (2013.01); *G06Q 20/40145* (2013.01)

(58) Field of Classification Search
  CPC ............. G06Q 20/342; G06Q 20/0635; G06Q 30/0641; G06Q 30/0635; G06Q 20/405; G06Q 20/3224; G06K 7/083; G06K 7/0004; G06K 7/06187
  See application file for complete search history.

(56) References Cited

U.S. PATENT DOCUMENTS

| | | | |
|---|---|---|---|
| 6,357,006 B1 | 3/2002 | Pham et al. | |
| 6,675,153 B1 | 1/2004 | Cook et al. | |
| 7,610,492 B2 | 10/2009 | Awatsu et al. | |
| 7,715,593 B1 | 5/2010 | Adams et al. | |
| 7,743,254 B2 | 6/2010 | Sauve et al. | |
| 7,767,430 B2 | 8/2010 | Neeser et al. | |
| 7,865,577 B1 | 1/2011 | O'Neil et al. | |
| 7,982,615 B2 | 7/2011 | Kennedy | |
| 8,055,545 B2 | 11/2011 | Mages et al. | |
| 8,126,782 B1 | 2/2012 | Zhu et al. | |
| 8,144,941 B2 | 3/2012 | Adams et al. | |
| 8,299,928 B2 | 10/2012 | Kennedy | |
| 8,452,882 B2 | 5/2013 | Schneider | |
| 8,467,768 B2 | 6/2013 | Mahaffey et al. | |
| 8,503,703 B2 | 8/2013 | Eaton et al. | |
| 8,621,075 B2 | 12/2013 | Luna | |
| 8,628,012 B1 | 1/2014 | Wallner | |
| 8,670,748 B2 | 3/2014 | Slack et al. | |
| 8,676,709 B2 | 3/2014 | Kunz et al. | |
| 8,682,400 B2 | 3/2014 | Mahaffey et al. | |
| 8,682,802 B1 | 3/2014 | Kannanari | |
| 8,700,729 B2 | 4/2014 | Dua | |
| 8,718,602 B2 | 5/2014 | Wu et al. | |
| 8,732,451 B2 | 5/2014 | Viswanathan et al. | |
| 8,744,403 B2 | 6/2014 | Wu et al. | |
| 8,774,788 B2 | 7/2014 | Mahaffey et al. | |
| 8,775,757 B2 | 7/2014 | Polzin et al. | |
| 8,814,046 B1 | 8/2014 | Wallner | |
| 8,825,007 B2 | 9/2014 | Mahaffey et al. | |
| 8,831,677 B2 | 9/2014 | Villa-Real | |
| 8,843,125 B2 | 9/2014 | Kwon et al. | |
| 8,843,749 B2 | 9/2014 | Sauve et al. | |
| 8,862,504 B2 | 10/2014 | Sobek | |
| 8,929,874 B2 | 1/2015 | Mahaffey et al. | |
| 8,954,122 B2 * | 2/2015 | Wilmhoff | H04M 1/00 455/575.7 |
| 8,954,515 B2 | 2/2015 | Guo et al. | |
| 8,966,268 B2 | 2/2015 | Marien | |
| 8,972,298 B2 | 3/2015 | Kunz et al. | |
| 9,027,079 B2 | 5/2015 | Comay et al. | |
| 9,053,471 B2 | 6/2015 | Mages et al. | |
| 9,055,314 B2 | 6/2015 | Yin et al. | |
| 9,077,543 B2 | 7/2015 | Luft et al. | |
| 9,092,772 B2 * | 7/2015 | Fernandez | G06Q 20/3278 |
| 9,100,873 B2 | 8/2015 | Luna et al. | |
| 9,100,925 B2 | 8/2015 | Mahaffey et al. | |
| 9,112,703 B2 | 8/2015 | Wood et al. | |
| 9,118,464 B2 | 8/2015 | Nix | |
| 9,130,910 B1 | 9/2015 | Logue | |
| 9,135,424 B2 | 9/2015 | Taveau et al. | |
| 9,137,025 B2 | 9/2015 | Lambert | |
| 9,161,196 B2 | 10/2015 | Ballantyne et al. | |
| 9,161,218 B2 | 10/2015 | Bae et al. | |
| 9,161,225 B2 | 10/2015 | Pecen et al. | |
| 9,166,953 B2 | 10/2015 | Luukkala et al. | |
| 9,167,428 B2 | 10/2015 | Buntinx | |
| 9,167,550 B2 | 10/2015 | Mahaffey et al. | |
| 9,179,434 B2 | 11/2015 | Mahaffey et al. | |
| 9,191,813 B2 | 11/2015 | Lim et al. | |
| 9,232,491 B2 | 1/2016 | Mahaffey | |
| 9,235,839 B2 | 1/2016 | Dua | |
| 9,344,817 B2 | 5/2016 | Eaton et al. | |
| 9,357,317 B2 | 5/2016 | Eaton et al. | |
| 9,408,075 B2 | 8/2016 | Wang et al. | |
| 9,582,598 B2 | 2/2017 | Kalgi | |
| 9,712,632 B2 | 7/2017 | Chen | |
| 9,723,482 B2 | 8/2017 | Wang et al. | |
| 9,887,983 B2 | 2/2018 | Lindemann et al. | |
| 9,934,500 B2 | 4/2018 | Guyot | |
| 9,979,776 B2 | 5/2018 | Slack et al. | |
| 10,121,144 B2 | 11/2018 | Khan | |
| 10,154,084 B2 | 12/2018 | Kalgi | |
| 10,419,529 B2 | 9/2019 | Kalgi | |
| 10,621,576 B1 | 4/2020 | Kannanari | |
| 10,678,908 B2 | 6/2020 | Grobman et al. | |
| 2002/0174068 A1 | 11/2002 | Marsot | |
| 2002/0186845 A1 | 12/2002 | Dutta et al. | |
| 2005/0039054 A1 | 2/2005 | Satoh et al. | |
| 2005/0138384 A1 | 6/2005 | Brickell et al. | |
| 2005/0154886 A1 | 7/2005 | Birk et al. | |
| 2005/0283263 A1 | 12/2005 | Eaton et al. | |
| 2006/0080550 A1 | 4/2006 | Awatsu et al. | |
| 2006/0165060 A1 | 7/2006 | Dua | |
| 2006/0200410 A1 | 9/2006 | Kelley et al. | |
| 2006/0209016 A1 | 9/2006 | Fox et al. | |
| 2006/0218403 A1 | 9/2006 | Sauve et al. | |
| 2008/0155268 A1 | 6/2008 | Jazayeri et al. | |
| 2008/0182592 A1 | 7/2008 | Cha et al. | |
| 2008/0320308 A1 | 12/2008 | Kostiainen et al. | |
| 2009/0114716 A1 | 5/2009 | Ramachandran | |
| 2009/0119184 A1 | 5/2009 | Mages et al. | |
| 2009/0171836 A1 | 7/2009 | Olliphant et al. | |
| 2009/0307132 A1 | 12/2009 | Phillips | |
| 2010/0082991 A1 | 4/2010 | Baldwin et al. | |
| 2010/0088188 A1 | 4/2010 | Kumar et al. | |
| 2010/0117794 A1 | 5/2010 | Adams et al. | |
| 2010/0138912 A1 | 6/2010 | Bauchot et al. | |
| 2010/0156627 A1 | 6/2010 | Kennedy | |
| 2010/0210240 A1 | 8/2010 | Mahaffey et al. | |
| 2010/0216429 A1 | 8/2010 | Mahajan | |
| 2010/0217989 A1 | 8/2010 | Sauve et al. | |
| 2010/0242110 A1 | 9/2010 | Louch et al. | |
| 2010/0275259 A1 | 10/2010 | Adams et al. | |
| 2010/0279675 A1 | 11/2010 | Slack et al. | |
| 2011/0082737 A1 | 4/2011 | Crowe et al. | |
| 2011/0099112 A1 | 4/2011 | Mages et al. | |
| 2011/0145932 A1 | 6/2011 | Nerger et al. | |
| 2011/0214158 A1 | 9/2011 | Pasquero et al. | |
| 2011/0271301 A1 | 11/2011 | Kennedy | |
| 2012/0024947 A1 | 2/2012 | Naelon | |
| 2012/0074217 A1 | 3/2012 | Block et al. | |
| 2012/0101938 A1 | 4/2012 | Kasower | |
| 2012/0101939 A1 | 4/2012 | Kasower | |
| 2012/0101951 A1 | 4/2012 | Li et al. | |
| 2012/0149331 A1 | 6/2012 | Wu et al. | |
| 2012/0149332 A1 | 6/2012 | Wu et al. | |
| 2012/0166795 A1 | 6/2012 | Wood et al. | |

(56) References Cited

U.S. PATENT DOCUMENTS

| | | |
|---|---|---|
| 2012/0171992 A1 | 7/2012 | Cheong et al. |
| 2012/0172026 A1 | 7/2012 | Kwon et al. |
| 2012/0172089 A1 | 7/2012 | Bae et al. |
| 2012/0174189 A1 | 7/2012 | Lim et al. |
| 2012/0221422 A1 | 8/2012 | Sobek |
| 2012/0231844 A1 | 9/2012 | Coppinger |
| 2012/0254290 A1 | 10/2012 | Naaman |
| 2012/0254624 A1 | 10/2012 | Malkhasyan et al. |
| 2012/0290449 A1 | 11/2012 | Mullen et al. |
| 2012/0316992 A1 | 12/2012 | Oborne |
| 2012/0317370 A1 | 12/2012 | Luna |
| 2013/0006756 A1 | 1/2013 | Heo |
| 2013/0013480 A1 | 1/2013 | Venter |
| 2013/0042111 A1 | 2/2013 | Fiske |
| 2013/0124349 A1 | 5/2013 | Khan et al. |
| 2013/0124420 A1 | 5/2013 | Duri et al. |
| 2013/0139230 A1 | 5/2013 | Koh et al. |
| 2013/0141567 A1* | 6/2013 | Walker ............... H04M 1/7253 348/135 |
| 2013/0159186 A1 | 6/2013 | Brudnicki et al. |
| 2013/0208893 A1 | 8/2013 | Shablygin et al. |
| 2013/0226812 A1 | 8/2013 | Landrok et al. |
| 2013/0238455 A1 | 9/2013 | Laracey |
| 2013/0294250 A1 | 11/2013 | Berelejis et al. |
| 2013/0314214 A1* | 11/2013 | Leica .................. H04B 5/0056 340/10.1 |
| 2013/0317928 A1 | 11/2013 | Laracey |
| 2013/0325712 A1 | 12/2013 | Park et al. |
| 2013/0332740 A1 | 12/2013 | Sauve et al. |
| 2013/0339122 A1* | 12/2013 | Truitt .................. G06Q 30/0269 705/14.26 |
| 2013/0340064 A1 | 12/2013 | Kostiainen et al. |
| 2013/0346302 A1 | 12/2013 | Purves et al. |
| 2013/0347064 A1 | 12/2013 | Aissi |
| 2014/0007215 A1 | 1/2014 | Romano et al. |
| 2014/0025444 A1 | 1/2014 | Willis |
| 2014/0025520 A1 | 1/2014 | Mardikar et al. |
| 2014/0040125 A1 | 2/2014 | Kunz et al. |
| 2014/0040126 A1 | 2/2014 | Andrews et al. |
| 2014/0040130 A1 | 2/2014 | Kunz et al. |
| 2014/0040131 A1 | 2/2014 | Andrews et al. |
| 2014/0058935 A1 | 2/2014 | Mijares |
| 2014/0068744 A1 | 3/2014 | Bran et al. |
| 2014/0073270 A1* | 3/2014 | Chou .................... G06F 3/0416 455/90.2 |
| 2014/0075349 A1* | 3/2014 | Yun ...................... G06F 16/487 715/764 |
| 2014/0095286 A1 | 4/2014 | Drewry et al. |
| 2014/0095865 A1 | 4/2014 | Yerra et al. |
| 2014/0101034 A1 | 4/2014 | Tanner et al. |
| 2014/0101048 A1 | 4/2014 | Gardiner et al. |
| 2014/0114777 A1 | 4/2014 | Guyot |
| 2014/0114860 A1 | 4/2014 | Ozvat et al. |
| 2014/0115125 A1 | 4/2014 | Chen |
| 2014/0122328 A1* | 5/2014 | Grigg .................. G06Q 20/3276 705/40 |
| 2014/0122873 A1 | 5/2014 | Deutsch et al. |
| 2014/0138435 A1* | 5/2014 | Khalid ................ G06Q 20/352 235/380 |
| 2014/0149198 A1 | 5/2014 | Kim et al. |
| 2014/0149285 A1 | 5/2014 | De et al. |
| 2014/0149292 A1 | 5/2014 | Kunz et al. |
| 2014/0162598 A1 | 6/2014 | Villa-Real |
| 2014/0172724 A1 | 6/2014 | Dua |
| 2014/0180787 A1 | 6/2014 | Sarkissiasn |
| 2014/0180931 A1 | 6/2014 | Lie et al. |
| 2014/0181962 A1 | 6/2014 | Se0 et al. |
| 2014/0187207 A1 | 7/2014 | Slack et al. |
| 2014/0191028 A1 | 7/2014 | Laracey |
| 2014/0222663 A1 | 8/2014 | Park et al. |
| 2014/0222682 A1 | 8/2014 | Dua |
| 2014/0222688 A1 | 8/2014 | Haggerty et al. |
| 2014/0244494 A1 | 8/2014 | Davis et al. |
| 2014/0244496 A1 | 8/2014 | Langus et al. |
| 2014/0244514 A1 | 8/2014 | Rodriguez et al. |
| 2014/0258110 A1 | 9/2014 | Davis et al. |
| 2014/0258132 A1 | 9/2014 | Swamy et al. |
| 2014/0269946 A1* | 9/2014 | Wallner ............ G06K 19/06206 375/256 |
| 2014/0279437 A1 | 9/2014 | Lee et al. |
| 2014/0281500 A1 | 9/2014 | Ignatchenko |
| 2014/0282878 A1 | 9/2014 | Ignatchenko et al. |
| 2014/0283006 A1 | 9/2014 | Korkishko et al. |
| 2014/0289130 A1 | 9/2014 | Savolainen et al. |
| 2014/0297438 A1 | 10/2014 | Dua |
| 2014/0297539 A1 | 10/2014 | Swamy et al. |
| 2014/0297540 A1 | 10/2014 | Swamy et al. |
| 2014/0317686 A1 | 10/2014 | Vetillard |
| 2014/0329500 A1 | 11/2014 | Wang et al. |
| 2014/0337227 A1 | 11/2014 | Dua |
| 2014/0358794 A1 | 12/2014 | Finley |
| 2014/0364099 A1 | 12/2014 | Pai et al. |
| 2014/0370851 A1 | 12/2014 | Wang et al. |
| 2014/0372293 A1 | 12/2014 | Leung et al. |
| 2014/0372299 A1 | 12/2014 | Singh et al. |
| 2014/0372300 A1 | 12/2014 | Blythe |
| 2015/0004934 A1 | 1/2015 | Qian et al. |
| 2015/0006392 A1 | 1/2015 | Brand et al. |
| 2015/0006404 A1 | 1/2015 | Beidl et al. |
| 2015/0011273 A1* | 1/2015 | Wilmhoff ............... H01Q 1/243 455/575.7 |
| 2015/0012427 A1 | 1/2015 | Phillips et al. |
| 2015/0012439 A1 | 1/2015 | Sakurai et al. |
| 2015/0019944 A1 | 1/2015 | Kalgi |
| 2015/0020160 A1 | 1/2015 | Goncalves et al. |
| 2015/0026040 A1 | 1/2015 | Kasower |
| 2015/0032524 A1 | 1/2015 | Fisher |
| 2015/0032635 A1 | 1/2015 | Guise |
| 2015/0039494 A1 | 2/2015 | Sinton et al. |
| 2015/0046324 A1* | 2/2015 | de la Cropte de Chanterac ......... G06Q 20/3278 705/41 |
| 2015/0046339 A1 | 2/2015 | Wong et al. |
| 2015/0058227 A1 | 2/2015 | Dua |
| 2015/0077228 A1 | 3/2015 | Dua |
| 2015/0081559 A1 | 3/2015 | Dua |
| 2015/0088750 A1 | 3/2015 | Dua |
| 2015/0095174 A1 | 4/2015 | Dua |
| 2015/0095175 A1 | 4/2015 | Dua |
| 2015/0095235 A1 | 4/2015 | Dua |
| 2015/0100488 A1 | 4/2015 | Dua |
| 2015/0100499 A1 | 4/2015 | Dua |
| 2015/0102047 A1 | 4/2015 | Tsou et al. |
| 2015/0112868 A1 | 4/2015 | Swamy et al. |
| 2015/0121068 A1 | 4/2015 | Lindemann et al. |
| 2015/0127549 A1 | 5/2015 | Khan |
| 2015/0134439 A1 | 5/2015 | Maxwell et al. |
| 2015/0161386 A1* | 6/2015 | Gupta .................... G06N 5/043 726/23 |
| 2015/0163222 A1 | 6/2015 | Pal |
| 2015/0178732 A1 | 6/2015 | Laracey |
| 2015/0199058 A1 | 7/2015 | Zhang |
| 2015/0200774 A1 | 7/2015 | Le Saint |
| 2015/0201322 A1 | 7/2015 | Kim et al. |
| 2015/0220932 A1 | 8/2015 | Mardikar et al. |
| 2015/0248671 A1 | 9/2015 | Mages et al. |
| 2015/0254636 A1 | 9/2015 | Yoon et al. |
| 2015/0264024 A1 | 9/2015 | Frank |
| 2015/0278796 A1 | 10/2015 | Jiang et al. |
| 2015/0287018 A1 | 10/2015 | Iqbal et al. |
| 2015/0302396 A1* | 10/2015 | Jeon .................... G06Q 20/36 705/41 |
| 2015/0302413 A1 | 10/2015 | Dua |
| 2015/0339667 A1 | 11/2015 | Dua |
| 2015/0371234 A1* | 12/2015 | Huang .................. G06Q 20/20 705/44 |
| 2015/0381634 A1 | 12/2015 | Lal et al. |
| 2016/0134660 A1 | 5/2016 | Ponsini et al. |
| 2016/0162879 A1 | 6/2016 | Mu |
| 2017/0039368 A1 | 2/2017 | Grobman et al. |
| 2017/0039561 A1 | 2/2017 | Finley |
| 2017/0039562 A1 | 2/2017 | Finley |
| 2017/0134479 A1 | 5/2017 | Kalgi |

(56) References Cited

U.S. PATENT DOCUMENTS

| | | |
|---|---|---|
| 2017/0357960 A1 | 12/2017 | Quentin |
| 2018/0204197 A1 | 7/2018 | Guyot |
| 2018/0234410 A1 | 8/2018 | Lindemann et al. |
| 2018/0337974 A1 | 11/2018 | Slack et al. |
| 2019/0075156 A1 | 3/2019 | Kalgi |
| 2019/0139040 A1 | 5/2019 | Khan |

FOREIGN PATENT DOCUMENTS

| | | | |
|---|---|---|---|
| CN | 101034449 A | 9/2007 | |
| CN | 101996446 A | 3/2011 | |
| CN | 102103683 A | 6/2011 | |
| CN | 102685692 A | 9/2012 | |
| CN | 103020825 A | 4/2013 | |
| CN | 103188653 A | 7/2013 | |
| CN | 103220637 A | 7/2013 | |
| CN | 103337023 A | 10/2013 | |
| CN | 103426084 A | 12/2013 | |
| CN | 103500404 A | 1/2014 | |
| CN | 103765454 A | 4/2014 | |
| CN | 103793815 A | 5/2014 | |
| CN | 103942678 A | 7/2014 | |
| CN | 104050559 A | 9/2014 | |
| CN | 104200362 A | 12/2014 | |
| CN | 104252675 A | 12/2014 | |
| CN | 104320779 A | 1/2015 | |
| CN | 104331796 A | 2/2015 | |
| CN | 105393259 A | 3/2016 | |
| EP | 0949595 A2 | 10/1999 | |
| EP | 176 844 A3 | 5/2002 | |
| EP | 2515472 A1 | 10/2012 | |
| EP | 2515472 A1 * | 10/2012 | ........... H04L 9/3231 |
| JP | 2002-278939 A | 9/2002 | |
| JP | 2005-62556 A | 3/2005 | |
| JP | 2010-224807 A | 10/2010 | |
| JP | 2014-128028 A | 7/2014 | |
| KR | 10-2003-0009830 A | 2/2003 | |
| KR | 10-2011-0019887 A | 3/2011 | |
| KR | 10-2011-0032735 A | 3/2011 | |
| KR | 10-2011-0112594 A | 10/2011 | |
| KR | 10-2011-0137033 A | 12/2011 | |
| KR | 10-2012-0046376 A | 5/2012 | |
| KR | 10-2012-0094544 A | 8/2012 | |
| KR | 10-2013-0083029 A | 7/2013 | |
| KR | 10-2013-0089902 A | 8/2013 | |
| KR | 10-2013-0125344 A | 11/2013 | |
| KR | 10-2013-0142864 A | 12/2013 | |
| KR | 10-2014-0068443 A | 6/2014 | |
| KR | 10-2014-0079960 A | 6/2014 | |
| KR | 10-2014-0096208 A | 8/2014 | |
| KR | 10-2014-0112785 A | 9/2014 | |
| KR | 10-2014-0117105 A | 10/2014 | |
| KR | 10-2014-0133240 A | 11/2014 | |
| KR | 10-2015-0019956 A | 2/2015 | |
| KR | 10-2015-0097325 A | 8/2015 | |
| KR | 10-2015-0104700 A | 9/2015 | |
| KR | 10-2015-0141321 A | 12/2015 | |
| WO | 2012/068094 A1 | 5/2012 | |
| WO | 2012/091349 A2 | 7/2012 | |
| WO | 2013/166185 A1 | 11/2013 | |
| WO | 2013/166507 A1 | 11/2013 | |
| WO | 2014-189569 A1 | 11/2014 | |
| WO | 2015-004677 A1 | 1/2015 | |
| WO | 2015/004803 A1 | 1/2015 | |

OTHER PUBLICATIONS

About Apple Pay in the US, Apple Support, https://support.apple.com/en-us/HT201469, Oct. 22, 2015.
Wallner, Stronger Security and Mobile Payments—Dramatically Faster and Cheaper to Implement, LoopPay White Paper, 2014, LoopPay, Inc.
Ibrahim, Receiver-deniable Public-Key Encryption, International Journal of Network Security, vol. 8, No. 2, pp. 159-165, Mar. 2009.
U.S. Office Action dated Dec. 3, 2018, issued in the U.S. Appl. No. 15/056,827.
European Office Action dated Oct. 25, 2018, issued in European Patent Application No. 16755947.5-1213.
U.S. Non-final Office Action dated Apr. 26, 2019, issued in U.S. Appl. No. 15/054,949.
U.S. Non-final Office Action dated May 14, 2019, issued in U.S. Appl. No. 15/054,642.
U.S. Final Office Action dated Jun. 7, 2019, issued in U.S. Appl. No. 15/056,827.
European Office Action dated Feb. 18, 2019, issued in a counterpart European application No. 16755950.9-1213.
Chinese Office Action dated Mar. 22, 2019, issued in a counterpart Chinese application No. 201610084771.2.
A U.S. Office Action dated Jan. 28, 2019, issued in a counterpart U.S. Appl. No. 15/055,026.
Chinese Office Action with English translation dated Sep. 11, 2019; Chinese Appln. No. 201610084771.2.
U.S. Office Action dated Oct. 17, 2019; U.S. Appl. No. 15/054,642.
Chinese Office Action dated May 11, 2020, issued in Chinese Patent Application No. 201610113423.3.
U.S. Non-final Office Action dated Feb. 21, 2020, issued in U.S. Appl. No. 15/056,113.
U.S. Non-final Office Action dated Apr. 30, 2020, issued in U.S Appl. No. 15/054,808.
U.S. Non-final Office Action dated May 12, 2020, issued in U.S. Appl. No. 15/054,642.
European Summons to attend oral proceedings dated Apr. 22, 2020, issued in European Patent Application No. 16157728.3.
Analysis of the Trusted Environment of Mobile Intelligent Terminals, Dec. 12, 2012, China Academic Journal Electronic Publishing House.
Chinese Office Action dated Feb. 10, 2021, issued in Chinese Patent Application No. 201680012550.2.
Chinese Office Action dated Mar. 1, 2021, issued in Chinese Patent Application No. 201680012319.3.
U.S. Non-final Office Action dated Nov. 5, 2020, issued in U.S. Appl. No. 15/054,642.
U.S. Final Office Action dated Nov. 9, 2020, issued in U.S. Appl. No. 15/054,808.
Chinese Office Action dated Nov. 25, 2020, issued in Chinese Patent Application No. 201680012353.0.
Chinese Office Action dated Dec. 1, 2020, issued in Chinese Patent Application No. 201680012545.1.
Indian Office Action dated Dec. 8, 2020, issued in Indian Patent Application No. 201717032092.
U.S. Non-final Office Action dated Mar. 31, 2021, issued in U.S Appl. No. 15/056,113.
U.S. Final Office Action dated Jun. 23, 2021, issued in U.S. Appl. No. 15/056,113.
U.S. Non-Final Office Action dated Sep. 29, 2021, issued in U.Ss Appl. No. 15/055,026.

* cited by examiner

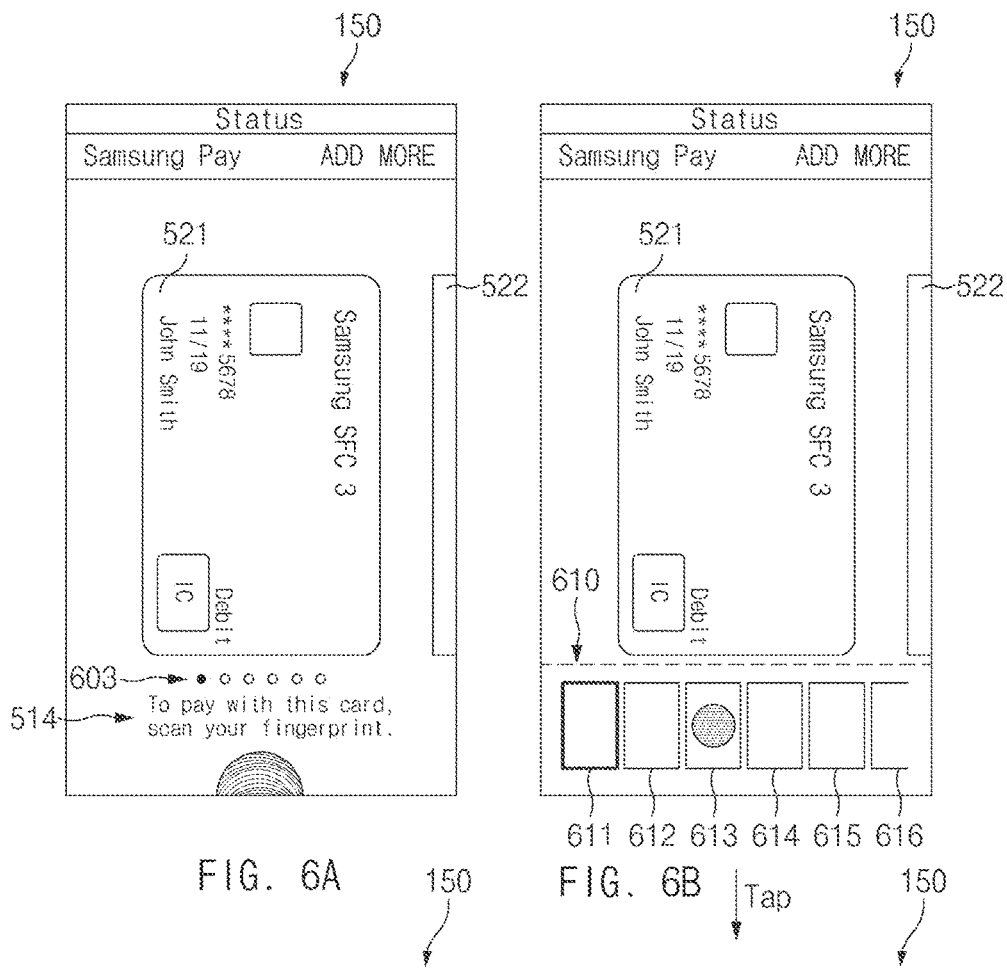
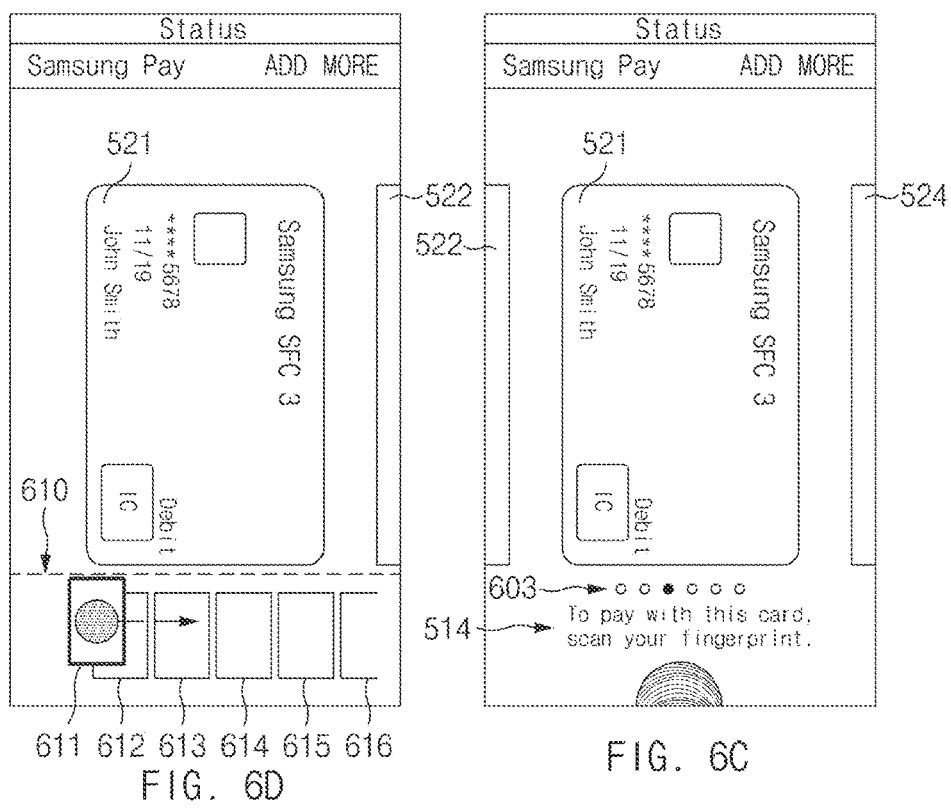

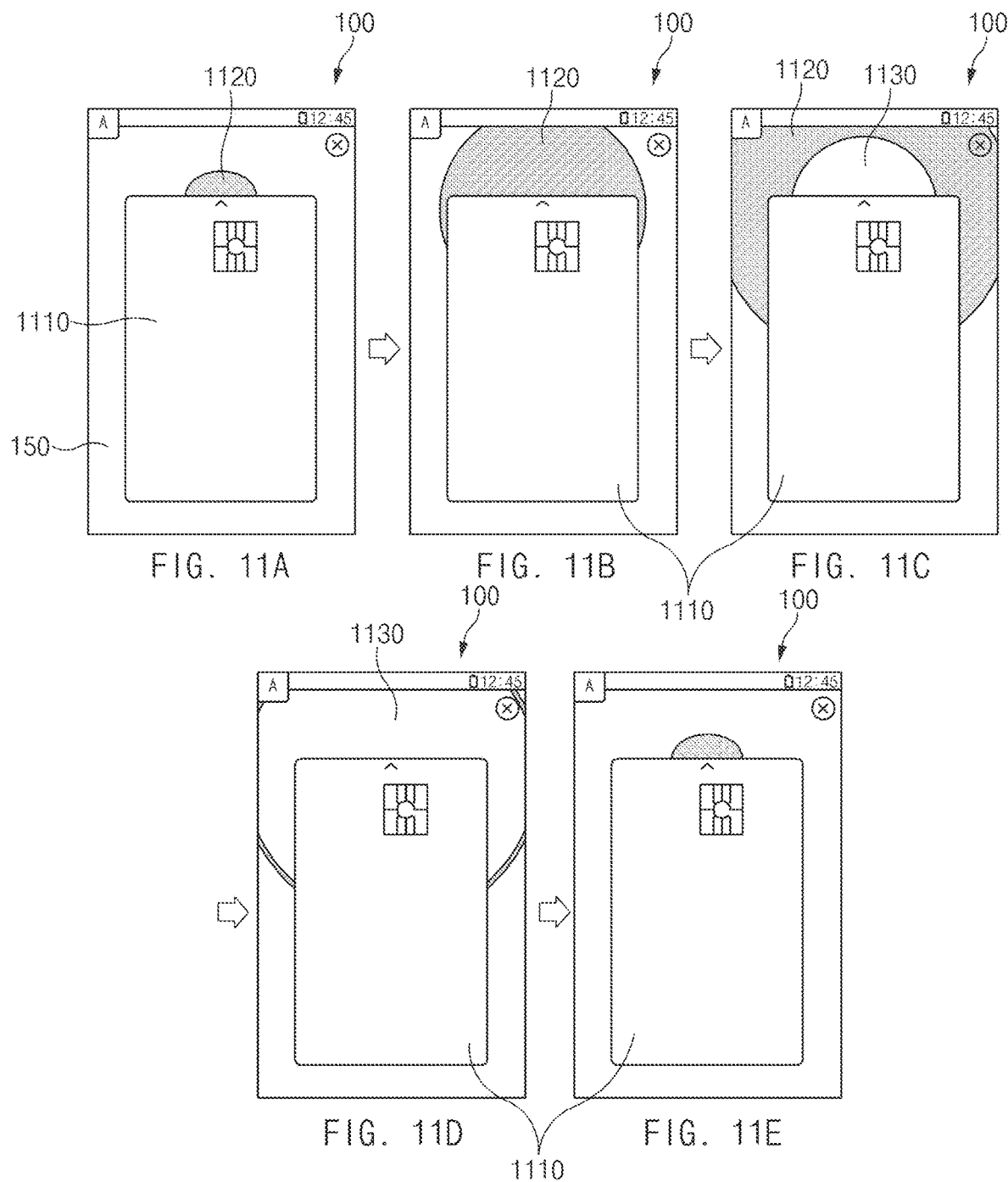

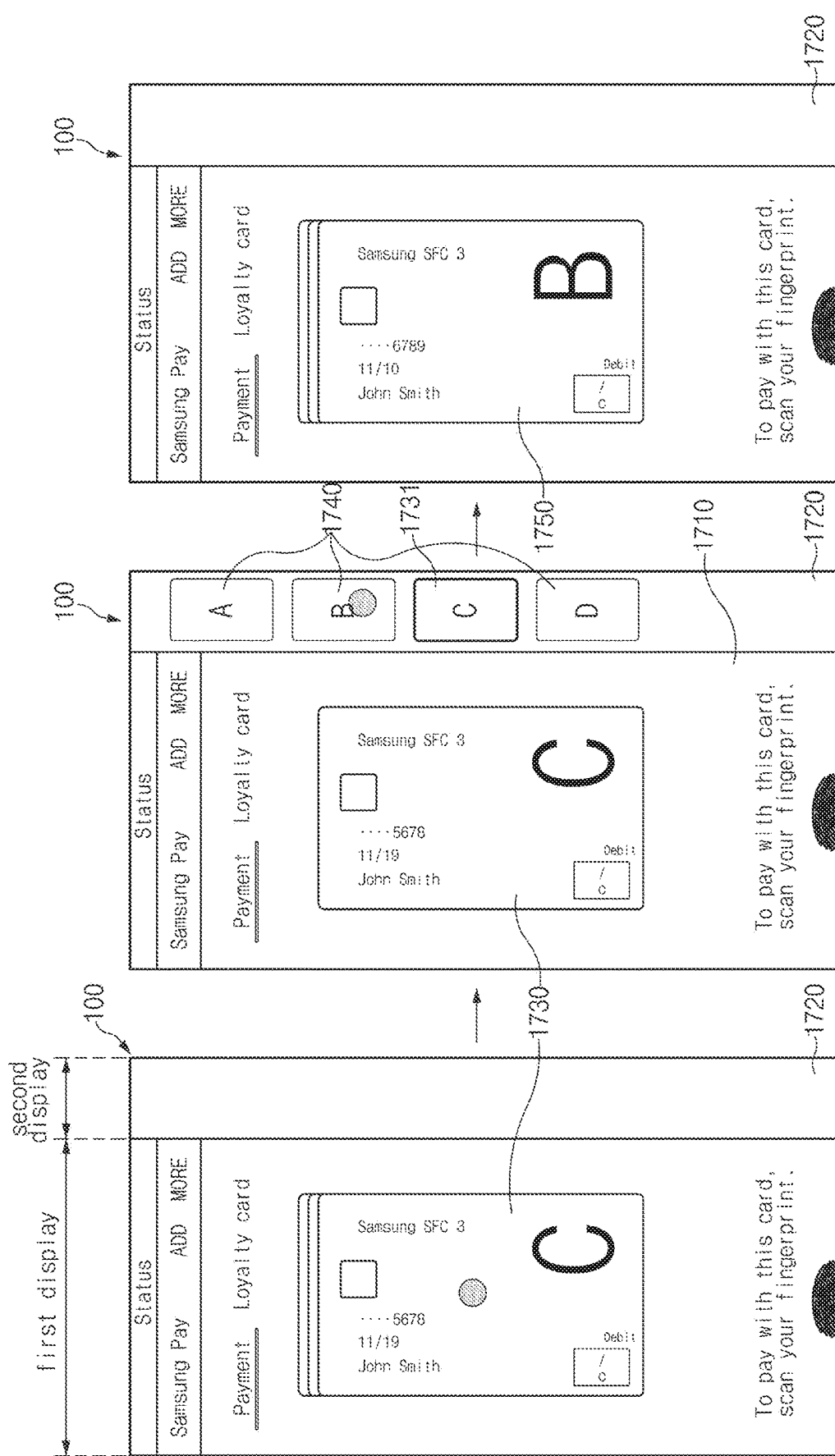

PAYMENT PROCESSING METHOD AND ELECTRONIC DEVICE SUPPORTING THE SAME

CROSS-REFERENCE TO RELATED APPLICATION(S)

This application claims the benefit under 35 U.S.C. § 119(e) of a U.S. provisional patent application filed on Feb. 27, 2015 in the U.S. Patent and Trademark Office and assigned Ser. No. 62/126,121, and under 35 U.S.C. § 119(a) of a Korean patent application filed on Feb. 12, 2015 in the Korean Intellectual Property Office and assigned Serial number 10-2015-0021808, and of a Korean patent application filed on Dec. 15, 2015 in the Korean Intellectual Property Office and assigned Serial number 10-2015-0179430, the entire disclosure of each of which is hereby incorporated by reference.

TECHNICAL FIELD

The present disclosure relates to payment processing. More particularly, the present disclosure relates to a payment processing method of processing cost payment more easily and conveniently by using an electronic device and an electronic device supporting the same.

BACKGROUND

In general, an electronic device supports various functions. For example, an electronic device supports a corresponding function by displaying content or executing an application having a specific function.

The above-mentioned electronic device of the related art provides a screen provided from a website that sells a variety of goods.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a payment processing method of processing cost payment more easily and conveniently by using an electronic device and an electronic device supporting the same.

In accordance with an aspect of the present disclosure, an electronic device is provided. The electronic device includes a security memory configured to store payment information of a near field communication (NFC) method, payment information of a magnetic security transmit (MST) method, and fingerprint information, and a processor (or control module) configured to control a multiple payment operation of the NFC method and the MST method when fingerprint information obtained through fingerprint detection is valid.

The control module controls a signal processing screen (or signal processing information) according to the NFC method operation and a signal processing screen (or signal processing information) according to the MST method operation to be outputted as one screen interface.

In accordance with another aspect of the present disclosure, a payment processing method of an electronic device is provided. The payment processing method includes performing fingerprint detection, and outputting a signal processing information according to an NFC method operation and a signal processing information according to an MST method operation to be outputted as one screen interface when fingerprint information obtained through the fingerprint detection is valid.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, and 6D illustrate a card search screen interface of an electronic device according to various embodiments of the present disclosure;

FIGS. 11A, 11B, 11C, 11D, and 11E illustrate a payment execution related screen interface according to various embodiments of the present disclosure;

FIGS. 17A, 17B, and 17C illustrate a card selection related screen according to various embodiments of the present disclosure;

Throughout the drawings, like reference numerals will be understood to refer to like parts, components, and structures.

DETAILED DESCRIPTION

Figure 1:
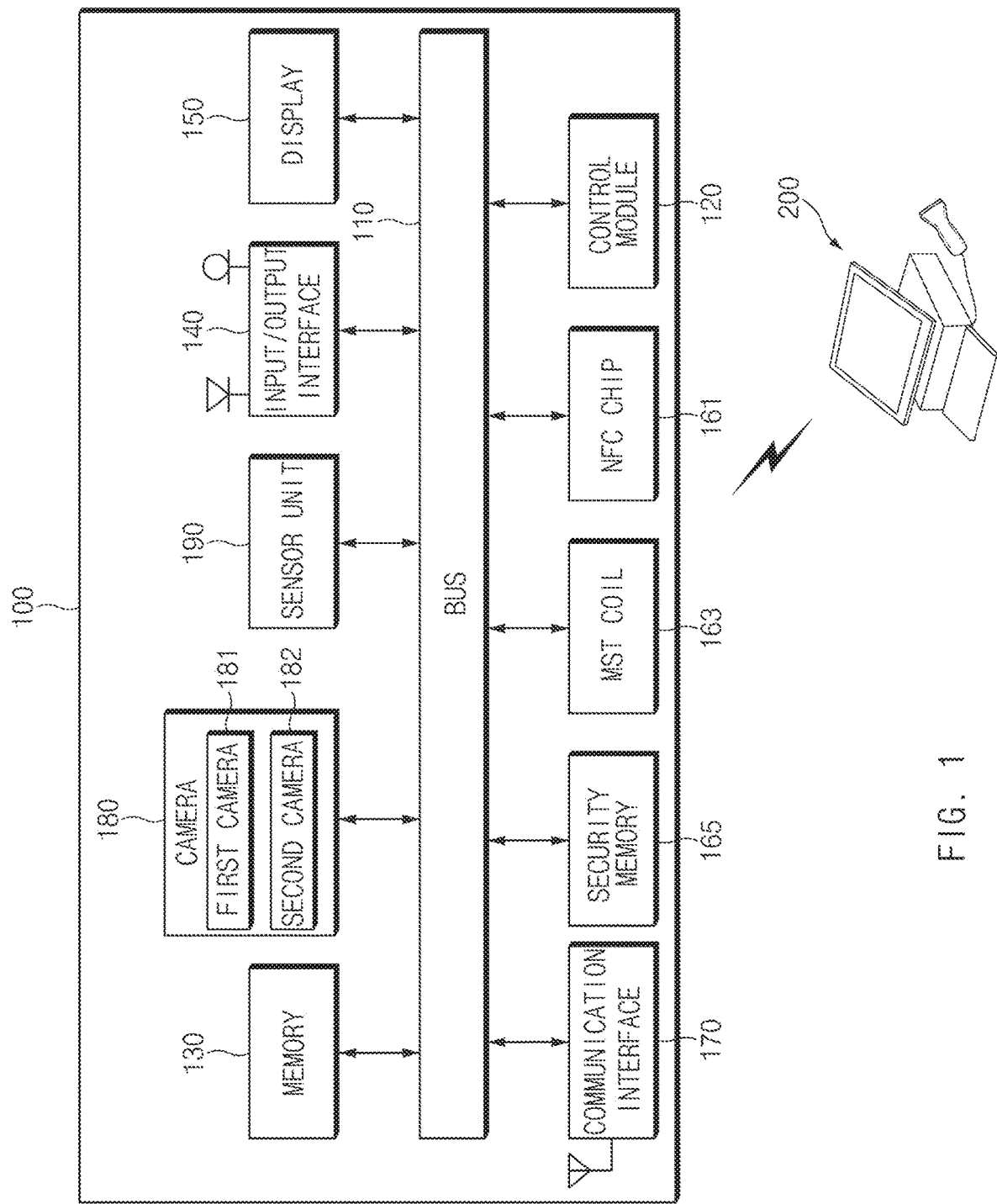
FIG. 1 illustrates a payment processing environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirt of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms, such as "1st", "2nd", "first", "second", and the like used herein may refer to modifying various different elements of various embodiments of the present disclosure, but do not limit the elements. The expressions may be used to distinguish one element from another element. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a central processing unit (CPU) or application processor (AP)) for performing corresponding operations by executing at least one software program stored in a memory device.

Unless otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), moving picture experts group phase 1 or phase 2 (MPEG-1 or MPEG-2) audio layer 3 (MP3) players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

According to some embodiments of the present disclosure, an electronic device may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (for example, Samsung HomeSync™, Apple TV™ or Google TV™), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, and the like), magnetic resonance angiography (MRA) devices, magnetic resonance imaging (MRI) devices, computed tomography (CT) devices, medical imaging devices, ultrasonic devices, and the like), navigation devices, global positioning system (GPS) receivers, event data recorders (EDRs), flight data recorders (FDRs), vehicle infotainment devices, marine electronic equipment (for example, marine navigation systems, gyro compasses, and the like), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, and the like).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described with reference to the accompanying drawings. The term "user" in this disclosure may refer to a person using an electronic device or a device using an electronic device (for example, an artificial intelligent electronic device).

FIG. 1 illustrates a payment processing environment according to various embodiments of the present disclosure.

Referring to FIG. 1, a payment processing environment 10 may include an electronic device 100 and a payment processing device 200.

In the payment processing environment 10, an electronic device 100 (for example, a payment information providing device) may delivery payment information to the payment processing device 200 regardless of a payment processing method of the payment processing device 200 by operating a magnetic security transmit (MST) method and a near field communication (NFC) method or a barcode method in combination. According to an embodiment of the present disclosure, the electronic device 100 may provide payment information to a payment processing device regardless of a payment processing device supporting an MST reception method and a payment processing device supporting an NFC communication method by alternately processing signal transmission necessary for the MST method and the NFC method. For example, the electronic device 100 may transmit an MST signal after an NFC method operation based on an NFC polling cycle. Alternatively, the electronic device 100 may determine an MST signal timing by using a sensor.

According to various embodiments of the present disclosure, the electronic device may output barcode information to a display on a screen interface (or a user interface) for alternately processing signal transmission necessary for the MST method and the NFC method. Alternatively, the electronic device may stop an operation of the MST method and the NFC method temporarily and output a screen interface (or a user interface) including barcode information to a display in correspondence to a user input. According to various embodiments of the present disclosure, the electronic device 100 may provide a handover function (or a function for suppressing switch to another function of an electronic device) corresponding to a screen lock state during a payment information providing operation. Based on this, even if the electronic device 100 is handed over to another user, an access by the other user to another function (for example, a gallery function, a call function, and the like) of the electronic device may be prevented.

The payment processing device 200, for example, may be a device including an NFC communication module for establishing an NFC communication channel with the electronic device 100. Alternatively, the payment processing device 200, for example, may be a device including an MST reception module for receiving an MST signal transmitted from the electronic device 100. Alternatively, the payment processing device 200 may be a device including a scanner for recognizing a barcode outputted to the display of the electronic device 100. The payment processing device 200 may transmit, to a specified server device, payment information delivered by the electronic device 100 through one of the MST method, the NFC method, and the barcode method.

The payment processing device 200 may receive approval information on corresponding payment information from a specified server device. When receiving approval information, the payment processing device 200 may differently process the approval information according to a communication method. For example, if the payment processing device 200 is a device for operating the NFC method, the payment processing device 200 may transmit approval information to the electronic device 100. If the payment processing device 200 is a device for operating the MST method or the barcode method, the payment processing device 200 may output at last one of video data, audio data (for example, payment completion notification sound), vibration, and lamp blinking, which are specified for guiding payment completion. According to various embodiments of the present disclosure, a specified server device may directly provide payment approval information to the electronic device 100.

The payment processing device 200 may include at least one of the NFC communication module, the MST reception module, and the barcode scanner, which are mentioned above in relation to payment processing. Additionally, the payment processing device 200 may include a display device for outputting payment processing related information. Additionally, the payment processing device 200 may include a communication module for communicating with a specified server device. The payment processing device 200 may include at least one processor that relates to payment processing related information processing.

The electronic device 100 may include a bus 110, a control module 120, a memory 130, an input/output interface 140, a display 150, an NFC chip 161, an MST coil 163, a security memory 165, a communication interface 170, a sensor unit 190, and a camera 180.

The bus 110, for example, may include a circuit for connecting the components 120 to 190 to each other and delivering a communication (for example, control message and/or data) between the components 120 to 190. For example, the bus 110 may receive a payment related input event from the input/output interface 140 or a touch screen of the display 150. The bus 110 may deliver the received payment related input event to the control module 120. The bus 110 may deliver signals necessary for activating the component in relation to payment processing or payment processing related function execution.

The control module 120 may perform a control to deliver and process signals relating to an operation of the electronic device 100, or read and store data. The control module 120 may include at least one processor. The processor may include at least one or more of a CPU, an AP, and a communication processor (CP). The processor, for example, may execute calculation or data processing for control and/or communication of at least one another component of the electronic device 100.

According to an embodiment of the present disclosure, the processor may execute a payment application at a payment application execution request. The processor may prepare a multiple payment method operation of the NFC method and the MST method relating to payment application execution. Additionally, the processor may prepare a barcode method operation in correspondence to an input event or a specified event occurrence. The operation preparation, for example, may include a state for receiving NFC detection signals from the outside by activating the NFC chip 161. The operation preparation, for example, may include determining whether the operation is a state for transmitting an MST signal by operating the sensor unit 190. The operation preparation may include determining whether the operation is a situation for outputting barcode to the display 150 based on the approach of a specified object by using the camera 180.

The memory 130 may include volatile and/or nonvolatile memory. The memory 130, for example, may store instructions or data relating to at least one another component of the electronic device 100. According to an embodiment of the present disclosure, the memory 130 may store software and/or programs. The program may include a kernel, a middleware, an application programming interface, and an application. At least part of the kernel, the middleware, or the application interface may be called an operating system (OS).

The kernel, for example, may control or manage system resources (for example, the bus 110, the processor, the memory 130, and the like) used for performing operations or functions implemented in other programs (for example, the middleware, the application interface, or the application). Additionally, the kernel may provide an interface for controlling or managing system resources by accessing an individual component of the electronic device 100 from the middleware, the application interface, or the application.

The middleware, for example, may serve as an intermediary role for exchanging data as the application interface or the application communicates with the kernel. Additionally, in relation to job requests received from the application, the middleware, for example, may perform a control (for example, scheduling or load balancing) for the job requests by using a method of assigning a priority for using a system resource (for example, the bus 110, the processor (or the control module 120), the memory 130, and the like) of the electronic device 100 to at least one application program among the applications.

The application interface, as an interface for allowing the application to control a function provided from the kernel or the middleware, may include at least one interface or function (for example, an instruction) for file control, window control, image processing, or character control.

The application may be a program relating to at least one function provided to a user through an operation of the electronic device 100. According to an embodiment of the present disclosure, the application may include a payment application. The payment application may be executed according to a specified icon or menu item selection. Alternatively, the payment application may be activated in correspondence to a payment execution request received from the outside. The payment application may request payment processing related screen interface processing, fingerprint authentication related interface processing, an operation of the NFC method, the MST method, and the barcode method according to fingerprint authentication. When a request of the payment application occurs, processing necessary for the application interface, the middleware, and the kernel may be accomplished through a processor (or the control module 120).

The input/output interface 140, for example, may serve as an interface for delivering instructions or data inputted from a user or another external device to another component(s) of the electronic device 100. Additionally, the input/output interface 140 may output instructions or data received from another component(s) of the electronic device 100 to a user or another external device. The input/output interface 140, for example, may include at least one physical button, touch button, touch pad, or touch screen. Additionally, the input/output interface 140 may include an input unit (or input device) by an electronic pen.

Additionally, the input/output interface 140 may include an audio device for processing audio signals. A speaker included in the audio device may perform an output of a specified high frequency signal. A microphone included in an audio collection device may perform a collection of a specified high frequency signal. The high frequency signal outputting function and the high frequency signal collecting function of the audio device may be used for determining whether there is a peripheral magnetic reader in relation to an MST method operation.

The display 150, for example, may include a liquid crystal display (LCD), a light emitting diode (LED) display, an organic LED (OLED) display, a microelectromechanical systems (MEMS) display, or an electronic paper display. The display 150 may display various content (for example, a text, an image, a video, an icon, a symbol, and the like) to a user. The display 150 may include a touch screen, and for example, may receive a touch, gesture, proximity, or hovering input by using an electronic pen or a user's body part.

The display 150 may output a payment application execution screen in relation to payment processing. According to an embodiment of the present disclosure, the display 150 may output one multiple payment screen interface including a signal processing screen (or signal processing information) relating to an NFC method operation and a signal processing screen (or signal processing information) relating to an MST method operation. The screen interface may include an object for performing barcode switch. When the object for performing barcode switch is selected, the display 150 may output a barcode screen interface where a barcode object is displayed. The barcode screen interface may include an object for performing the multiple payment screen interface switch.

The display 150 may output a screen at least one virtual card object when a payment application is executed. The display 150 may output information for guiding fingerprint authentication. The display 150 may output visual guide information necessary for an operation of the NFC method or the MST method. The display 150 may output information on errors occurring during a payment processing process. The display 150 may output a variety of information according to payment completion. According to various embodiments of the present disclosure, the electronic device 100 may output at least one of video data specified for guiding payment completion and guide sound for guiding payment completion. Additionally, the electronic device 100 may output a vibration pattern or a lamp blinking pattern, which indicates at least one of a payment progress state, a payment completion state, and payment failure.

The NFC chip 161 may be a chip for supporting an NFC communication function. The NFC chip 161, for example, may be activated in correspondence to a control of the control module 120. When receiving a specified signal from the outside, the NFC chip 161 may transmit a specified signal corresponding to the received signal to the outside. During this operation, the NFC chip 161 may transmit payment information stored in the security memory 165 to an external device in correspondence to a control of the control module 120. After the payment information transmission, the NFC chip 161 may receive a message about payment completion from an external device (for example, the payment processing device 200).

The MST coil 163 may be a coil for MST signal transmission. According to an embodiment of the present disclosure, the MST coil 163 may be disposed on at least one side (for example, a certain (or specific) position inside the housing) of the housing of the electronic device 100. For example, the MST coil 163 may be disposed at a battery cover of the electronic device 100. Alternatively, the MST coil 163 may be patterned and disposed at the back cover or the rear cover of the electronic device 100. When the MST coil 163 is disposed at the housing, such as a cover, a contact point connected to the control module 120 may be disposed at one side of the housing. The MST coil 163 may output specified security information stored in the security memory 165 according to a control of the control module 120.

The security memory 165 may store information relating to the payment processing of the electronic device 100. The security memory 165, for example, may include at least one of various forms, such as embedded universal integrated circuit card (eUICC) and embedded security element (eSE). The security memory 165 may include payment information transmitted through the NFC chip 161 or payment information transmitted through the MST coil 163. Additionally, the security memory 165 may include barcode information. The payment information transmitted through the NFC chip 161 and the payment information transmitted through the MST coil 163 may be the same information. For example, the payment information may include credit information recorded on a virtual card (for example, the identification (ID) information of a payment user, virtual card information, the contact information of the electronic device 100, user's address information, and the like).

The payment information, for example, may include token information. The token information may include validity determination related time information or count information. The token information including time information may lose the validity when corresponding time information elapses. The token information including count information may lose the validity when corresponding count information exceeds. The token information that lost the validity may not operate further and the electronic device 100 may require update when the token information loses the validity. Additionally, the electronic device 100 may require new token information replacement.

Payment completion information collected according to payment completion may be received from a specified server device. The payment completion information may be stored in the security memory 165 according to a setting. Alternatively, the payment completion information may be stored in the memory 130 according to a user setting. The payment completion information stored in the security memory 165 or the memory 130 may be outputted to the display 150 according to a search request.

The communication interface 170, for example, may set communication between the electronic device 100 and an external device (for example, a specified server device). For example, the communication interface 170 may communicate with an external device in connection to a network through wireless communication or wired communication. The wireless communication may use long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM) as a cellular communication protocol, for example. The wired communication, for example, may include at least one of universal serial bus (USB), high definition multimedia interface (HDMI), recommended standard 232 (RS-232), and plain old telephone service (POTS). The network may include at least one of telecommunications network, for example, at least one of computer network (for example, local area network (LAN) or wide area network (WAN)), Internet, and telephone network. The communication interface 170, for example, may receive payment completion information (or a message (for example, short messaging service (SMS), multimedia messaging service (MMS), and the like) including payment completion content) from a specified server device.

The sensor unit 190 may collect at least one sensor information relating to determining a movement of the electronic device 100, determining an object that approaches the electronic device 100, and determining whether there is an object around the electronic device 100. The sensor unit 190, for example, may include a high frequency sensor, an acceleration sensor, a gyro sensor, an illumination sensor, a proximity sensor, and a heart rate sensor. Sensor information of a high frequency sensor, an acceleration sensor, a gyro sensor, an illumination sensor, a proximity sensor, and a heart rate sensor, which is collected by the sensor unit 190, may be provided to the control module 120. The delivered sensor information may be analyzed for the position, rotation angle, and surrounding situation recognition of an electronic device.

According to various embodiments of the present disclosure, a speaker and a microphone included in the input/output interface 140 may serve as a sensor configured to transmit high frequency signals and receive high frequency signals during a payment processing operation. Additionally, the speaker may output a specified guide message relating to payment processing to a user. Additionally, the microphone may be used for detecting surrounding sound.

The camera 180 may be disposed at one side of the housing of the electronic device 100 to collect images. For example, the camera 180 may include a first camera 181 disposed at the front surface of the electronic device 100 and a second camera 182 disposed at the rear surface. The electronic device 100 may include one of a front camera and a rear camera.

According to various embodiments of the present disclosure, image collected by the camera 180 may be used for recognizing the type, position, and movement of the payment processing device 200 (for example, POS) through an analysis. In relation to this, in correspondence to a control of the control module 120, the camera 180 may be activated when a payment processing function is executed. Images collected by the camera 180 may be provided to the control module 120 and used for determining a subject approach in a specified form. In relation to the subject approach analysis, the memory 130 may store a texture image. The texture image, for example, may include a texture in a barcode scanner form. According to various embodiments of the present disclosure, the camera 180 may collect infrared information emitted from a barcode scanner. The collected infrared information may be provided to the control module 120 and used for determining whether a barcode scanner approaches or withdraws. According to various embodiments of the present disclosure, the texture image, for example, may include a texture in a magnetic card reader form.

According to various embodiments of the present disclosure, images collected by the camera 180 may be provided to the control module 120 and used for determining a subject movement (for example, withdrawal from a specified position) in a specified form. In relation to this, the camera 180 may support a function for tracking an object (for example, a barcode scanner or a magnetic card reader) by providing a preview image or capturing a video.

As mentioned above, the payment processing environment 10 may support to complete a payment fast with the minimum operation in the most similar manner to a method of making a payment by pulling out a plastic card. The payment processing environment 10 minimizes a user operation relating to payment and intuitively guides an action to be taken, so that the payment processing environment 10 supports easy and simple payment. The electronic device 100, for example, may be one of a smartphone device and a wearable device.

Figure 2:
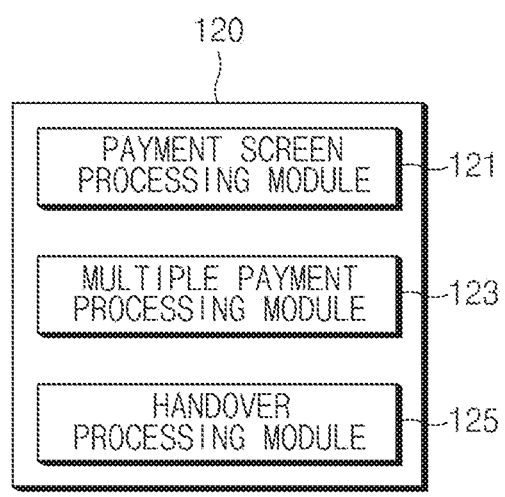
FIG. 2 illustrates a control module according to various embodiments of the present disclosure.

FIG. 2 illustrates a control module according to various embodiments of the present disclosure.

Referring to FIG. 2, a control module 120 according to various embodiments of the present disclosure may include a payment screen processing module 121, a multiple payment processing module 123, and a handover processing module 125.

The payment screen processing module 121 may perform at least one state control relating to a payment application execution of the electronic device 100. For example, when the display 150 is turned off, the payment screen processing module 121 may determine whether a touch gesture relating to payment application execution occurs by operating a driving frequency of a touch panel as a first frequency. When a touch gesture relating to payment application execution occurs, the payment screen processing module 121 may perform a control to output, to the display 150, a specified payment application execution screen (for example, a screen including at least one virtual card object).

According to various embodiments of the present disclosure, when the display 150 is turned on, the payment screen processing module 121 may perform a control to output an icon or menu item relating to payment application execution. Alternatively, the payment screen processing module 121 may allocate payment application execution to a specified input button or a specified sensor (for example, a fingerprint sensor). Accordingly, when at least one of an icon or menu selection signal relating to payment application execution, an input button selection signal, and a fingerprint recognition occurs, the payment screen processing module 121 may output a screen according to payment application execution. For example, the payment screen processing module 121 may perform a control to output a virtual card object on a background screen. During this operation, the payment screen processing module 121 may perform a control to convert the background screen into a specified screen and output a virtual card object.

The payment screen processing module 121 may request a specified authentication information input during payment application execution. For example, the payment screen processing module 121 may output an input window relating to a specified authentication information input. Alternatively, the payment screen processing module 121 may output a guide message for requesting fingerprint detection. In relation to this, the payment screen processing module 121 may perform a control to activate a fingerprint sensor during payment application execution. The payment screen processing module 121 may determine whether fingerprint information collected through a fingerprint sensor corresponds to fingerprint information stored in the security memory 165.

According to various embodiments of the present disclosure, when the fingerprint information is matched, the payment screen processing module 121 may output a write window relating to a user signature write. When a touch event occurs on the write window, the payment screen processing module 121 may collect signature information according to a touch event and deliver this to the multiple payment processing module 123. The write window output may be performed together with fingerprint sensor activation.

The multiple payment processing module 123 may perform a control to operate the NFC method and the MST method in combination in correspondence to fingerprint information match. For example, the multiple payment processing module 123 may activate the NFC chip 161 in relation to an NFC method operation. The multiple payment processing module 123 may determine whether a specified NFC signal is received through the NFC chip 161 at each period. When a specified NFC signal is received, the multiple payment processing module 123 may transmit payment information stored in the security memory 165 to an external device.

The multiple payment processing module 123 may perform payment processing by NFC when or after a specified gesture operation occurs in order to prevent undesired payment processing during an NFC method operation. For example, when sensor information according to a specified movement of a wearable device (for example, sensor information according to an operation for moving a device worn on a wrist to a specified position), the multiple payment processing module 123 may support payment execution by activating the NFC chip 161.

The multiple payment processing module 123 may transmit an MST signal for an operation of the MST method at each period (for example, a spare period considering an NFC polling period) during an NFC method operation. In relation to this, the multiple payment processing module 123 may perform a control to transmit payment information stored in the security memory 165 through the MST coil 163. The multiple payment processing module 123 may maintain MST signal transmission for a certain period or a certain time and process MST signal transmission completion after the specified number of times is over or a specified time elapses. The multiple payment processing module 123 may operate the NFC method again. Additionally, the multiple payment processing module 123 may output, to the display 150, a virtual key button for performing MST signal transmission again. When the virtual key button is selected, the multiple payment processing module 123 may perform MST signal transmission again.

According to various embodiments of the present disclosure, the multiple payment processing module 123 may determine whether there is a magnetic card reader around by using at least one of the sensor unit 190 and the camera 180 during an NFC method operation. If it is determined through sensor information analysis that there is a magnetic card reader around, the multiple payment processing module 123 may stop the NFC method operation and operate the MST method. For example, when it is determined a distance between a magnetic card reader and the electronic device 100 is within a certain distance, the multiple payment processing module 123 may perform a control to transmit an MST signal. During this operation, the multiple payment processing module 123 may perform a control to output an MST signal the specified number of times or for a specified time repeatedly. After the MST signal transmission completion, according to whether a specified condition is satisfied, the multiple payment processing module 123 may perform a control to output a payment completion screen.

In relation to payment completion recognition, the multiple payment processing module 123 may determine whether the magnetic card reader is away by using high frequency transmission through the sensor unit 190 (for example, a proximity sensor and a heart rate sensor), the camera 180, or a speaker and high frequency reception through a microphone. When the magnetic card reader located within a certain distance is away more than a specified distance, the multiple payment processing module 123 may determine this as payment completion.

According to various embodiments of the present disclosure, the multiple payment processing module 123 may determine whether the payment processing device 200 receives notification sound. In relation to this, the multiple payment processing module 123 may determine whether a specified notification sound is received by activating a microphone during an MST method operation. The memory 130 may store at least one notification sound sample that the payment processing device 200 outputs in relation to payment completion. After comparing a received notification sound and a stored notification sound, when a similarity therebetween is greater than a specified value, the multiple payment processing module 123 may determine the comparison result as payment completion.

According to various embodiments of the present disclosure, the multiple payment processing module 123 may determine whether a message according to payment completion is received. In relation to this, the multiple payment processing module 123 may determine whether a word relating to payment completion is included by parsing a message received within a specified time after MST signal transmission. When a message including payment completion content is received, the multiple payment processing module 123 may determine this as payment completion.

According to various embodiments of the present disclosure, the multiple payment processing module 123 may operate a payment completion processing interface (for example, a payment completion virtual key button, a back key, and the like) through which payment completion is processed by user manipulation. When an input signal for indicating payment completion is received through the payment completion processing interface, the multiple payment processing module 123 may determine this as payment completion.

The multiple payment processing module 123 may provide a bar code operation related interface. For example, the multiple payment processing module 123 may perform a control to output a virtual key button for selecting a barcode method operation to a payment application execution screen. Alternatively, in relation to this, the multiple payment processing module 123 may activate the camera 180 during payment application execution. The multiple payment processing module 123 may determine whether a specified subject (for example, a scanner or infrared information) is detected by operating the camera 180. When a specified subject is detected, the multiple payment processing module 123 may perform a control to automatically output barcode information stored in the security memory 165 to the display 150. While barcode is outputted to the display 150, the multiple payment processing module 123 may perform processing to allow the brightness of the display 150 to be a specified value (for example, the maximum value or a value of more than a specified illumination). The multiple payment processing module 123 may output the barcode to the display 150 for a specified time and when a specified condition is satisfied, may perform barcode output termination and payment completion processing.

In relation to the specified condition satisfaction, the multiple payment processing module 123 may determine payment completion based on a size change or a distance change of the obtained specified subject. For example, when the size of a subject changes from more than a certain size into less than a specified size, the multiple payment processing module 123 may determine this as payment completion. Additionally, the multiple payment processing module 123 may determine payment completion based on at last one of whether a specified notification sound is received by using a microphone, whether a message including payment completion content is received, and whether an input signal for indicating payment completion occurs.

The handover processing module 125 may block an access to another function of the electronic device 100 in correspondence to a specified event occurrence during a payment application execution operation. For example, the handover processing module 125 may perform a control to output handover execution related virtual key buttons to the display 150 during payment application execution. Alternatively, the handover processing module 125 may recognize the face of a user of the current electronic device 100 by automatically activating the camera 180 during payment application execution. If the user face is not a specified user face or there is no face, a handover function may be executed automatically. During this operation, the handover processing module 125 may collect a subject by using the camera 180 at a certain time or in real time and determine whether a specified user face is recognized. When a specified user face is recognized, the handover processing module 125 may perform a control to terminate the handover function.

According to various embodiments of the present disclosure, the handover processing module 125 may activate a fingerprint sensor and determine whether specified fingerprint information is inputted. When specified fingerprint information is inputted, the handover processing module 125 may perform a control to terminate the handover function. When the handover function is terminated, the handover processing module 125 may perform a control to output a payment completion screen.

The handover processing module 125 may perform processing to allow the brightness of the display 150 to be a specified value (for example, the maximum brightness) during handover function execution. The handover processing module 125 may re-adjust the turn-off timing (for example, a time set for sleep entry) of the display 150 during handover function execution. For example, in a case that a sleep entry state is set to a first time, when a hand over function is executed, the handover processing module 125 may set a second time (for example, a time longer than the first time) different from the first time as a sleep entry time. Alternatively, according to a user setting, the handover processing module 125 may set a third time shorter than the first time as a sleep entry time. After the sleep entry, even if an input of a specified key (for example, a home key or a power key) occurs, the handover processing module 125 may maintain the handover function.

When an electronic device changes from a specified state (for example, the front where the display 150 is disposed faces up) into another state (for example, the front where the display 150 is disposed faces down), at least one of the multiple payment processing module 123 or the handover processing module 125 may output a specified guide information (for example, guide sound, guide vibration, lamp blinking, and the like). The guide information, for example, may include information for guiding so as to have a state that the display 150 of the electronic device faces up in order for payment processing.

As mentioned above, according to various embodiments of the present disclosure, an electronic device includes a first memory (for, example, a security memory) configured to store payment information of an NFC method, payment information of an MST method, and fingerprint information, and a control module configured to control a multiple payment operation of the NFC method and the MST method when fingerprint information obtained through fingerprint detection is valid. The control module controls a signal processing information according to the NFC method operation and a signal processing information according to the MST method operation to be outputted as one screen interface.

According to various embodiments of the present disclosure, the control module may display a signal transmission object for instructing a signal transmission start guide for payment processing, a signal transmission direction according to the NFC method operation, or a signal transmission direction according to the MST method operation. After fingerprint recognition is completed, the signal transmission object may be outputted.

According to various embodiments of the present disclosure, the control module may operate the NFC method operation and the MST method operation alternatively and differently display a signal transmission object during the payment operation of the NFC method and a signal transmission object during the payment operation of the MST method.

According to various embodiments of the present disclosure, the control module may determine whether an approach of a specified object (for example, a magnetic card reader) is located within a specified distance through a sensor operation during the payment operation of the NFC method and transmits an MST signal according to the MST method operation when the object is located within the specified distance.

According to various embodiments of the present disclosure, the control module may activate a camera during the multiple payment operation and automatically display a barcode object when an image including an object (for example, barcode scanner or infrared information) relating to barcode recognition is captured.

According to various embodiments of the present disclosure, when it is determined that an object relating to the barcode recognition is away by more than a specified distance or disappears from the image, the control module may determine this as payment completion.

According to various embodiments of the present disclosure, the control module may display, on the screen interface, at least one of a handover function object for maintaining a display state of at least part of objects included in the current screen interface and restricting an operation to only allowing prohibiting switching to another function or switching to a barcode method, an object including operation guide information relating to payment execution, a signature object relating to signature entry, and a barcode method switch object for outputting barcode.

According to various embodiments of the present disclosure, the control module may control a screen interface display including at least one of a barcode object and an object for switching to the multiple payment operation screen according to a barcode method switch object selection.

According to various embodiments of the present disclosure, the control module may output fingerprint detection guide information relating to a handover function release during handover function execution according to a handover function object selection.

According to various embodiments of the present disclosure, the control module may execute a handover function for maintaining a display state of at least part of objects included in the current screen interface and prohibiting switching to another function when a specified user face is not recognized after activating a camera.

According to various embodiments of the present disclosure, the control module may perform a control to automatically release a handover function in execution when a specified user face is recognized.

During the MST method or barcode method operation, the control module may perform payment completion processing automatically in correspondence to the satisfaction of a specified condition (for example, at least one of a specified notification sound reception, the movement or disappearance of a specified object through image analysis, and the reception of a message including payment completion content) or support manual payment completion processing by displaying a payment completion processing related object.

Figure 3A:
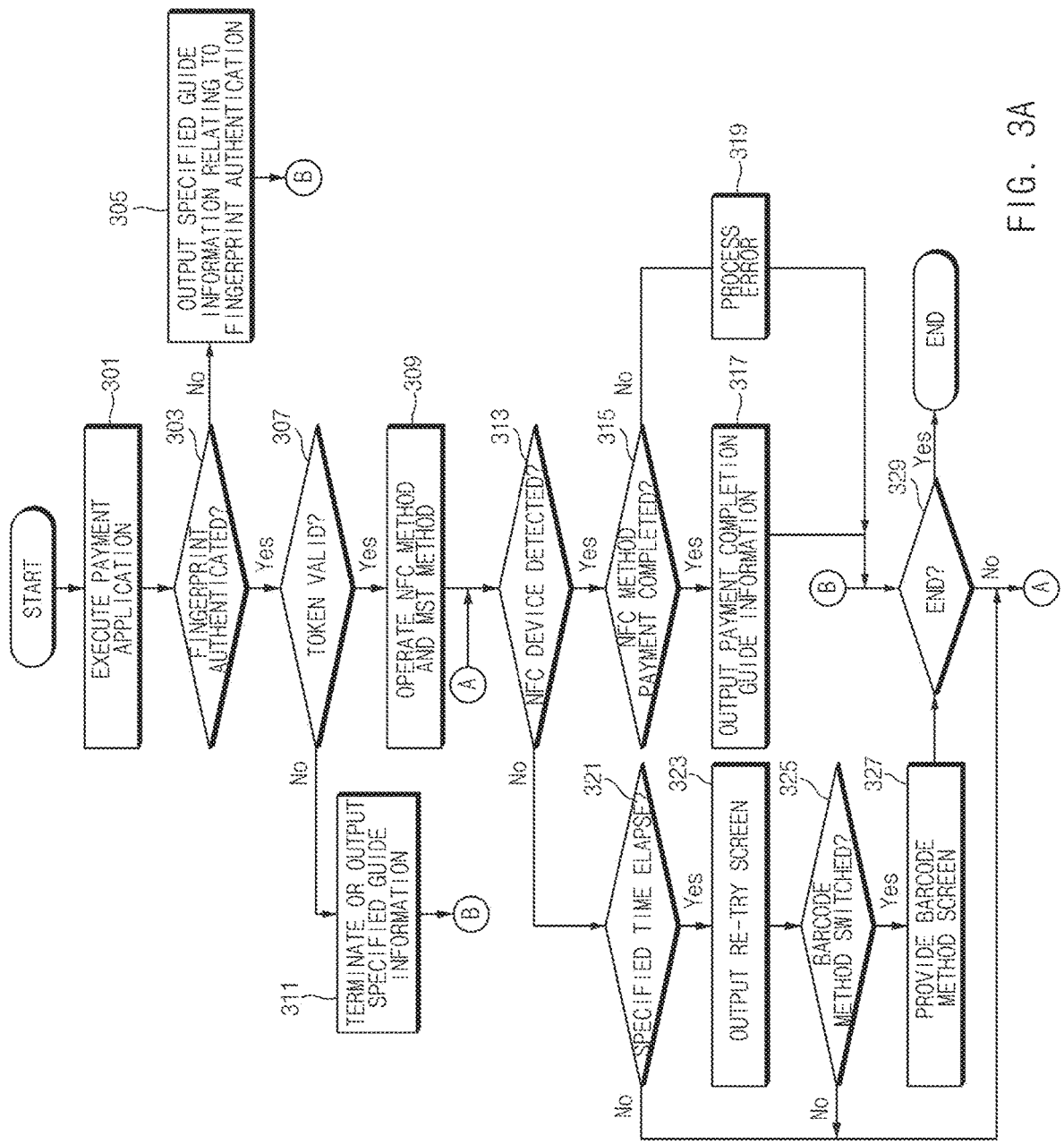
FIG. 3A is a flowchart illustrating a near field communication (NFC) payment processing method of an electronic device according to various embodiments of the present disclosure.

FIG. 3A is a flowchart illustrating an NFC payment processing method of an electronic device according to various embodiments of the present disclosure.

Referring to FIG. 3A, in relation to a payment processing method of an electronic device according to various embodiments of the present disclosure, in operation 301, the control module 120 may execute a payment application according to a user input or information reception from the outside. In relation to this, the control module 120 may perform an input setting (for example, allocating a physical key or a virtual key for touch screen operation or payment application execution) relating to payment application execution. When a payment application is executed, the control module 120 may perform a control to activate a fingerprint sensor. The control module 120 may output, to the display 150, guide information for guiding fingerprint detection according to fingerprint sensor activation.

According to various embodiments of the present disclosure, when a payment application execution condition is fingerprint recognition in a specified state (for example, a turn-off state of the display 150) of an electronic device, the control module 120 may activate a fingerprint sensor before payment application execution. Alternatively, when a specified touch event occurs through a touch screen, which is activated intermittently at a specified period in a turn-off state of the display 150, the control module 120 may activate a fingerprint sensor. Accordingly, the control module 120 may substantially perform operation 301 and operation 303 at the same time.

According to various embodiments of the present disclosure, when a specified touch event occurs from a touch screen, which is activated at a specified period in a turn-off state of the display 150, the control module 120 may perform a control to output an object relating to payment application execution. When a second touch event (for example, a swipe or drag event continuous with the first touch event) occurs, the control module 120 may perform a control to execute a payment application. When a payment application is executed, the control module 120 may automatically activate a fingerprint sensor.

In operation 303, the control module 120 may determine whether fingerprint authentication is successful. In relation to this, the control module 120 may determine a similarity between collected fingerprint authentication information and fingerprint authentication information stored in the memory 165. If the fingerprint authentication fails because the similarity is less than a specified value or the fingerprint authentication is not performed within a specified time, in operation 305, the control module 120 may perform a control to output fingerprint authentication related specified guide information. For example, the control module 120 may perform a control to output guide information for fingerprint authentication to the display 150. Alternatively, the control module 120 may perform a control to output a warning message for notifying a wrong fingerprint input.

If the fingerprint authentication is successful, in operation 307, the control module 120 may determine whether a token is valid. In relation to this, the control module 120 may determine time information or use count information of the token stored in the security memory 165. If the token is valid, in operation 309, the control module 120 may perform the NFC method and the MST method. For example, the control module 120 may alternately operate the NFC method and the MST method at a certain period. Alternatively, while supporting the NFC method, the control module 120 may determine the MST method according to whether a specified condition is satisfied, by activating the sensor unit 190.

If the token is invalid, in operation 311, the control module 120 may perform a control to terminate the payment application. When a screen is terminated, the control module 120 may output guide information for screen termination reason (for example, taken validity loss). Alternatively, in operation 311, the control module 120 may control a token related specified guide information output. For example, the control module 120 may perform a control to output a message for requesting token update. Alternatively, the control module 120 may perform a control to output server device address information for token update to the display 150.

In operation 313, the control module 120 may determine whether an NFC device is detected. If the NFC device is detected within a specified period, in operation 315, the control module 120 may determine whether NFC method payment is completed. When the NFC method payment is completed, in operation 317, the control module 120 may output payment completion guide information. When the NFC method payment is not completed, in operation 319, the control module 120 may perform error processing. For example, the control module 120 may control a warning message output for abnormal operation.

In operation 313, when the NFC device is not detected, while operating the MST method, in operation 321, the control module 120 may determine whether a specified time elapses. If the specified time elapses, in operation 323, the electronic device 100 may output a retry screen. For example, the electronic device 100 may output, to the display 150, a virtual key button prepared for re-performing the MST method.

In operation 325, the control module 120 may determine whether an event relating to barcode method switch occurs. In relation to this, the control module 120 may output a barcode method switch related virtual key button to the retry screen. According to various embodiments of the present disclosure, the control module 120 may output barcode method switch related virtual key buttons in operation 309 and operation 313. When a barcode method switch related event occurs, in operation 327, the control module 120 may provide a barcode method operation screen. For example, the control module 120 may output barcode information stored in the security memory 165 to the display 150. During this operation, the control module 120 may increase a barcode recognition rate by adjusting the brightness of the display 150 to a specified value. The control module 120 may restore the brightness of the display 150 to an original setting after a specified time elapses.

If a specified time does not elapse in operation 321 or event relating to barcode method switch does not occur in operation 325, the control module 120 may branch into operation 313 and perform the subsequent operations again. In operation 327, after barcode method operation screen is provided, the control module 120 may determine whether there is an event occurrence relating to function termination. If there is no function termination related event occurrence, the control module 120 may branch into operation 313 and perform the subsequent operations again. According to various embodiments of the present disclosure, after operation 305, operation 311, operation 317, and operation 319, the control module 120 may branch into operation 329 and perform a branch according to whether termination is made.

According to various embodiments of the present disclosure, after the barcode method operation screen is provided or MST signals are transmitted, the control module 120 may determine whether a payment completion condition is satisfied. When the payment completion condition is satisfied, the control module 120 may perform a control to terminate application execution.

Figure 3B:
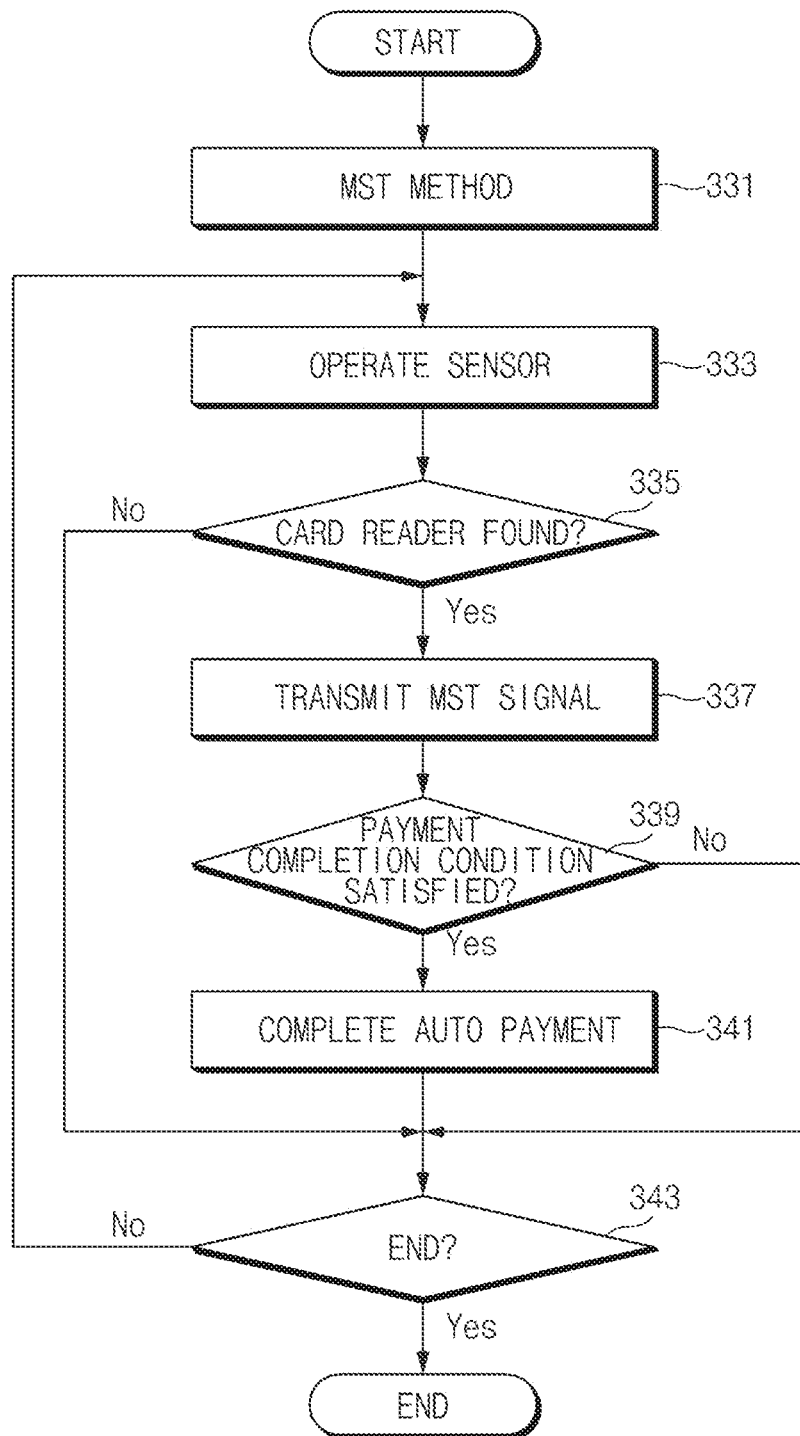
FIG. 3B is a flowchart illustrating a magnetic security transmit (MST) type payment processing method of an electronic device according to various embodiments of the present disclosure.

FIG. 3B is a flowchart illustrating an MST type payment processing method of an electronic device according to various embodiments of the present disclosure.

Referring to FIG. 3B, in relation to the MST type payment processing method, in operation 331, the control module 120 may receive an MST method operation related event. In relation to the MST method operation, in operation 333, the control module 120 may perform a sensor operation. For example, the control module 120 may collect sensor information by using at least one of a high frequency sensor, an acceleration sensor, a gyro sensor, an illumination sensor, a proximity sensor, and a heart rate sensor, which are included in the sensor unit 190.

In operation 335, the control module 120 may determine whether a magnetic card reader is found. For example, the control module 120 may transmit a specified high frequency signal by using a collected high frequency sensor and receive a high frequency signal corresponding thereto, thereby determining whether the magnetic card reader is within a specified distance. Alternatively, the control module 120 may determine whether there is a specific object (for example, an object expected as a magnetic card reader) around by using a proximity sensor or an illumination sensor. Alternatively, the control module 120 may determine whether a user performs a specified gesture operation (for example, an operation that a user takes an electronic device (for example, a smartphone or a wearable device) to a magnetic card reader) by using sensor information of an acceleration sensor, a gyro sensor, and a heart rate sensor. According to various embodiments of the present disclosure, the control module 120 may collect surrounding images by operating the camera 180 and determine whether an object corresponding to a magnetic card reader is detected.

When a card reader is found, in operation 337, the control module 120 may transmit MST signals. For example, the control module 120 may transmit MST signals stored in the security memory 165. During this operation, the control module 120 may output, to the display 150, which direction MST signals are transmitted. Through this, the control module 120 may guide a user to allow an electronic device to be in a specific state.

In operation 339, the control module 120 may determine whether a payment completion condition is satisfied. For example, when a subject is captured by activating the camera 180 and the size of the subject changes from more than a certain size into less than a specified size or the subject disappears, the control module 120 may determine this as payment completion. Additionally, when a specified notification sound is received through a microphone within a specified time range (for example, while MST signals are transmitted), the control module 120 may determine this as payment completion. Alternatively, the control module 120 may determine the content of the received message during a specified time (for example, during an MST signal transmission time or within a specified time after MST signal transmission). When payment completion content is include in the content, the control module 120 may determine this as payment completion.

When the payment completion condition is satisfied, in operation 341, the control module 120 may perform auto payment completion. For example, the control module 120 may perform a control to output guide information for guiding payment completion. When the payment completion condition is not satisfied, in operation 343, the control module 120 may determine an event occurrence for payment termination and process the payment termination. For example, the control module 120 may process payment termination in response to an input signal occurrence according to a hardware back key selection. Alternatively, in operation 343, if a payment termination related event does not occur, the control module 120 may branch into operation 333 and perform the subsequent operations again.

Figure 3C:
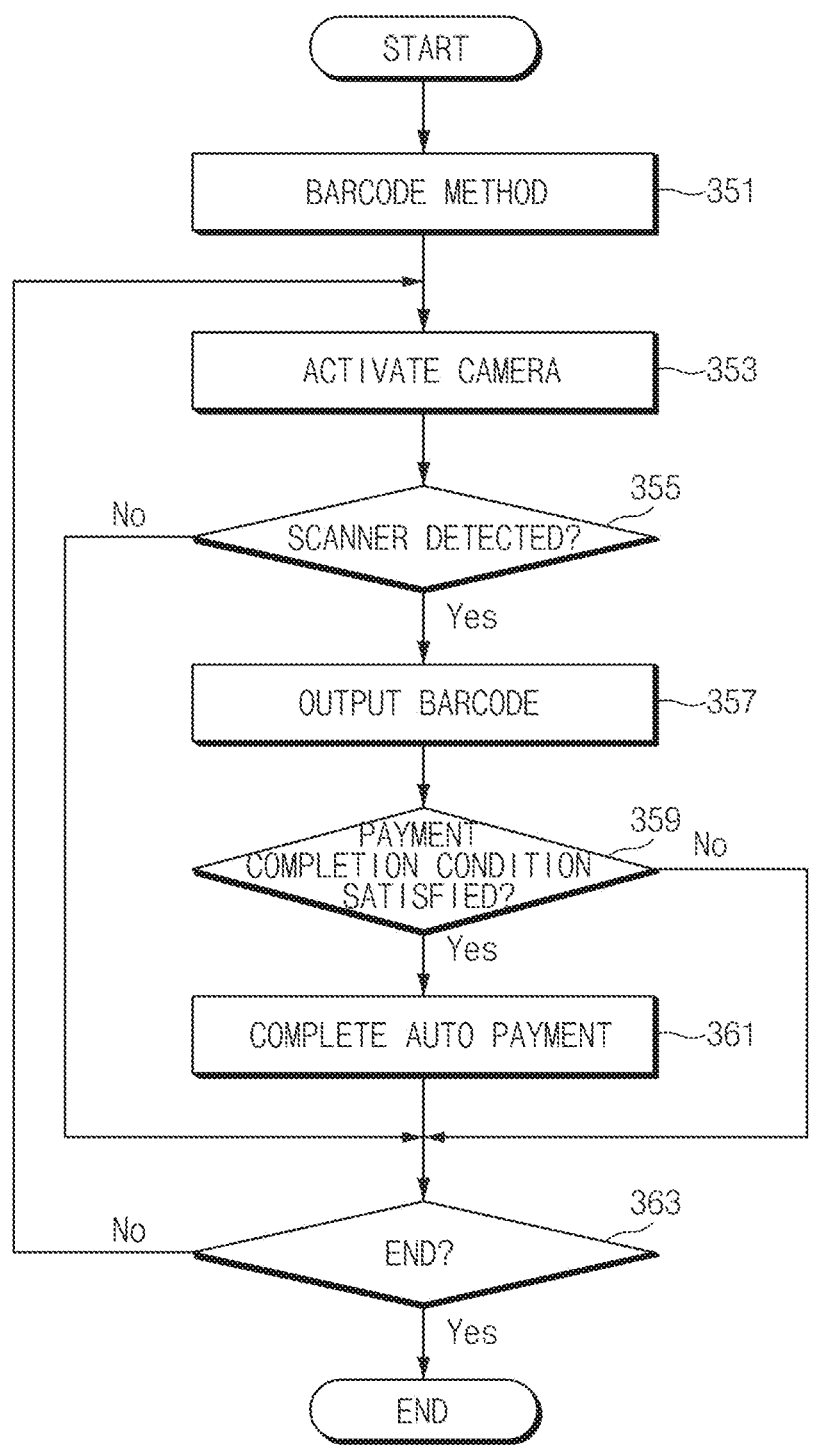
FIG. 3C is a flowchart illustrating a barcode type payment processing method of an electronic device according to various embodiments of the present disclosure.

FIG. 3C is a flowchart illustrating a barcode type payment processing method of an electronic device according to various embodiments of the present disclosure.

Referring to FIG. 3C, in relation to the barcode type payment processing method, in operation 351, the control module 120 may receive an event for requesting a bar code method operation. For example, the control module 120 may receive an event according to a virtual key button selection for a barcode method operation. Alternatively, the control module may perform a control to operate the barcode method in addition to the NFC method and the MST method according to a specified scheduling.

In operation 353, the control module 120 may activate the camera 180. For example, the control module 120 may activate the first camera 181 disposed at the front and analyze the obtained image. In operation 355, the control module 120 may perform scanner detection based on the analyzed image. For example, the control module 120 may determine whether a specified subject corresponding to a scanner or a barcode recognition device is in the analyzed image. Additionally, the control module 120 may determine whether the size of a specified subject is a specified size or the specified subject is detected within a specified distance.

When the specified subject is detected, in operation 357, the control module 120 may perform a control to output a barcode to the display 150. In operation 359, the control module 120 may determine whether a payment completion condition is satisfied. For example, the control module 120 may determine whether a specified time elapses after barcode output, whether the size of a specified subject changes from more than a certain size into less than a specified size or the specified subject disappears, whether a specified notification sound is collected by using a microphone, whether payment is completed, and whether a message including content is received.

When at least one condition among the above payment completion conditions is satisfied, in operation 361, the control module 120 may process this as auto payment completion. For example, the control module 120 may perform a control to output specified payment completion information to the display 150. Alternatively, when receiving a payment completion message, the control module 120 may perform a control to automatically output a corresponding payment completion message to the display 150. When the payment completion condition is not satisfied, in operation 363, the control module 120 may determine whether a manual input (for example, hardware back key input) for payment termination occurs. If a function termination related event does not occur, the main control module 120 may return to operation 353 and perform the subsequent operations again.

Figure 4:
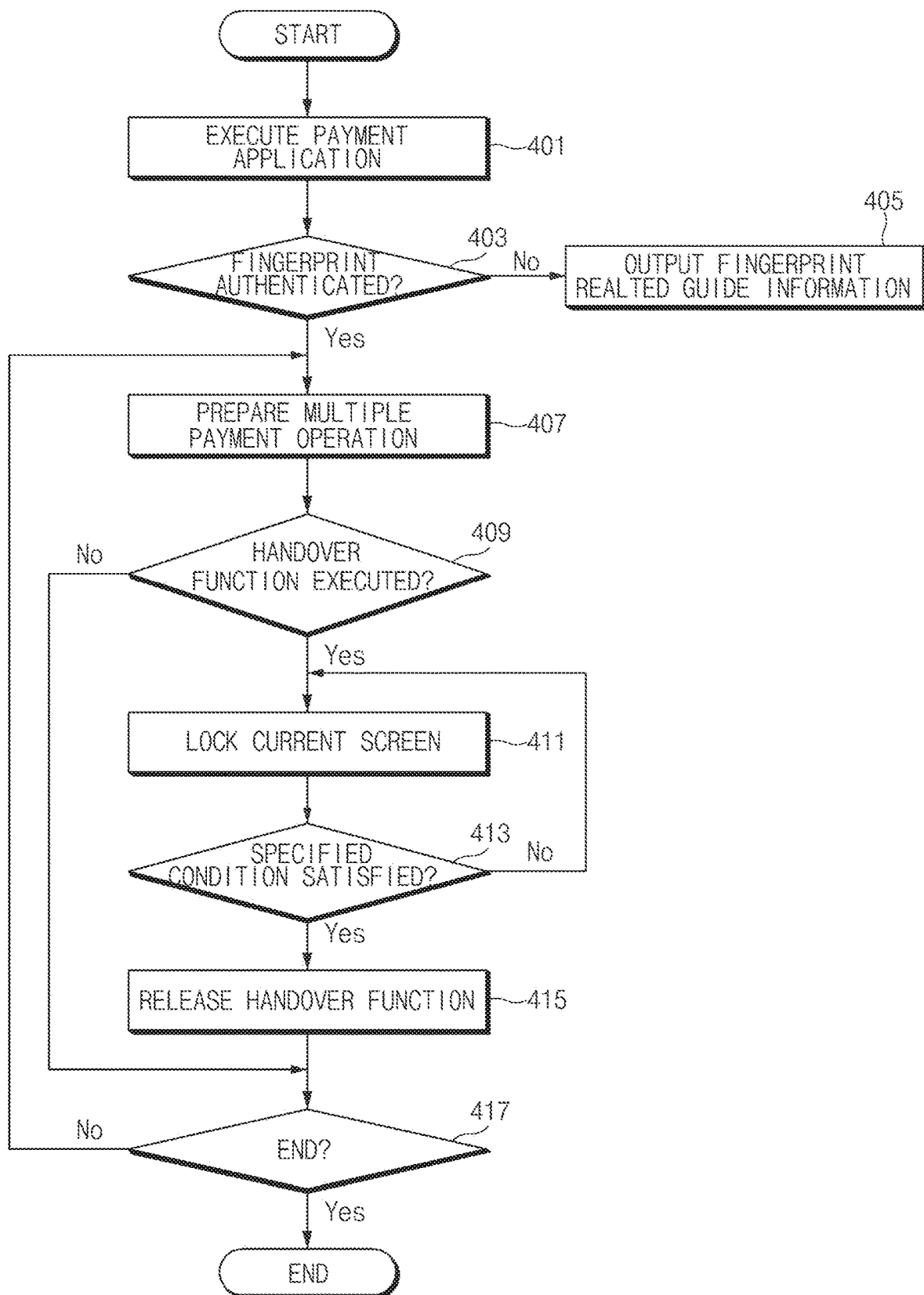
FIG. 4 is a flowchart illustrating a handover function in a payment processing method according to various embodiments of the present disclosure.

FIG. 4 is a flowchart illustrating a handover function in a payment processing method according to various embodiments of the present disclosure.

Referring to FIG. 4, in relation to a handover function, in operation 401, the control module 120 may execute payment application. The control module 120 may activate a fingerprint sensor in correspondence to the payment application execution. When fingerprint sensor initialization is completed, the control module 120 may output an object or guide information for guiding fingerprint detection.

In operation 403, the control module 120 may determine whether fingerprint authentication is successful. When the fingerprint authentication fails, in operation 405, the control module 120 may output fingerprint related guide information. For example, the control module 120 may perform a procedure for performing fingerprint authentication again when the fingerprint authentication fails.

When the fingerprint authentication is successful, in operation 407, the control module 120 may prepare a multiple payment operation. For example, the control module 120 may prepare a multiple payment operation of the NFC method and the MST method. During this operation, the control module 120 may activate the NFC chip 161 and operate the sensor unit 190 for determining an MST signal transmission time point. At the same time, the control module 120 may perform an input setting (for example, an output of a virtual key button relating to handover function execution) relating to handover function execution.

In operation 409, the control module 120 may determine whether a handover function execution request occurs. For example, the control module 120 may determine whether a virtual key button selection signal for handover function execution occurs. When the virtual key button selection signal occurs, the control module 120 may determine that the handover function execution request occurs. According to various embodiments of the present disclosure, while preparing a multiple payment operation, the control module 120 may recognize the current user's face by activating the camera 180. When a specified user's face is not recognized from an image obtained by the camera 180, the control module 120 may determine this as a handover function execution request.

When the handover function execution request occurs, in operation 411, the control module 120 may lock the current screen. During this operation, the control module 120 may perform a control to continuously output the current screen. Additionally, the control module 120 may perform processing to allow the brightness of the display 150 to be a specified value. Additionally, the control module 120 may perform processing to allow a sleep state entry of the display 150 to be a specified value.

In operation 413, the control module 120 may determine whether a specified condition is satisfied. If the specified condition is not satisfied, the control module 120 may branch into operation 411 and maintain the screen lock state. The specified condition, for example, may be a condition that a user fingerprint is to be recognized again. The specified condition may include at least one of a specified pattern lock release condition, a specified number lock release condition, and a specified voice lock release condition. Alternatively, the specified condition may be a sensor information collection corresponding to a specified gesture. Alternatively, the specified condition may be a specified time elapse condition after payment completion.

According to various embodiments of the present disclosure, the control module 120 may maintain the screen lock state but when a specified time elapses, turn-off the display 150. When a specified input event occurs after turning off the display 150, the control module 120 may output a previous screen lock state screen. Until the specified condition is satisfied, the control module 120 may continuously maintain the screen lock state.

If the specified condition is satisfied, in operation 415, the control module 120 may release the handover function. For example, the control module 120 may release the screen lock state and perform a control to return to the payment application execution screen. In a state that the specified condition according to payment completion is completed, if the handover function is released (for example, a screen lock release according to authentication execution after payment completion), the control module 120 may output guide information according to the payment completion to the display 150. When the specified condition is satisfied in a state that the payment completion is not made, the control module 120 may output a screen corresponding to a payment incompletion state. Alternatively, the control module 120 may output a screen corresponding to a payment error processing state.

In operation 417, the control module 120 may determine whether there is an event occurrence relating to function termination. If a function termination related event occurs, the control module 120 may terminate the payment application execution and turn off the display 150. If there is no function termination related event occurrence, the control module 120 may branch into operation 407 and perform the subsequent operations again.

According to various embodiments of the present disclosure, a payment processing method of an electronic device may include performing fingerprint detection and outputting a signal processing information according to an NFC method operation and a signal processing information according to the MST method operation as one screen interface when fingerprint information obtained through the fingerprint detection is valid.

Figure 5:
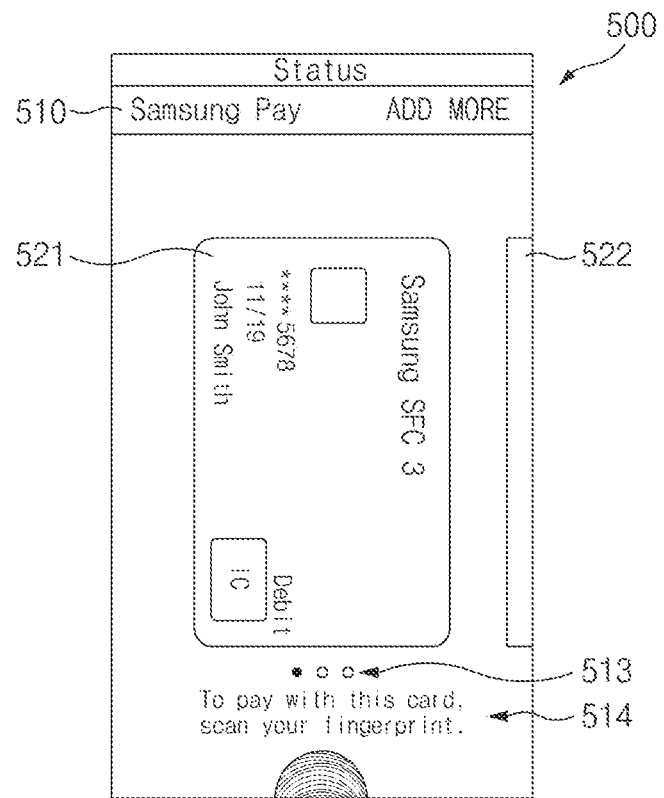
FIG. 5 illustrates a payment application execution screen of an electronic device according to various embodiments of the present disclosure.

FIG. 5 illustrates a payment application execution screen of an electronic device according to various embodiments of the present disclosure.

Referring to FIG. 5, the display 150 of the electronic device 100 may output a payment application execution screen 500. The payment application execution screen 500, for example, may include a menu object 510, a first virtual card object 521, a second virtual card object 522, a first total card information object 513, and scan guide information 514.

The menu object 510 may include an application name, an add item ADD for adding a virtual card, and an item MORE relating to application setting. When the add item ADD is selected, the control module 120 may provide a screen interface relating to a virtual card addition. When the item MORE is selected, the control module 120 may provide a screen interface relating to a total virtual card setting or a virtual card operation method setting.

The first virtual card object 521, for example, may be a specified virtual card. For example, the first virtual card object 521 may be an object corresponding to the most recently used virtual card. Alternatively, the first virtual card object 521 may be the most recently registered virtual card object. Alternatively, the first virtual card object 521 may be a virtual card object that is the most frequently used during a specified period.

The first virtual card object 521 may be provided as an initial screen when payment application is executed. The first virtual card object 521, as shown in the drawing, may be outputted with a certain size at the center of the screen.

The second virtual card object 522 may be the second most recently used virtual card object. Alternatively, the second virtual card object 522 may be the second most recently registered virtual card object or the second most frequently used virtual card object. Alternatively, the second virtual card object 522 may be an object relating to the first virtual card object 521. For example, the second virtual card object 522 may be a point or discount card relating to the first virtual card object 521. As shown in the drawing, a partial image of the second virtual card object 522 may be outputted. When a swipe touch event, or a flick touch event, or a drag event occurs, or an event for touching the second virtual card object 522 occurs, the second virtual card object 522 may be outputted at the position of the first virtual card object 521.

The first total card information object 513 may have the number corresponding to the number of virtual card objects. As shown in the drawing, the first total card information object 513, for example, may represent a state that three virtual card objects are registered in a payment application. The first total card information object 513 may indicate the order of the currently displayed virtual object. For example, the first total card information object 513 may intuitively display position information on what number in the order of total virtual card objects the currently displayed virtual card object corresponds by displaying the color of a specific point of an object to be different from the surrounding.

The scan guide information 514 may include information for guiding fingerprint detection necessary for operating the currently displayed virtual card object. When the currently displayed virtual card object (for example, the first virtual card object 521) does not require scan (for example, fingerprint detection), the scan guide information 514 may not be displayed. For example, when a displayed virtual card object (for example, a virtual card object displayed more than a specified area) is a point card or a discount card, the scan guide information 514 may not be displayed or another guide information (for example, discount information, point saving guide information, and the like). The scan guide information 514 may include at least one of a text for guiding that fingerprint detection is required and an image (for example, a partial image of a fingerprint) corresponding to a position for fingerprint detection.

FIGS. 6A, 6B, 6C, and 6D illustrate a card search screen interface of an electronic device according to various embodiments of the present disclosure.

Referring to FIGS. 6A, 6B, 6C, and 6D, the control module 120 of the electronic device 100 may output a payment application execution screen to the display 150 as shown in FIG. 6A. The payment application execution screen, as described with reference to FIG. 5, may include a first virtual card object 521, a second virtual card object 522, a second total card information object 603, and scan guide information 514. The second total card information object 603 may correspond to the number of virtual card objects registered in a payment application. For example, the second total card information object 603 may include an image corresponding to the number of six registered virtual card objects.

When a specified event occurs, the control module 120, as shown in FIG. 6B, may output a card thumbnail list 610. For example, when an event for selecting the first total card information object 513 occurs or a specified gesture event (for example, a long tap touch event occurring at a specified position) occurs, the control module 120 may output the card thumbnail list 610. Although it is shown in the drawing that the card thumbnail list 610 is disposed at the screen lower end, various embodiments of the present disclosure are not limited thereto. For example, the card thumbnail list 610 may be outputted in full screen. Additionally, in relation to the card thumbnail list 610, card thumbnail objects may be disposed in a matrix and displayed.

The card thumbnail list 610, for example, may include a first card thumbnail object 611, a second card thumbnail object 612, a third card thumbnail object 613, a fourth card thumbnail object 614, a fifth card thumbnail object 615, and a sixth card thumbnail object 616. The first card thumbnail object 611, for example, may include a thumbnail image of the first virtual card object 521. Similarly, the Nth card thumbnail object may include a thumbnail image of the Nth card thumbnail object. The card thumbnail list 610 may display a card thumbnail object corresponding to a virtual card image disposed at the center of the current screen to be different from another card thumbnail object. For example, the first card thumbnail object 611 corresponding to the first virtual card object 521 displayed in full screen on the display 150 may be displayed with a highlight effect.

Additionally, a card thumbnail object displayed in the card thumbnail list 610 may be selected by a user. For example, the third card thumbnail object 613 may be selected by a touch event. When an input signal for selecting the third card thumbnail object 613 occurs, the control module 120, as shown in FIG. 6C, may display the third virtual card object 523 corresponding to the selected third cad thumbnail object 613 at the screen center. During this operation, the control module 120 may remove the card thumbnail list 610 from the display 150 and output the second total card information object 603 and the scan guide information 514. Herein, when the third virtual card object 523 is a card necessary for additional scan, an output of the scan guide information 514 may be omitted.

The second total card information object 603 may have a different display form according to a display of the third virtual card object 523. For example, in relation to the second total card information object 603, a point corresponding to the order of the third virtual card object 523 may be displayed different from a surrounding area. As the third virtual card object 523 is disposed at the screen center, the control module 120 may perform a control to display a partial image of the second virtual card object 522 at the left edge and display a partial image of the fourth virtual card object 524 at the right edge. When a left swipe touch event (or a flick event or a drag event) occurs, the control module 120 may perform a control to arrange the fourth virtual card object 524 at the screen center. Additionally, when a right swipe touch event (or a flick event or a drag event) occurs, the control module 120 may perform a control to dispose the second virtual card object 522 at the screen center.

According to various embodiments of the present disclosure, when the third virtual card object 523 is disposed at the screen center, the control module 120 may dispose a card object relating to the third virtual card object 523 at the position of the second virtual card object 522 and the position of the fourth virtual card object 524. The related card object, for example, may include a point or discount card relating to the third virtual card object 523 or a card including the same card name of more than a specified length. A point card or a discount card, for example, may be registered as a related card according to a user setting during a third virtual card registration process. Cards having the same card name of more than a specified length may be automatically registered as a related card according to a control of the control module 120. If there is no related card object, the control module 120 may dispose virtual card objects according to the order of the card thumbnail list 610.

According to various embodiments of the present disclosure, as shown in FIG. 6D, the control module 120 may support an order conversion in the card thumbnail list 610. For example, when an event relating to a movement of the first card thumbnail object 611 (for example, an event for long-pressing the first card thumbnail object 611) occurs, the control module 120 may display the first card thumbnail object 611 to be in a state of converting the order in the card thumbnail list 610. For example, the control module 120 may display the first card thumbnail object 611 with a different layer from another card thumbnail object. When an event (for example, a drag event) for moving the first card thumbnail object 611 occurs, the control module 120 may move the first card thumbnail object 611 according to a corresponding event. The control module 120 may change the positions of other card thumbnail objects according to a movement of the first card thumbnail object 611. For example, when the first card thumbnail object 611 is moved and overlaps more than the middle of the second card thumbnail object 612, the second card thumbnail object 612 may be automatically moved to a position where the first card thumbnail object 611 was located before. When an event for selecting the first card thumbnail object 611 is released, the first card thumbnail object 611 may be disposed at the event released position.

According to various embodiments of the present disclosure, when the first card thumbnail object 611 is moved and disposed at a specified position, the first card thumbnail object 611 may be replaced with a card thumbnail object disposed at a corresponding position. For example, when a touch event is released in a state that the first card thumbnail object 611 overlaps the sixth card thumbnail object 616 by more than a specified size, the first card thumbnail object 611 moves to a place where the sixth card thumbnail object 616 was located and the sixth card thumbnail object 616 moves to a place where the first card thumbnail object 611 was located.

According to various embodiments of the present disclosure, although it is exemplarily described above that a thumbnail object is disposed in relation to virtual cards, various embodiments of the present disclosure are not limited thereto. For example, the card thumbnail object may be in a card object list form using each card name as a list.

According to various embodiments of the present disclosure, although it is exemplarily described above that the entire virtual card objects are displayed in the card thumbnail list 610, various embodiments of the present disclosure are not limited thereto. For example, a card thumbnail list may include a scroll bar or a scroll control virtual key for displaying only some of the entire virtual thumbnail objects and displaying the remaining objects later.

FIGS. 7A, 7B, 7C, and 7D illustrate a payment completion screen interface of an electronic device according to various embodiments of the present disclosure.

Figure 7A:
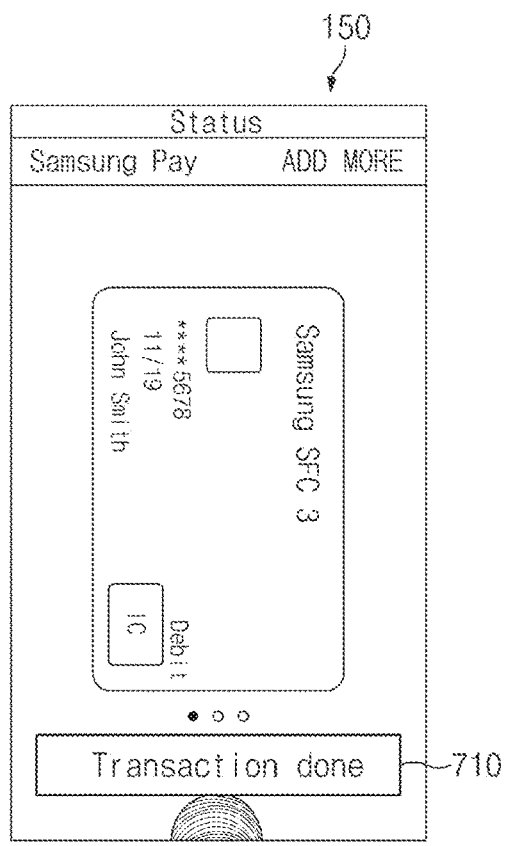
FIGS. 7A, 7B, 7C, and 7D illustrate a payment completion screen interface of an electronic device according to various embodiments of the present disclosure.

Referring to FIGS. 7A, 7B, 7C, and 7D, as shown in FIG. 7A, the control module 120 may output a payment completion message 710 when payment is completed. For example, in a case that payment is completed through an NFC chip, the control module 120 may output the payment completion message 710 when a specified condition corresponding to payment completion is satisfied during an MST method or barcode method operation. During this operation, if the brightness of the display 150 is adjusted during a payment processing process, the control module 120 may restore the brightness of the display 150 to a previous value. Additionally, in a case that a lamp blinks in order to guide that payment in progress during a payment processing process, the control module 120 may turn off the lamp according to the payment completion. Alternatively, the control module 120 may perform a control to output a specified vibration pattern corresponding to the payment completion.

Figure 7B:
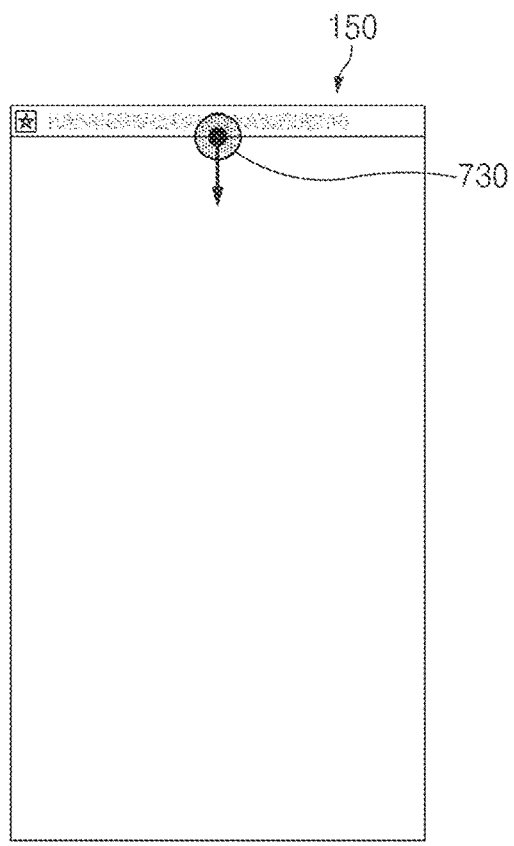

An event relating to quick panel call disposed at a certain position of the display 150, for example, at the top end of the display 150, may occur as shown in FIG. 7B. For example, when a quick panel call touch event 730 moving from a specified position (for example, the display area outside) at the upper end of the display 150 to the inside of the display 150 (for example, the display area inside) occurs, the control module 120 may dim out a certain area of the display 150 (for example, display it the certain area less than a specified illumination).

Figure 7C:
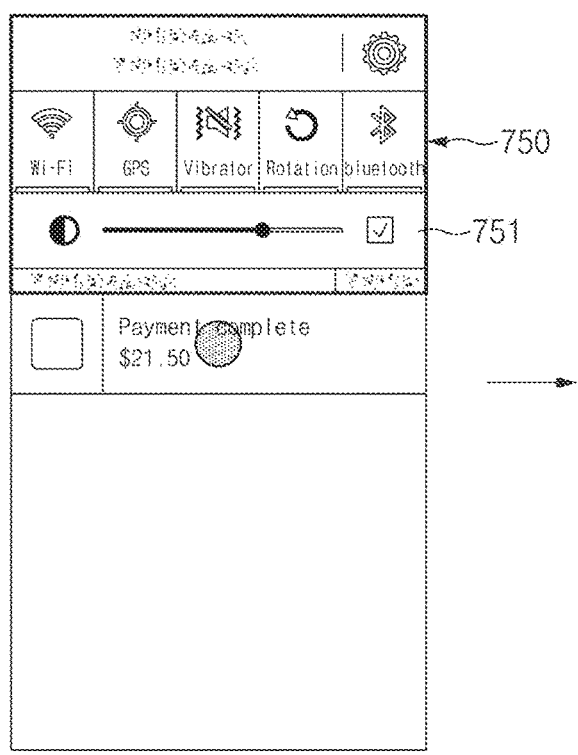
Figure 7D:
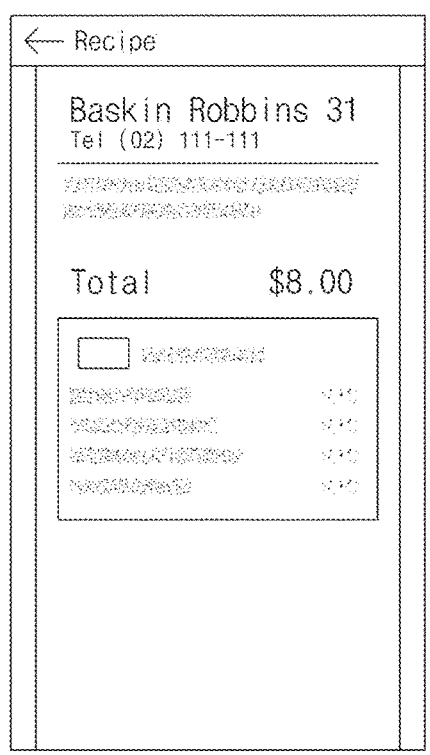

When the quick panel call touch event 730 occurs, the control module 120 may output a quick panel 750 to the display 150 as shown in FIG. 7C. The quick panel 750, for example, may include a payment completion item 751. When an event for selecting the payment completion item 751 occurs, the control module 120 may output a payment completion information screen as shown in FIG. 7D. The payment completion information screen, for example, may include a message provided from a server device that performs payment processing or information processed based on a corresponding message (for example, information obtained by extracting specified information, such as payment card information, payment place information, payment amount information, and the like).

Figure 8A:
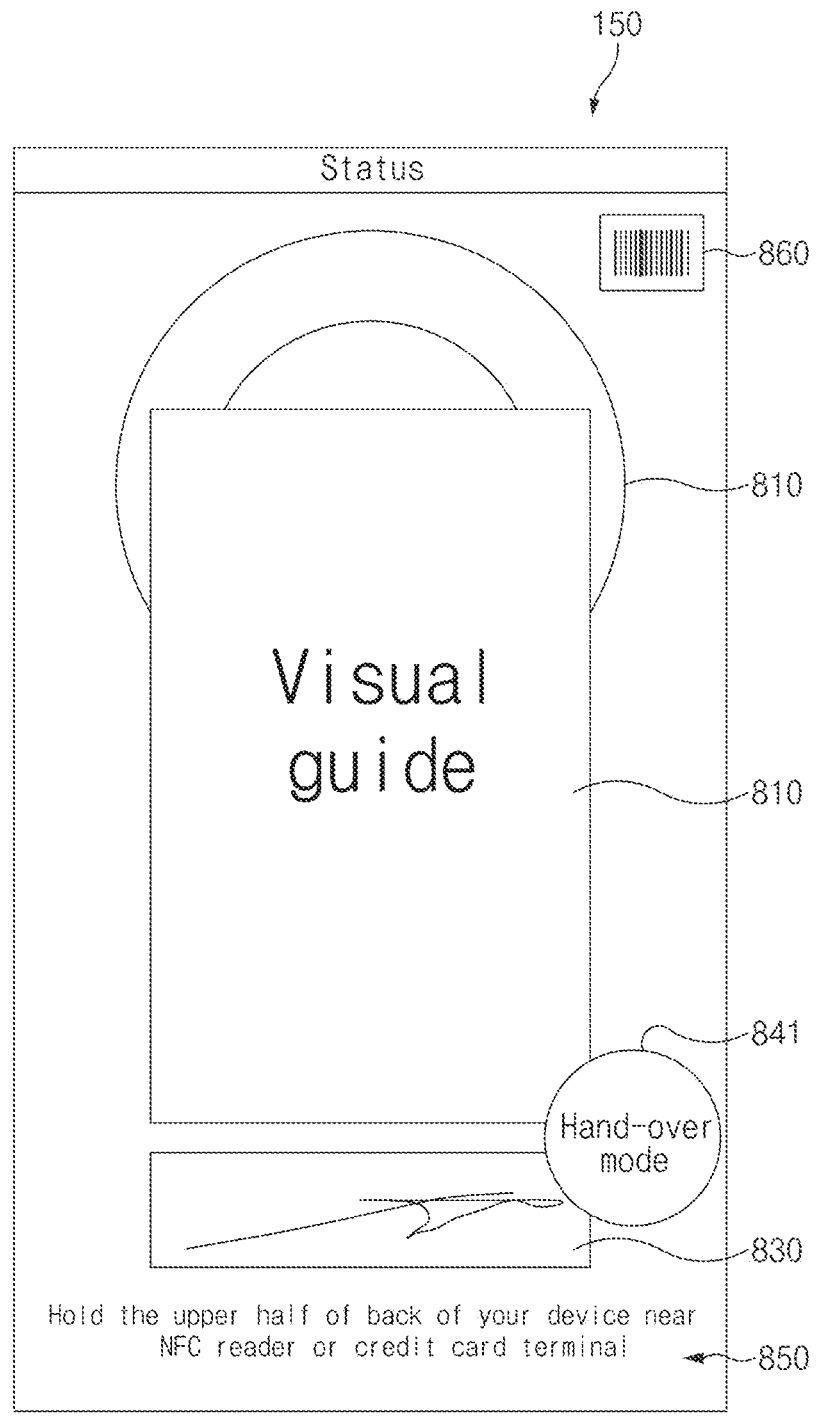
FIG. 8A illustrates an NFC method and MST method supporting screen of an electronic device according to various embodiments of the present disclosure.

FIG. 8A illustrates an NFC method and MST method supporting screen of an electronic device according to various embodiments of the present disclosure.

Referring to FIG. 8A, if fingerprint authentication is completed after a payment application is executed, the control module 120 may perform a control to output a multiple payment operation screen to the display 150. The multiple payment operation screen, for example, may include a signal transmission object 810, a first visual guide information object 820 for describing a payment method, a signature object 830, a first handover function execution object 841, a pose guide object 850, and a barcode switch object 860.

The signal transmission object 810 may be outputted after fingerprint recognition is completed. The signal transmission object 810, for example, may be outputted in a wave animation form. The signal transmission object 810 may guide a user to take the electronic device 100 to the payment processing device 200 by providing a feedback that a signal starts to be transmitted, to the user. The position of the signal transmission object 810 may have a screen configuration in which the signal transmission object 810 is disposed on the top of an MST coil to guide the electronic device 100 to a corresponding position naturally.

According to various embodiments of the present disclosure, the signal transmission object 810 may be information for guiding an NFC signal transmission direction or an MST signal transmission direction. According to an embodiment of the present disclosure, the signal transmission object 810 may be set to indicate a direction that signals are transmitted through an NFC antenna or an MST coil. The signal transmission object 810 may be displayed while NFC signals are transmitted or MST signals are transmitted. In relation to the signal transmission object 810, the color of a signal transmission object corresponding to NFC signal transmission may be different from the color of a signal transmission object corresponding to MST signal transmission. Alternatively, the signal transmission object 810 may include a character indicating NFC displayed at a fixed position during NFC signal transmission or a character indicating NFC moving in a specified direction (for example, a direction that signals are transmitted). Similarly, the signal transmission object 810 may include a character indicating MST displayed at a fixed position during MST signal transmission or a character indicating MST moving in a specified direction (for example, a direction that signals are transmitted). According to various embodiments of the present disclosure, when the NFC method and the MST method operate alternatively, the electronic device 100 may intuitively represent what type of signals are transmitted currently through a change of the characters.

The first visual guide information object 820 may include a video image or a slide image. For example, the first visual guide information object 820 may include information representing how to operate the electronic device 100 in relation to a multiple payment method and what kind of state the electronic device 100 is in currently.

The signature object 830 may be an object for receiving a user's signature. The signature object 830, for example, may be displayed with an empty area and output signature information corresponding to a user's touch gesture. The signature object 830 may not be outputted according to the type of a virtual card. For example, when a point card or a discount card operates, the signature object 830 may not outputted.

The first handover function execution object 841 may be a virtual key button for switching to a handover function. When the first handover function execution object 841 selected, the control module 120 may enter the current screen lock state according to a handover function execution. When a handover function is executed, the control module 120 may output guide information relating to fingerprint detection for fingerprint sensor activation and handover function release. Alternatively, the control module 120 may output guide information for activating a camera and requesting the capturing of a specified user face. During this operation, a screen lock screen may output a thumbnail preview area relating to user face capturing. The thumbnail preview area, for example, may be a display area where a capturing state is determined while a front camera captures an image. A user may move in correspondence to the focusing position of the front camera by determining the thumbnail preview area.

The pose guide object 85 may include text information for guiding in what kind of form the electronic device 100 is to be positioned.

The barcode switch object 860 may be a virtual key button for switching to a barcode method. When the barcode switch object 860 is selected, a barcode method operation screen as shown in FIG. 8B may be outputted to the display 150.

When the screen (for example, the display) of the electronic device 100 is in a specified pose (for example, facing down), the electronic device 100 may output specified guide information (for example, information for guiding the display of an electronic device to face up).

Figure 8B:
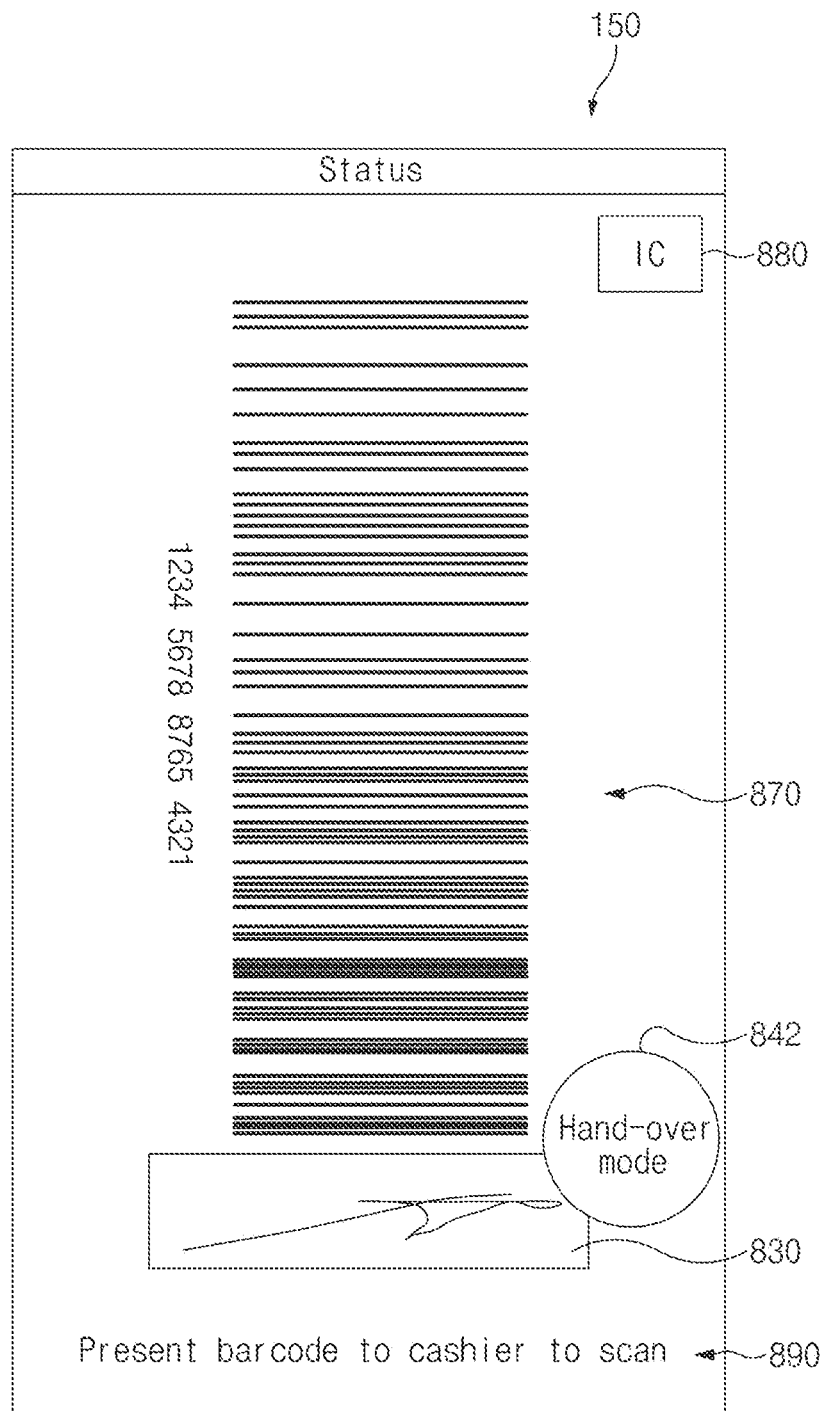
FIG. 8B illustrates a barcode method operation screen of an electronic device according to various embodiments of the present disclosure.

FIG. 8B illustrates a barcode method operation screen of an electronic device according to various embodiments of the present disclosure.

Referring to FIG. 8B, when the barcode switch object 860 described with reference to FIG. 8A is selected, the control module 10, as shown in the drawing, may perform a control to output a barcode method operation screen to the display 150. The barcode method operation screen, for example, may include a barcode object 870, a second handover function execution object 842, a multiple payment method switch object 880, a barcode use guide information 890, and a signature object 830.

The barcode object 870, for example, may include a barcode image and a barcode number information. When the barcode object 870 is outputted, the control module 120 may perform processing to display a barcode image to be brighter than the surrounding. Based on this, the electronic device 100 may reduce scan errors during barcode image scan. Alternatively, the control module 120 may perform a control to the illumination of the display 150 to be more than a specified value during barcode image output.

The second handover function execution object 842 may be the substantially same virtual key button as the first handover function execution object 841 described with reference to FIG. 8A. The second handover function execution object 842 outputted from a barcode method operation screen may be outputted to a specified area not overlapping a barcode image. Alternatively, based on the size of the barcode object 870, the size of the second handover function execution object 842 may be adjusted.

The multiple payment method switch object 880 may be an object relating to a switch to the multiple payment method (for example, a method of operating the NFC method and the MST method in combination) described with reference to FIG. 8A. The multiple payment method switch object 880 may be in a virtual key button form. The multiple payment method switch object 880, for example, may be outputted to a point similar to a point where the barcode switch object 860 of the screen described with reference to FIG. 8A is disposed.

The barcode use guide information 890, for example, may include text information describing an operation of the electronic device 100 in relation to a barcode method operation. Additionally, the barcode use guide information 890 may further include information for guiding to execute a handover function in relation to security during a process for handing over the electronic device 100 to the other person.

The signature object 830 may be identical to the signature object described with reference to FIG. 8A. For example, the signature object 830 may support user signature input.

According to various embodiments of the present disclosure, when a barcode method operation screen is outputted to the display 150, without outputting the second handover function execution object 842, a camera may be activated automatically. The control module 120 may perform processing to automatically execute a handover function if a specified user face recognition is not performed through the camera. If payment application execution is terminated or payment completion information is displayed according to a user input, the control module 120 may automatically release the handover function. In relation to the handover function auto release, the control module 120 may deactivate the activated camera automatically.

Figure 9:
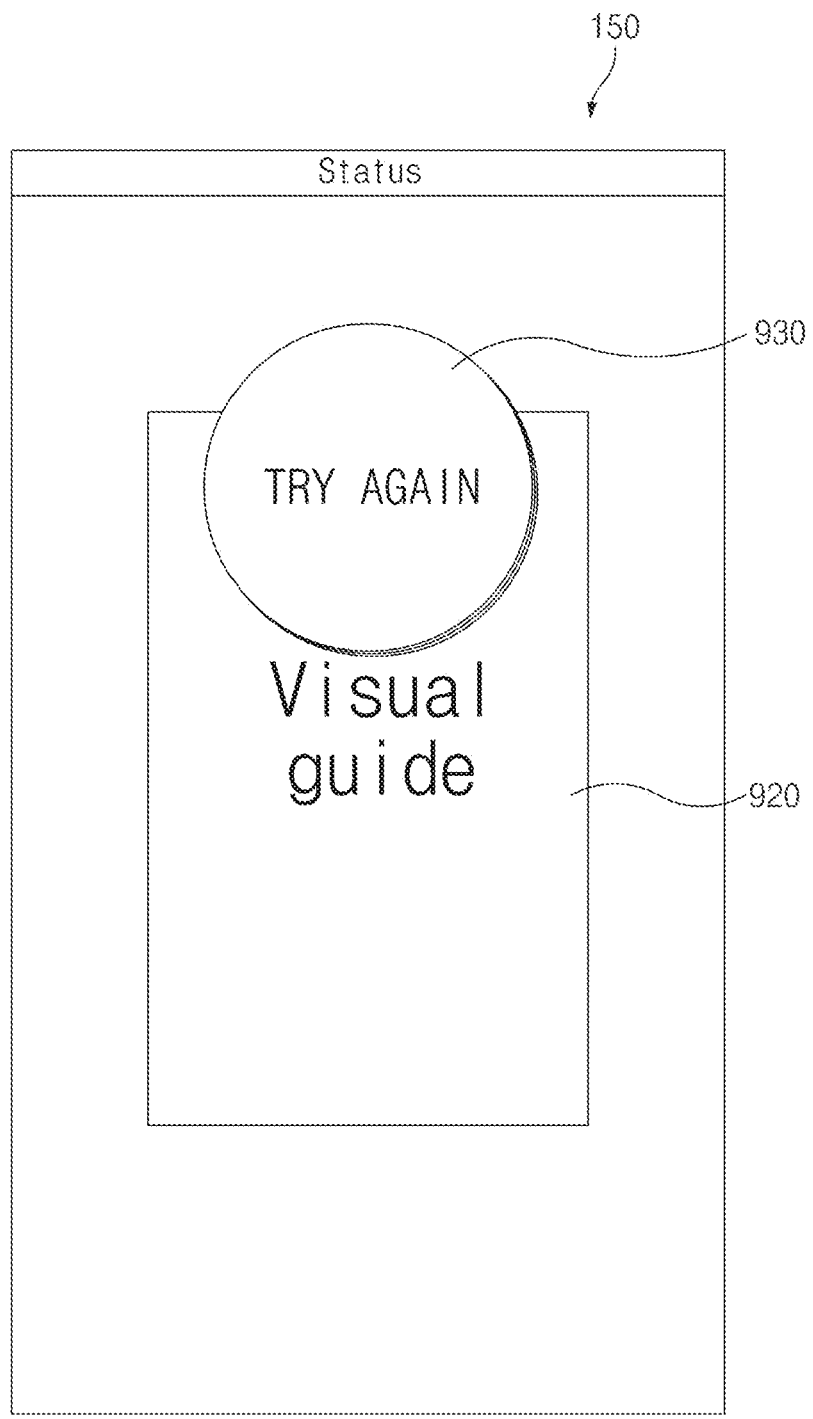
FIG. 9 illustrates a multiple payment operation re-execution screen of an electronic device according to various embodiments of the present disclosure.

FIG. 9 illustrates a multiple payment operation re-execution screen of an electronic device according to various embodiments of the present disclosure.

Referring to FIG. 9, after MST signal transmission, when a specified time elapses, as shown in the drawing, the control module 120 may output a multiple payment operation re-execution screen to the display 150. The multiple payment operation re-execution screen, for example, may include a second visual guide information object 920 and a re-execution object 930.

The second visual guide information object 920 may include a video, a slide image, or a still image relating to an operation for re-executing a multiple payment operation. The second visual guide information object 920 may include different information from the first visual guide information object 820.

The re-execution object 930 may be a virtual key button set to re-execute the multiple payment method. When an event for selecting the re-execution object 930 occurs, the control module 120 may re-execute the multiple payment method operation described with reference to FIG. 8A. Alternatively, according to various embodiments of the present disclosure, while outputting the re-execution object 930, the control module 120 may perform a control to re-execute only the MST signal transmission when the re-execution object 930 is selected under a situation of maintaining the NFC method.

Figure 10B:
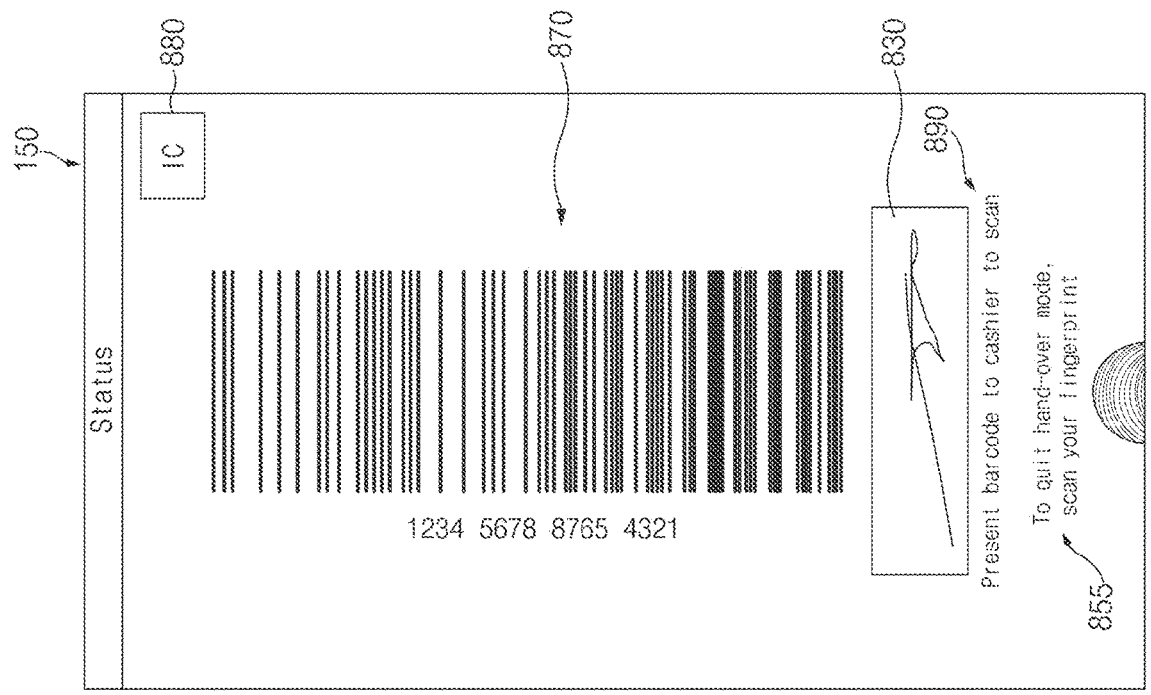
FIGS. 10A and 10B illustrate a handover function execution screen according to various embodiments of the present disclosure.
Figure 10A:
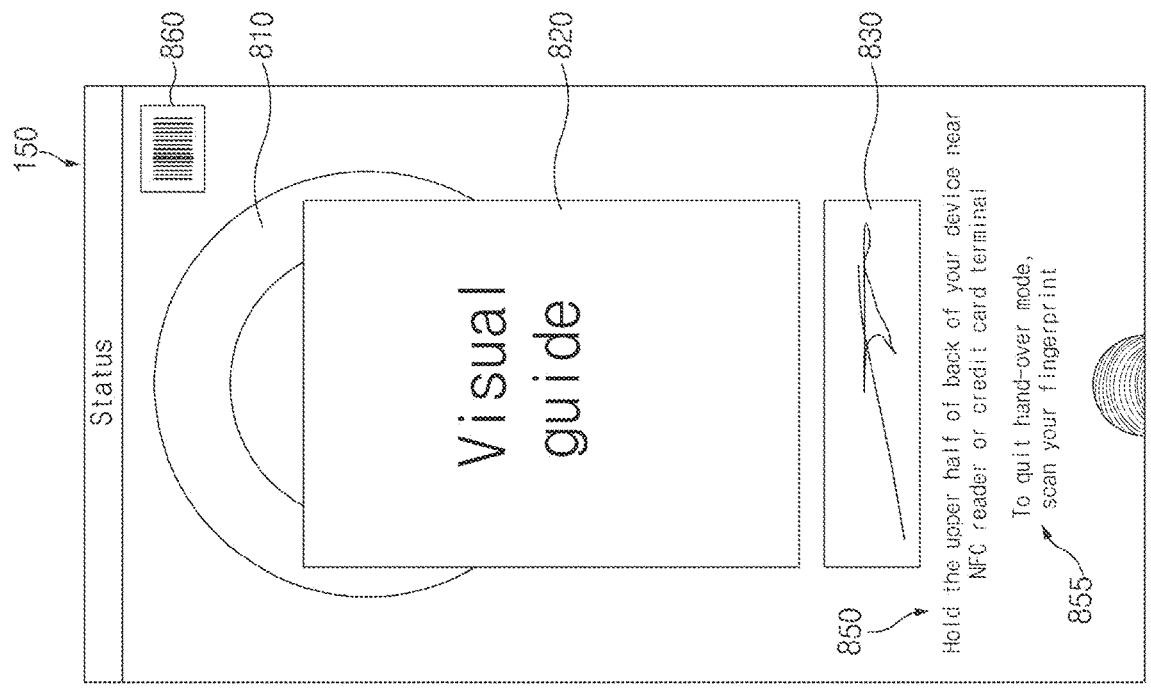

FIGS. 10A and 10B illustrate a handover function execution screen according to various embodiments of the present disclosure.

Referring to FIGS. 10A and 10B, when a payment application is executed, as shown in screen 1001, the control module 120 may perform a control to output a multiple payment operation screen to the display 150. Alternatively, if fingerprint authentication is completed after a payment application is executed, as shown in the screen 1001, the control module 120 may perform a control to output a multiple payment operation screen.

The screen 1001 may be in a state that as a handover function is executed, a multiple payment operation screen is provided in a screen lock state. The multiple payment operation screen where a handover function is executed, for example, may include a signal transmission object 810, a first visual guide information object 820, a pose guide object 850, a barcode switch object 860, and a handover function release guide object 855.

The barcode switch object 860 may be a toggle object for barcode switch among objects for switching a barcode method and a multiple payment method. The barcode switch object 860 may include at least one of image information and text information for guiding barcode switch. The output position of the barcode switch object 860 may be changed according to a user setting. For example, the barcode switch object 860 may be disposed at a position adjacent to the position of a gripping hand.

The handover function release guide object 855 may include information for guiding a processing operation for handover function release. For example, the handover function release guide object 855 may include information for guiding that fingerprint detection is required in order for handover function release.

In the screen 1001, in correspondence to the selection of the barcode switch object 860, a barcode method operation screen may be outputted as shown in a screen 1003. According to various embodiments of the present disclosure, the handover function may allow barcode method switch or multiple payment method switch. Alternatively, the handover function may be set not to allow an operation of a switch object according to a user setting. If the handover function may be set not to allow an operation of a switch object, in a case that a handover function release function is performed, the barcode switch object 860 may be selected. As mentioned above, the control module 120 may support a toggle switch of a multiple payment method or a barcode method.

The barcode method operation screen, as shown in the drawing, may include a barcode object 870, a multiple payment method switch object 880, barcode use guide information 890, and a handover function release guide object 855. As the handover function allows a payment method switch function, when a barcode method switch is requested in a state that the handover function is set during multiple operation screen output, the handover function may be inherited. Accordingly, the barcode method operation method may have a state that the handover function is executed automatically. Additionally, the control module 120 may perform a control to output the handover function release guide object 855 for guiding handover function release. When the multiple payment method switch object 880 is selected, the control module 120 may perform processing to return to the screen 1001.

As mentioned above, according to various embodiments of the present disclosure, a payment processing method may include selecting and displaying one card among a plurality of virtual cards when entering a home screen and displaying guide information for guiding fingerprint recognition at the screen lower end.

According to various embodiments of the present disclosure, the method may further include at least one of entering a fast navigation mode by long-tapping a virtual card and changing the order of virtual cards based on a drag event for a virtual card.

According to various embodiments of the present disclosure, the method may further include displaying at least one of information for guiding by integrating an NFC method and an MST method, which put a card on a specified reader, into one screen, a signal transmission guide object, a visual guide information object, a card signature object, and a handover function execution related object.

According to various embodiments of the present disclosure, the method may further include processing a payment according to an NFC payment method when a card is disposed near an NFC payment processing device after activating an MST method and an NFC method on a multiple payment operation screen of the MST method and the NFC method.

According to various embodiments of the present disclosure, the method may further include determining whether a card is close to a magnetic card reader based on at least one method of a high frequency transmission method through a proximity sensor, a camera of an electronic device, a heart rate sensor, or a speaker in relation to power and payment card token and a high frequency reception method through a microphone and transmitting MST signals when the card is close to the magnetic card reader.

According to various embodiments of the present disclosure, the method may further include performing MST signal transmission for a specified time or a specified number of times and outputting a virtual key button for re-executing the MST signal transmission after the specified period or the specified number of times. The outputting of the virtual key button may include displaying the virtual key button at the center of a wavelength that represents signal transmission.

According to various embodiments of the present disclosure, the method may include automatically terminating a payment operation (or a payment mode or a payment operation) when a card is away from a magnetic card reader by using high frequency transmission through a proximity sensor, a camera of an electronic device, a heart rate sensor, or a speaker and high frequency reception through a microphone.

According to various embodiments of the present disclosure, the method may further include outputting a barcode object to a multiple payment operation screen.

According to various embodiments of the present disclosure, the method may further include automatically terminating a payment operation by detecting a payment completion notification sound of a micro payment processing device.

According to various embodiments of the present disclosure, the method may further include automatically terminating a payment operation when a payment completion related message is received from at least one screen of a multiple payment operation screen and a barcode payment operation screen.

According to various embodiments of the present disclosure, the method may further include outputting a barcode switch object from a multiple payment operation screen, when the barcode switch object is selected, outputting a barcode method operation screen including a barcode object of more than a specified size, outputting an object for switching the barcode method operation screen into the multiple payment operation screen, and outputting the multiple payment operation screen when the multiple payment operation screen switch object is selected.

According to various embodiments of the present disclosure, the method may further include at least one of switching to a barcode screen when a barcode reader is recognized by using a front camera of an electronic device and automatically terminating a payment operation when it is determined through the front camera of the electronic device that the barcode reader is away from the screen.

According to various embodiments of the present disclosure, the method may further include outputting, to a user, information for guiding to maintain a specified pose (for example, a pose that the rear of an electronic device faces down) through vibration and voice after recognizing that the front of the electronic device rotates to the lower end by using a gyro sensor and a front proximity sensor.

According to various embodiments of the present disclosure, the method may further include, as the electronic device is a wearable device, performing a limiting operation to execute a payment when obtaining gesture information corresponding to a specified operation (for example, information obtained by digitizing or patterning an operation for moving a wearable device to a specific place (for example, a point where a reader is located).

According to various embodiments of the present disclosure, the method may further include outputting a handover function object, temporarily stopping a function provided from an electronic device except for a multiple payment operation screen or a barcode operation screen when the handover function object is selected, and releasing the handover function when specified fingerprint information is recognized.

FIGS. 11A, 11B, 11C, 11D, and 11E illustrate a payment execution related screen interface according to various embodiments of the present disclosure.

Referring to FIGS. 11A, 11B, 11C, 11D, and 11E, when a specified event occurs, the electronic device 100, as shown in a screen 1101, may output a payment card image 1110 to the display 150. The electronic device 100, as sown in screens 1101 to 1109, may display a payment available state by outputting a specified image effect to one side of the payment card image 1110. For example, the electronic device 100 may output a circle object 1120 having a gradually changing size to one side (for example, an upper side) of the payment card image 1110. The size changing circuit object 1120 may be disposed at the back of the payment card image 1110. The size changing circuit object 1120, for example, may be changed in a form that the radius is increased gradually. While the size of one circuit object 1120 is changed gradually in a certain area of the payment card image 1110, when the size of the one circuit object 1120 is greater than a certain size, a new circuit object 1130 may be displayed. The new circuit object 1130 may have a different color from the previous circuit object 1120. The new circuit object 1130 may be changed at the same speed as the previous circuit object 1120. During a payment available state, the electronic device 100 may display the screens 1101 to 1109 repeatedly. According to an embodiment of the present disclosure, the electronic device 100 may display a payment state through a pop-up message. According to an embodiment of the present disclosure, the electronic device 100 may notify a user of a payment state by turning on an LED. According to an embodiment of the present disclosure, the electronic device 100 may output MST signals while displaying a payment available state screen. According to an embodiment of the present disclosure, the electronic device 100 may simultaneously or alternately display at least one of a screen among the screens 1101 to 1109 and a barcode form corresponding to token related information.

According to an embodiment of the present disclosure, the electronic device 100 may determine whether an NFC terminal exists within a certain rage of the electronic device 100 while displaying the screens 1101 to 1109. For example, the electronic device 100 may determine the presence of the NFC terminal by detecting signals transmitted from the NFC terminal with the certain range. After the confirmation, the electronic device 100 may process a payment by transmitting a token and encryption information (for example, a cryptogram) to the NFC terminal through an NFC communication method.

When close to or entering a store (that is, an environment for collecting payment POS related information), the electronic device 100 may identify whether NFC, MST, or barcode of a payment POS is supported in advance and change the UI and operation of a payment application based on the identified support information. For example, the electronic device 100 may identify a location through technologies of GPS or an indoor positioning location-based service (LBS) module or identify a location by using location information of a short range or long range network. Based on the location information, the electronic device 100 may identify whether NFC, MST, or barcode of a POS is supported. According to various embodiments of the present disclosure, the electronic device 100 may identify whether NFC, MST, or barcode of a payment POS is supported based on beacon information of Bluetooth or Bluetooth low energy (BLE), or frame data of Wi-Fi. The payment application may operate only one module of NFC/MST/barcode during an actual payment based on the POS information.

According to an embodiment of the present disclosure, the electronic device 100 may guide a direction that the electronic device 100 aims to a user during payment. For example, communication signals for payment may be transmitted through the back of the electronic device 100. In this case, in order to allow the back of the electronic device 100 to be directed to a payment reader, the electronic device 100 may guide a direction that the electronic device 100 is to aim or a state to be taken by the electronic device 100, to a user through a screen (for example, text output, image output, and video output), sound, vibration, or haptic. According to an embodiment of the present disclosure, when it is determined that a payment reader approaches by using a proximity sensor at the front of the electronic device, the electronic device 100 may guide a user that the electronic device 100 should be turned over for payment through audio or allow a user to recognize the payment reader approach through vibration or haptic.

Figure 12:
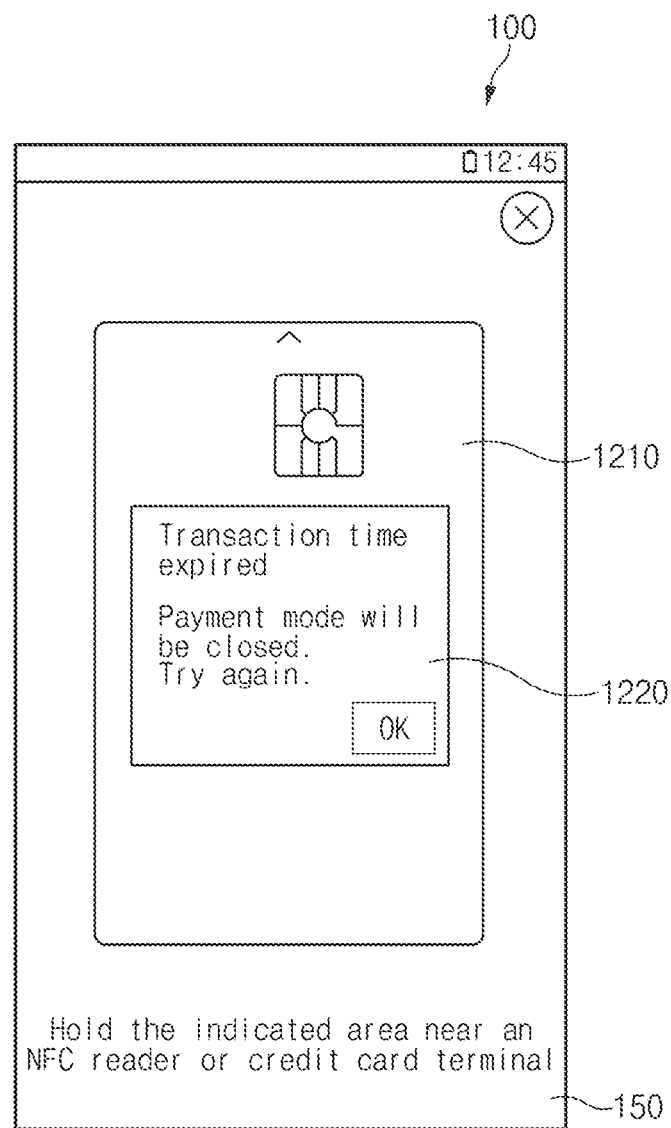
FIG. 12 illustrates a token validity related screen interface according to various embodiments of the present disclosure.

FIG. 12 illustrates a token validity related screen interface according to various embodiments of the present disclosure.

Referring to FIG. 12, when a card related token is not valid, the electronic device 100 may display a screen on the display 150. According to an embodiment of the present disclosure, the electronic device 100 may output a pop-up notification 1220 relating to card validity to the display 150. According to an embodiment of the present disclosure, the pop-up notification 1220 may be displayed on a payment card image 1210. When an event for selecting "OK" (for example, a user touch input or a user voice input corresponding to OK selection) occurs, the electronic device 100 may terminate the payment application. According to an embodiment of the present disclosure, the electronic device 100 may determine whether the token is valid depending on whether a specified use period of a token exceeds, and when a specified use time exceeds, determine that a corresponding token is not valid.

Figure 13:
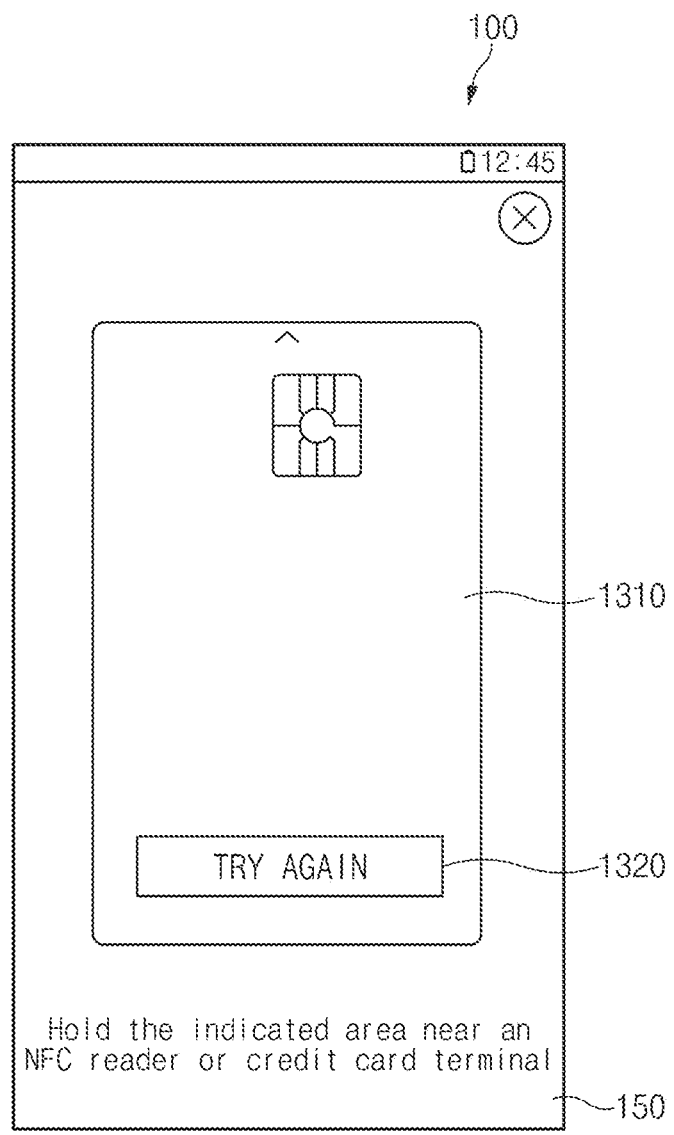
FIG. 13 illustrates a token validity related screen interface according to various embodiments of the present disclosure.

FIG. 13 illustrates a token validity related screen interface according to various embodiments of the present disclosure.

Referring to FIG. 13, according to an embodiment of the present disclosure, when a token is valid, the electronic device 100 may transmit MST signals and determine whether the MST signals are transmitted continuously. Alternatively, when the token is valid, the electronic device 100 may transmit MST signals. When the MST signal transmission is terminated, the electronic device 100, as shown in the drawing, may output a retry related menu item 1320 to the display 150. According to an embodiment of the present disclosure, the menu item 1320 may be displayed on a payment card image 1310. When an event relating to the selection of the menu item 1320 occurs, the electronic device 100 may perform an operation by repeating the screens 1101 to 1109 described with reference to FIG. 11.

According to an embodiment of the present disclosure, the electronic device 100 may determine whether a payment completion message is received from the outside while MST signals are transmitted continuously. When receiving a payment completion message, the electronic device 100 may determine that payment is completed. In this case, the electronic device 100 may stop the MST signal transmission and display that payment is completed.

According to an embodiment of the present disclosure, the payment completion message may be a message transmitted from a token server. According to an embodiment of the present disclosure, the payment completion message may be a message transmitted from an issuer (for example, a card server or a financial server). According to an embodiment of the present disclosure, the payment completion message may be a message transmitted from a POS device. According to an embodiment of the present disclosure, when errors occurs during payment transaction, the electronic device 100 may output a message relating to transaction error through at least one of audio, image, and text.

Figure 14A:
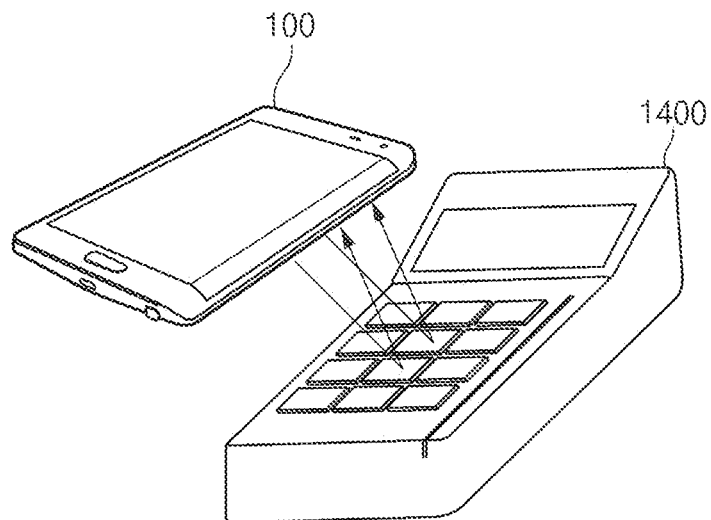
FIGS. 14A and 14B illustrate an MST signal processing operation according to various embodiments of the present disclosure.
Figure 14B:
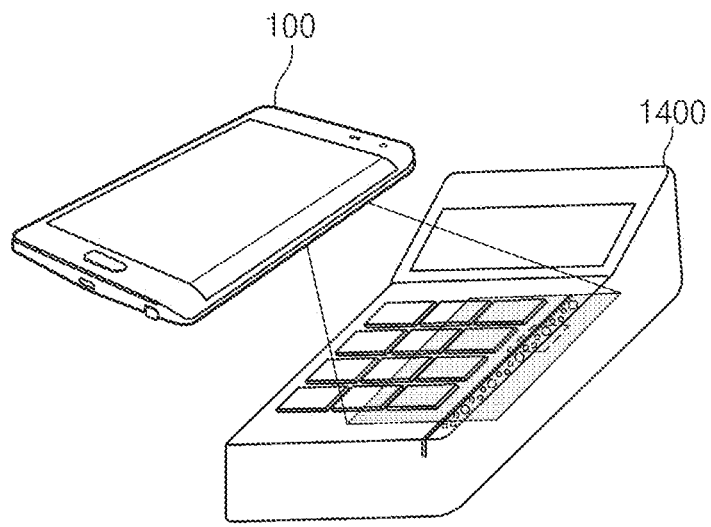

FIGS. 14A and 14B illustrate an MST signal processing operation according to various embodiments of the present disclosure.

Referring to FIGS. 14A and 14B, the electronic device 100 may use at least one method relating to MST signal transmission start. In the case of MST, one-way communication that an electronic device transmits signals to a POS device 1400 may be used. According to an embodiment of the present disclosure, the electronic device 100 may transmit payment signals by detecting whether the POS device 1400 is disposed at a location for receiving MST signals transmitted from the electronic device 100. For example, when it is determined that there is a close subject within a specific distance by using a proximity sensor, as shown in a state 1401, the electronic device 100 may determine the close subject as the POS device 1400. The electronic device 100 may start MST signal transmission based on a proximity detection result in a payment processing related situation. Alternatively, as shown in a state 1403, when a specific image or pattern displayed at a specific position of the POS device 1400 is recognized by using a camera, the electronic device may start MST signal transmission.

According to an embodiment of the present disclosure, the electronic device 100 may use at least one method for stopping the MST signal transmission. The electronic device 100 may determine payment termination based on occurring situation information. According to an embodiment of the present disclosure, when an event occurring according to payment completion is detected from the POS device 1400, based on this, the electronic device 100 may stop payment signals. For example, when receipt output sound and payment completion notification sound occurring from the POS device 1400 are detected, the electronic device 100 may determine the detected signal as signal occurrence for payment termination. In relation to this, the electronic device 100 may store and manage an audio database corresponding to receipt output sound or payment completion notification sound. The electronic device 100 may determine the occurrence of receipt output sound or payment completion notification sound, which is collected based on the stored audio database.

According to an embodiment of the present disclosure, the electronic device 100 may determine payment completion through payment completion related information received from a specified server and may stop payment related MST signal transmission. For example, the electronic device 100 may receive a payment related message in the form of SMS from a financial server including a bank server or a card server. When receiving SMS, the electronic device 100 may determine the payment completion of a used card by analyzing the content of the received SMS. When it is determined that card payment is completed, the electronic device 100 may stop payment related MST signal transmission. According to an embodiment of the present disclosure, the electronic device 100 may receive a specified message from a payment process related specified server. For example, the electronic device 100 may receive a payment completion related message from a mail server or a token server through cellular network or data communication network. When receiving a message from a corresponding server, the electronic device 100 may determine the payment completion of a used card by analyzing the content of the received message. When it is determined that card payment is completed, the electronic device 100 may stop payment transmission.

According to an embodiment of the present disclosure, the electronic device 100 may stop payment signal transmission by determining whether the POS device 1400 is close to the electronic device 100. For example, while detecting the POS device 1400 by using a proximity sensor, when the electronic device 100 is away from the POS device 1400 by more than a specified distance, the electronic device 100 may stop the transmission of payment signals (or MST signals relating to the payment signals). According to an embodiment of the present disclosure, if an image recognized when payment starts is not recognized, the electronic device 100 may stop payment signal transmission. In relation to this, the electronic device 100 may capture an image by using a camera, transmit payment signals when an image relating to the POS device 1400 is obtained from the captured images, and stop payment signal transmission when an image relating to the POS device 1400 is not obtained.

When payment application is executed, the electronic device 100 may determine a battery state, and if the remaining battery does not satisfy a certain level, output a message (for example, pop-up notification) relating to payment progress unavailability. For example, when the battery remaining is less than 15%, the electronic device 100 may operate the payment application after notifying a user of a power amount through pop-up notification and sound or vibration, and if the battery remaining is less than 10% or current is less than a certain level, prevent the execution of the payment application itself and provide a warning message to a user.

According to various embodiments of the present disclosure, the electronic device 100 may progress the payment application continuously or terminate the payment application by determining whether network is connected, whether a data transmission/reception speed through network is greater than a certain speed, and a subscriber identity module (SIM) enabled state. According to various embodiments of the present disclosure, The electronic device 100 may determine whether a platform or a hardware device relating to payment progress is operable or stable (for example, whether trusted execution environment (TEE) where a token is stored is operable or stable, whether rich execution environment (REE) where a token encrypted and delivered from TEE operates is operable or stable, whether REE or a secure element is stable, whether payment application is infected by virus, and whether the payment application is infected with malware or malignant code) at a specified time point (for example, when executing payment application, booting an electronic device having an installed payment application, trying payment or accessing a token). When the device stability is identified, the electronic device 100 may execute payment application. Additionally, the electronic device 100 may determine whether to execute payment application and whether to stop the payment application during execution based on the above-mentioned various situations, for example, combinations of whether network is connected, whether a network data transmission speed of more than a certain value is supported, an SIM enabled state, and a battery state. When payment application cannot be executed, the electronic device 100 may provide this failure of executing the payment application to a user through a message on the display 150, such as pop-up notification, sound, vibration, LED blinking, and the like.

Figure 15:
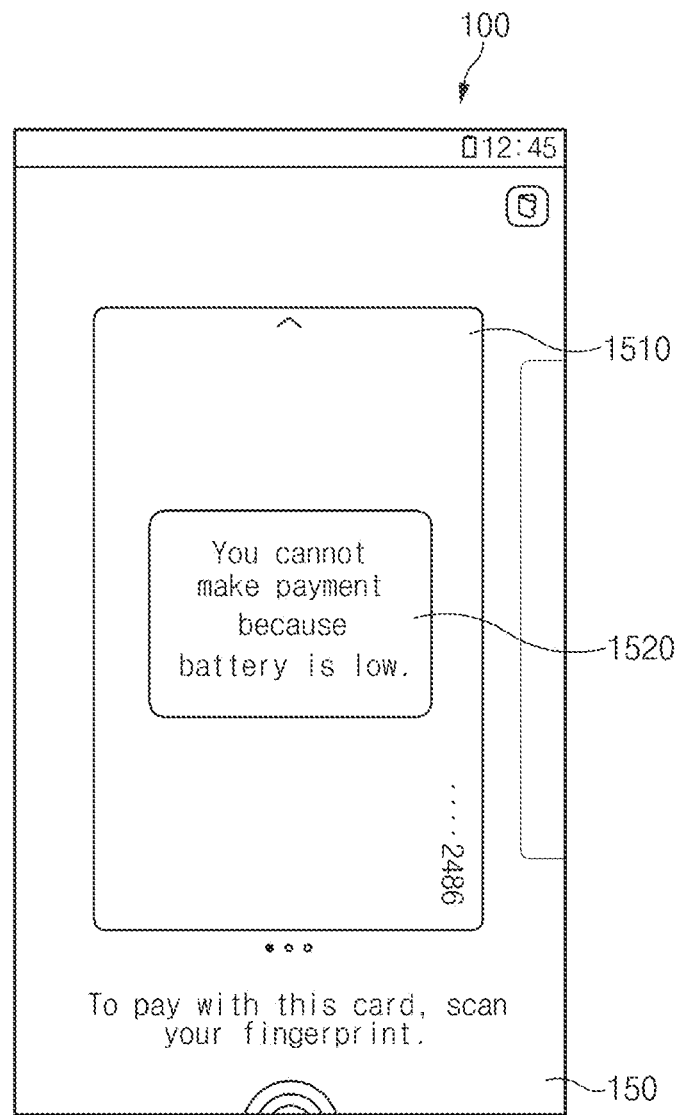
FIG. 15 illustrates a battery remaining related payment processing screen according to various embodiments of the present disclosure.

FIG. 15 illustrates a battery remaining related payment processing screen according to various embodiments of the present disclosure.

Referring to FIG. 15, the electronic device 100 may determine a specified condition before payment application execution or before payment signal transmission. For example, as mentioned above, when a payment related event occurs, the electronic device 100 may determine a battery remaining and when the battery remaining is more than a specified reference value (for example, 10%), progress payment processing. In relation to this, the electronic device 100 may determine a set power reference value and when the determined set power reference value is greater than a power reference value, perform the next payment operation and if the determined set power reference value is less than the power reference value, provide a warning message 1520 to a user and cancel a payment operation. The warning message 1520, for example, may be displayed on a payment card image 1510. In relation to this, the electronic device 100 may determine a power amount in real time or determine the power amount (for example, determine each payment progress operation) according to a certain reference. In the case of a payment progress operation specific determination, the electronic device 100 may determine a power amount before payment application is executed, after payment application is executed, right before MST signal is transmitted, or after MST signal is transmitted during a specified number of times or a specified time. If the power amount of a battery is insufficient, the electronic device 100 may generate a warning message 1520 and may not progress the next operation of the payment. According to an embodiment of the present disclosure, the electronic device 100 may determine a battery power before a fingerprint payment try.

According to various embodiments of the present disclosure, the electronic device 100 may identify the integrity (for example, TEE where a token is stored as a hardware or software device component, REE operating a token encrypted in TEE, whether REE or a secure element is stable, and whether application is infected by virus, and whether application is infected with malware or malignant code) of a device component at a specified time point (for example, when executing payment application, booting an electronic device having an installed payment application, trying payment or accessing a token). The electronic device 100 may determine the battery remaining during a process of recognizing the stability of a device component and determine whether to execute the stability recognition of a corresponding device component. Additionally, the electronic device 100 may determine the battery remaining during a process for recognizing whether network is connected in relation to payment progress, whether a network data transmission speed is greater than a reference value, and an SIM enabled state, and when the network data transmission speed is greater than the reference value, continue the next operation for payment. When the battery remaining is less than a specified reference value, a message, such as a pop-up notification, may be outputted to the display 150 or the message is provided to a user through sound, vibration, or LED blinking.

Figure 16C:
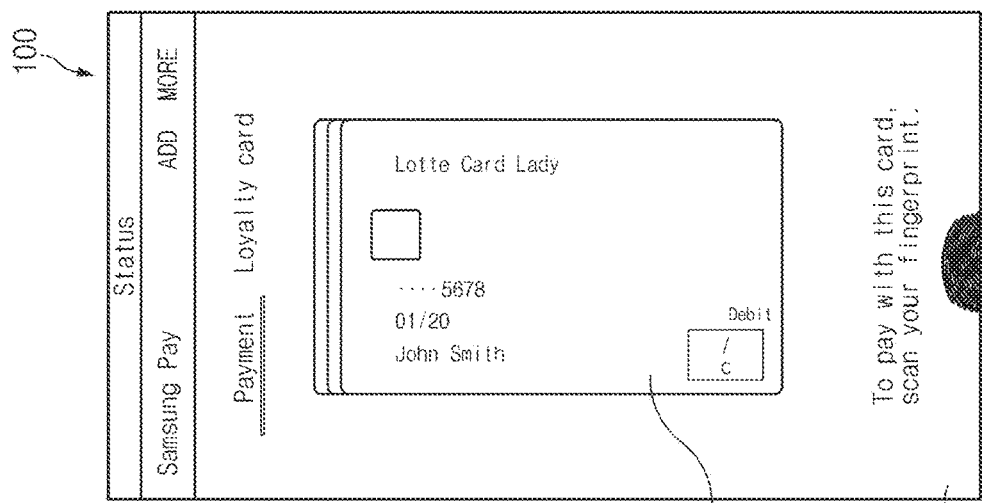
FIGS. 16A, 16B, and 16C illustrate a card selection related screen according to various embodiments of the present disclosure.
Figure 16B:
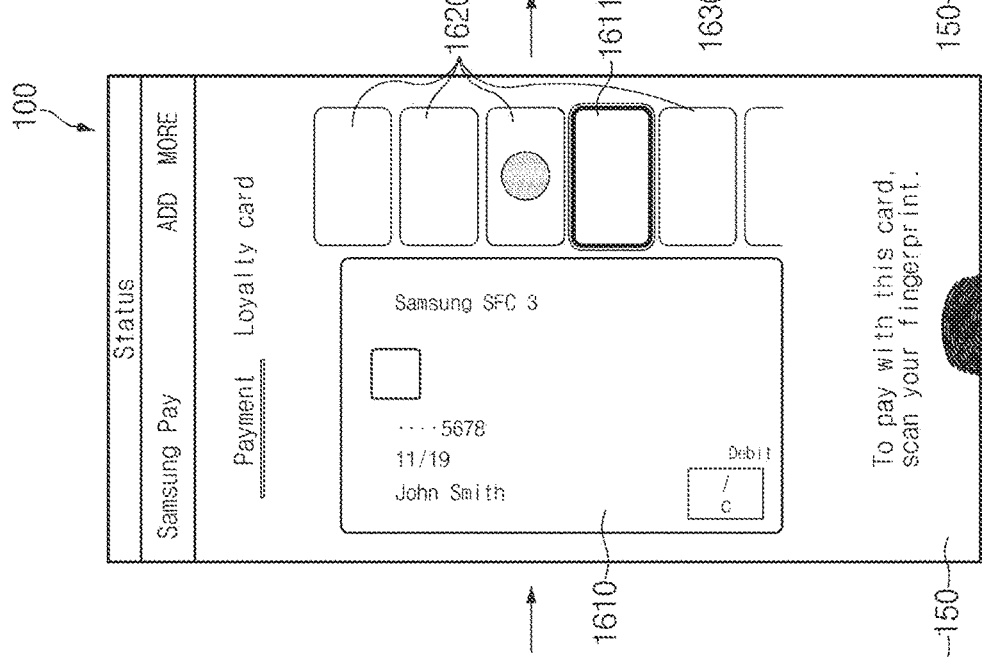
Figure 16A:
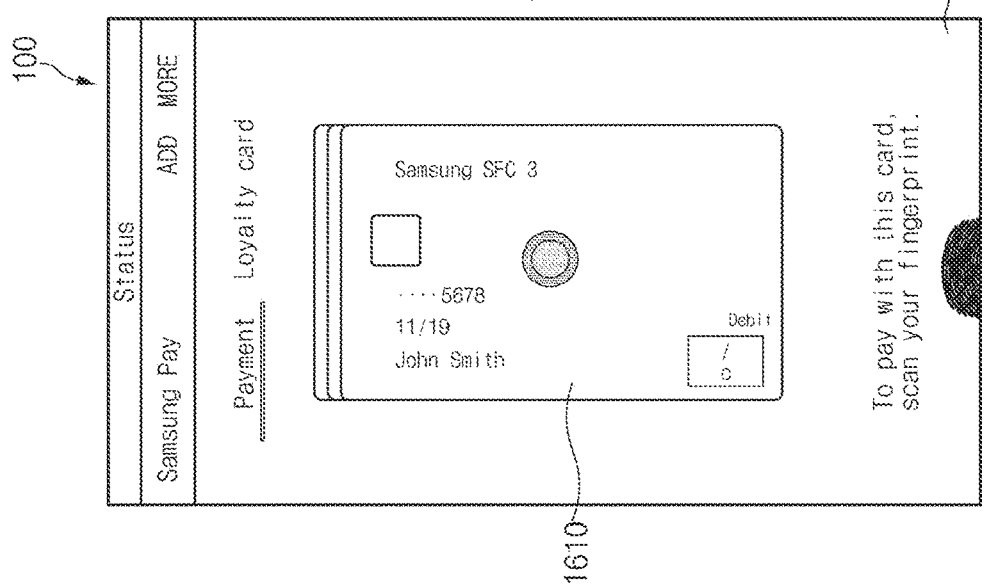

FIGS. 16A, 16B, and 16C illustrate a card selection related screen according to various embodiments of the present disclosure.

Referring to FIGS. 16A, 16B, and 16C, the electronic device 100, as shown in a state 1601 to a state 1605, may provide a screen for selecting a card (for example, a virtual card object image). For example, when payment application execution is requested, as shown in the state 1601, the electronic device 100 may output a user interface, where a plurality of card images overlap on the payment application execution screen, to the display 150. During this operation, a default card image 1610 shown at the top may relate to a card that a user sets as a default card. According to an embodiment of the present disclosure, the default card image 1610 shown at the top may be an image relating to a card that provides benefits to a user, for example, when payment application receives information from an external device and provides benefits, such as discount or mileage, at a corresponding store during payment. In relation to this, the electronic device 100 may obtain location information or store information and search for a card for receiving benefits in relation to a corresponding store. Alternatively, after transmitting location information or store information to a specified server and receiving card information for receiving benefits in relation to a corresponding store from the specified server, the electronic device 100 may search for a card corresponding thereto.

According to an embodiment of the present disclosure, the default card image 1610 shown at the top may relate to a recently registered card. In relation to this, the electronic device 100 may perform a process for setting the recently registered card to be outputted at the top by default or asking whether to output a card at the top during card registration.

According to an embodiment of the present disclosure, the default card image 1610 shown at the top may relate to a recently used card. In relation to this, the electronic device 100 may store and mange a recently used card history. When an output of card images is requested according to payment application execution, the electronic device 100 may display an image relating to a corresponding card at the top by referring to the recently used card history. According to various embodiments of the present disclosure, the electronic device 100 may dispose card images at the top level and second level positions according to the order in the recently used card history.

According to an embodiment of the present disclosure, the default card image 1610 shown at the top may relate to the most used registered card. In relation to this, the electronic device 100 may store and mange a card use history. When a card image output is requested, the electronic device 100 may determine a card history and display an image relating to a relatively more used card at the top.

According to an embodiment of the present disclosure, when a user input (for example, touch, swipe, or long press) is inputted to the default card image 1610 shown at the top, the electronic device 100, as shown in a state 1603, may dispose peripheral card images 1620 by spreading overlapped card images by a certain size next to the default card image 1610. According to an embodiment of the present disclosure, a first card image 1611 corresponding to the default card image 1610 among the peripheral card images 1620 spread with a certain size next to the default card image 1610 may be displayed distinguished from the peripheral card images 1620. For example, the electronic device 100 may display an addition line at the outline of the first card image 1611 corresponding to the default card image 1610. According to an embodiment of the present disclosure, the electronic device 100 may display the first card image 1611 with a different color from the other peripheral card images 1620. According to an embodiment of the present disclosure, the electronic device 100 may display the first card image 1611 more clearly than the other peripheral card images 1620 or display the other peripheral card images 1620 more dimly than the first card image 1611. According to an embodiment of the present disclosure, the electronic device 100 may display the first card image 1611 more largely than the other peripheral card images 1620 or display the first card image 1611 at the front in the order than the other peripheral card images 1620. According to an embodiment of the present disclosure, if the other peripheral card images 1620 are not displayed on one screen of the display 150, the electronic device 100 may provide a menu for viewing the remaining cards additionally. For example, the electronic device 100 may display not-displayed peripheral card images on the display 150 in correspondence to an event occurrence corresponding to a swipe gesture or a scroll gesture. During this operation, the electronic device 100 may display not-displayed card images on the display 150 by moving the peripheral card images 1620 up or down according to a direction of a scroll event.

According to an embodiment of the present disclosure, when one of a plurality of spread card images is selected, as shown in a state 1605, the electronic device 100 may set the selected card image as a new default card image 1630. The selecting of the card may include user's touching, long press touching, selecting a corresponding card image and dragging and dropping the card image toward the existing default card image 1610, and selecting a corresponding card image and swiping the card image toward the existing default card image 1610.

According to an embodiment of the present disclosure, when the card selecting operation is completed, as shown in a state 1605, the electronic device 100 may change the spread card images into the overlapped card images. During this operation, the electronic device 100 may display card images on the display 150 so that a selected card is disposed at the upper-level card position.

FIGS. 17A, 17B, and 17C illustrate a card selection related screen according to various embodiments of the present disclosure.

Referring to FIGS. 17A, 17B, and 17C, the electronic device 100, as shown in a state 1701, may provide a screen for selecting a card to a second display 1720 adjacent to a first display 1710. For example, in relation to a screen where payment application is executed, the electronic device 100 may display a state that a plurality of card images overlap each other on the first display 1710. At this point, a card image shown at the top may relate to a card set as a default card. According to an embodiment of the present disclosure, an upper-level card image 1730 shown at the top may correspond to a specified card. For example, the upper-level card image 1730 may be one of a card set to be used primarily at the current location or at a store of a point where an electronic device is located, a recently registered card, a recently used card, and the most used card.

According to an embodiment of the present disclosure, when a user event (for example, touch, swipe, or long press) is inputted to the upper-level card image 1730 displayed at the top of overlapped card images displayed on the first display 1710, as shown in a state 1703, the electronic device may spread and display the overlapped peripheral card images 1740 on the second display 1720 adjacent to the first display 1710. According to an embodiment of the present disclosure, a first card image 1731 relating to the upper-level card image 1730 among the peripheral card images 1740 may be displayed distinguished from the other peripheral card images 1740. For example, the electronic device 100 may provide an additional display effect at the outskirt of the first card image 1731 displayed on the second display 1720 in relation to the upper-level card image 1730 in the first display 1710. According to an embodiment of the present disclosure, the electronic device 100 may display the first card image 1731, which is displayed on the second display 1720, with a different color from the other peripheral card images 1740. According to an embodiment of the present disclosure, the electronic device 100 may display at least one of the transparency and the sharpness of the first card image 1731, which is displayed on the second display 1720, to be different from the other peripheral card images 1740. According to an embodiment of the present disclosure, the electronic device 100 may display the first card image 1731, which is displayed on the second display 1720, to be larger than the other peripheral card images 1740. The first card image 1731 may be disposed at the upper position than the other peripheral card images 1740 in the second display 1720.

According to an embodiment of the present disclosure, when all the other peripheral card images 1740 are not displayed on the second display 1720, the electronic device 100 may provide a menu for additionally searching for not-displayed peripheral card images to the first display 1710 or the second display 1720. For example, the electronic device 100 may output not-displayed peripheral card images to the display 150 in correspondence to a swipe gesture input occurring from the second display 1720.

According to an embodiment of the present disclosure, when one of a plurality of card images spread on the screen of the second display 1720 is selected, the electronic device 100 may set the selected card image as a default card image. The selecting of the card may include, with respect to the second display 1720, user's touching, long press touching, selecting a corresponding card image and dragging and dropping the card image toward the first display 1710, and selecting a corresponding card image and swiping the card image toward the first display 1710.

According to an embodiment of the present disclosure, when the card selecting operation is completed, as shown in a state 1705, the electronic device 100 may change the spread card images into the overlapped card images. At this point, an upper-level card image may be the upper-level image 1750 corresponding to a card selected from the second display 1720. According to the above-mentioned embodiments of the present disclosure, in controlling payment information transmission through a mobile terminal, the electronic device 100 may obtain a time point that requires or does not require payment information transmission by recognizing a state and a situation through various conditions, use terminal power efficiently and obtain high security by controlling the payment information transmission, and minimize payment processing errors.

According to various embodiments of the present disclosure, an electronic device may include a housing, a display exposed to one surface of the housing, an input device integrally formed with the display, mounted at the housing, or connected wirelessly to the electronic device, a user authentication device integrally formed with the display or mounted at the housing, a conductive pattern (for example, an MST module) disposed in the housing and configured to transmit magnetic signals to an external payment device, a first communication circuit electrically connected to the conductive pattern, a second communication circuit configured to provide cellular and/or short-range communication, a sensor configured to detect the orientation of the electronic device, a processor electrically connected to the display, the authentication input device, the first communication circuit, the second communication circuit, and the sensor, and a memory electrically connected to the processor and configured to store token information used for payment. The memory may store instructions for allowing the processor to receive a first user input through the input device, receive user's authentication information through the user authentication device, transmit magnetic signals, which are generated based on the token information, to an external payment device through the first communication circuit and the conductive pattern based on at least part of the first user input and the authentication information, detect the orientation of the electronic device by using the sensor, and output, to a user, a guide for changing the electronic device to be in the selected orientation based on at least part of the detection result.

According to various embodiments of the present disclosure, the output may include at least one of audio output, text output, image output, video output, and vibration or haptic output.

According to various embodiments of the present disclosure, the electronic device may further include an image acquisition device (for example, a sensor, an image sensor, or an optical sensor) electrically connected to a processor. The instructions may set the processor to obtain an image through the image acquisition device and transmit the transmission of the magnetic signal based on at least part of the obtained image (for example, in correspondence to a specified pattern extracted from the obtained image analysis result).

According to various embodiments of the present disclosure, the electronic device may further include an audio collection device (for example, a microphone) electrically connected to a processor. The instructions may set the processor to obtain sound from the outside through the audio collection device and control (for example, stop) the magnetic signal transmission based on at least part of the obtained sound (for example, during audio data collection corresponding to a specified pattern extracted from an analysis result of the collected audio data).

According to various embodiments of the present disclosure, the instructions may set the processor to control the magnetic signal transmission (for example, stop the transmission) based on at least part of the received message (for example, analyzing the received SMS and determining the analyzed SMS as payment completion based on the analyzed SMS).

According to various embodiments of the present disclosure, the instructions may set the processor to analyze an image obtained through a camera and stop the magnetic signal transmission if a specified pattern is not found.

According to various embodiments of the present disclosure, the instructions may set the processor to transmit the magnetic signals based on a payment related feedback received from a specified server (for example, acquirer or token service provider (TSP)).

According to various embodiments of the present disclosure, the instructions may set the processor to receive payment completion related information from an external server by using the second communication circuit during execution and transmit the magnetic signal transmission based on at least part of the received information.

According to various embodiments of the present disclosure, an electronic device may include a housing, a display exposed to one surface of the housing, an input device integrally formed with the display, mounted at the housing, or connected wirelessly to the electronic device, a user authentication device integrally formed with the display or mounted at the housing, a conductive pattern disposed in the housing and configured to transmit magnetic signals to an external payment device, a first communication circuit electrically connected to the conductive pattern, a second communication circuit configured to provide cellular and/or short-range communication, a processor electrically connected to the display, the authentication input device, the first communication circuit, the second communication circuit, and the sensor, and a memory electrically connected to the processor and configured to store token information used for payment. The memory may store instructions for allowing the processor to receive a first user input through the input device, receive user's authentication information through the user authentication device, receive at least one of the first user input and the authentication information and determine information for payment and/or the integrity of a token, and determine whether to transmit magnetic signals, which are generated based on the token information, to an external payment device through the first communication circuit and the conductive pattern based on at least part of the determination result.

According to various embodiments of the present disclosure, the instructions may allow the processor to determine not to transmit the magnetic signals according to the determination result and output information on the determination relating to not transmitting the magnetic signals.

According to various embodiments of the present disclosure, an electronic device may include a housing, a display exposed to one surface of the housing, an input device integrally formed with the display, mounted at the housing, or connected wirelessly to the electronic device, a user authentication device integrally formed with the display or mounted at the housing, a conductive pattern disposed in the housing and configured to transmit magnetic signals to an external payment device, a first communication circuit electrically connected to the conductive pattern, a second communication circuit configured to provide cellular and/or short-range communication, a processor electrically connected to the display, the authentication input device, the first communication circuit and the second communication circuit, and a memory electrically connected to the processor and configured to store token information used for payment. The memory may store instructions to allow the processor to receive a first user input through the input device, after receiving the first user input, display a plurality of images representing a plurality of payment dedicated cards in a selected arrangement, which are used for a payment using the first communication circuit, display one among the plurality of images to overlap other images, receive a second user input including a touch of a selected time or a selected pressure on the at least one image, display at least part of the other images with a size smaller than the at least one image not to substantially overlap the at least one image, receive an input for selecting one of the other images displayed with the small size, increase the size of the selected one among the other images, and transmit magnetic signals, which are generated based on the token information, to an external payment device through the first communication circuit and the conductive pattern based on at least part of the second user input and the authentication information.

According to various embodiments of the present disclosure, the display includes a first screen and a second screen, and the instructions may set the processor to display the plurality of images in a selected arrangement on the first screen and display other images displayed with the small size on the second screen.

According to various embodiments of the present disclosure, the second screen may be in a form of extending from the first screen and being bent.

According to various embodiments of the present disclosure, the one image among the plurality of images may include the most recently used payment card, the most frequency used payment card, and the most recently added payment card.

Figure 18:
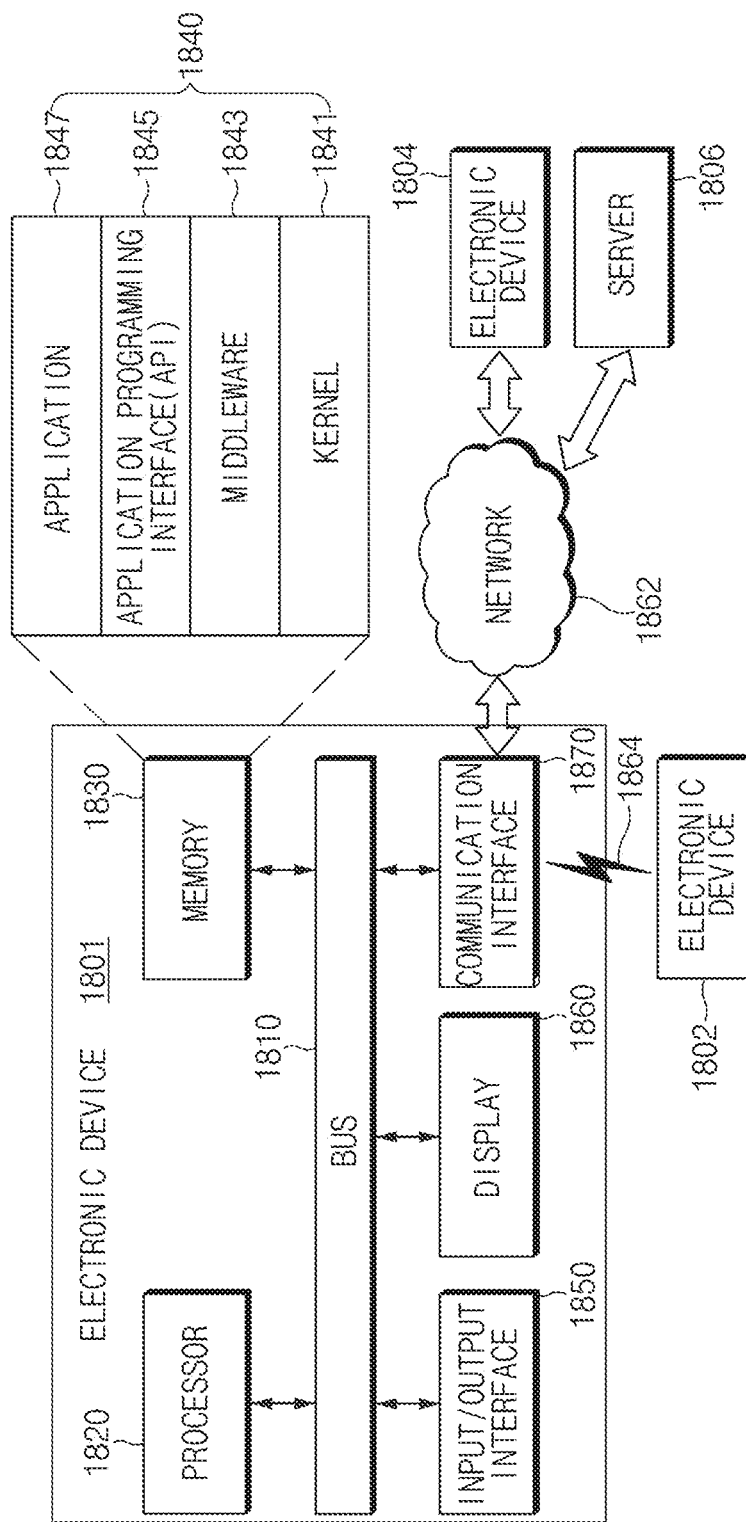
FIG. 18 is a block diagram illustrating a network environment according to various embodiments of the present disclosure.

FIG. 18 is a block diagram illustrating a network environment according to various embodiments of the present disclosure.

Referring to FIG. 18, an electronic device 1801, 1802, or 1804 or a server 1806 may connected to each other through a network 1862 or a short-range communication 1864. The electronic device 1801 may include a bus 1810, a processor 1820, a memory 1830, an input/output interface 1850, a display 1860, and a communication interface 1870. According to an embodiment of the present disclosure, the electronic device 1801 may omit at least one of the components or may additionally include a different component.

The bus 1810, for example, may include a circuit for connecting the components 1810 to 1870 to each other and delivering a communication (for example, control message and/or data) between the components 1810 to 1870.

The processor 1820 may include at least one of a CPU, an AP, and a CP. The processor 1820, for example, may execute calculation or data processing for control and/or communication of at least one another component of the electronic device 1801.

The memory 1830 may include volatile and/or nonvolatile memory. The memory 1830, for example, may store instructions or data relating to at least one another component of the electronic device 1801. According to an embodiment of the present disclosure, the memory 1830 may store software and/or programs 140. The program 140 may include a kernel 1841, a middleware 1843, an application programming interface (API) 1845, and/or an application program (or an application) 1847. At least part of the kernel 1841, the middleware 1843, and the API 1845 may be called an OS.

The kernel 1841, for example, may control or manage system resources (for example, the bus 1810, the processor 1820, the memory 1830, and the like) used for performing operations or functions implemented in other programs (for example, the middleware 1843, the API 1845, or the application program 1847). Additionally, the kernel 1841 may provide an interface for controlling or managing system resources by accessing an individual component of the electronic device 1801 from the middleware 1843, the API 1845, or the application program 1847.

The middleware 1843, for example, may serve as an intermediary role for exchanging data as the API 1845 or the application program 1847 communicates with the kernel 1841.

Additionally, the middleware 1843 may process at least one job request received from the application program 1847 according to a priority. For example, the middleware 1843 may assign to at least one application program 1847 a priority for using a system resource (for example, the bus 1810, the processor 1820, or the memory 1830) of the electronic device 1801. For example, the middleware 1843 may perform scheduling or load balancing on the at least one job request by processing the at least one job request according to the priority assigned to the at least one job request.

The API 1845, as an interface for allowing the application 1847 to control a function provided from the kernel 1841 or the middleware 1843, may include at least one interface or function (for example, an instruction) for file control, window control, image processing, or character control.

The input/output interface 1850, for example, may serve as an interface for delivering instructions or data inputted from a user or another external device to another component(s) of the electronic device 1801. Additionally, the input/output interface 1850 may output instructions or data received from another component(s) of the electronic device 1801 to a user or another external device.

The display 1860, for example, may include an LCD, an LED display, an OLED display, an MEMS display, or an electronic paper display. The display 1860, for example, may display a variety of content (for example, a text, an image, a video, an icon, a symbol, and the like) to a user. The display 1860 may include a touch screen, and for example, may receive a touch, gesture, proximity, or hovering input by using an electronic pen or a user's body part.

The communication interface 1870, for example, may set a communication between the electronic device 1801 and an external device (for example, the first external electronic device 1802, the second external electronic device 1804, or the server 1806). For example, the communication interface 1870 may communicate with an external device (for example, the second external electronic device 1804 or the server 1806) in connection to the network 1862 through wireless communication or wired communication.

The wireless communication, as a cellular communication protocol, may use at least one of LTE, LTE-A, CDMA, WCDMA, UMTS, WiBro, GSM, and the like. Additionally, the wireless communication, for example, may include a short range communication 1864. The short range communication 1864, for example, may include at least one of Wi-Fi, Bluetooth, NFC, GPS, and the like.

MST may generate pulses by using magnetic signals according to transmission data and the pulses may generate magnetic signals. The electronic device 1802 may transmit the magnetic signals to a POS and the POS may detect the magnetic signals by using an MST reader and restore the data by converting the detected magnetic signals into electrical signals.

The global navigation satellite system (GNSS) may include at least one of GPS, GLONASS, and BeiDou Navigation Satellite System (hereinafter referred to as BeiDou) and Galileo, that is, the European global satellite-based navigation system. Hereinafter, GPS and GNSS may be interchangeably used. The wired communication, for example, may include at least one of a USB, an HDMI, RS-232, a POTS, and the like. The network 1862 may include telecommunications network, for example, at least one of computer network (for example, LAN or WAN), Internet, and telephone network.

Each of the first and second external electronic devices 1802 and 1804 may be the same or different type of the electronic device 1801. According to an embodiment of the present disclosure, the server 1806 may include a group of one or more servers. According to various embodiments of the present disclosure, all or part of operations executed on the electronic device 1801 may be executed on another one or more electronic devices (for example, the electronic device 1802 or 1804 or the server 1806). According to an embodiment of the present disclosure, when the electronic device 1801 performs a certain function or service automatically or by a request, the electronic device 1801 may request at least part of a function relating thereto from another device (for example, the electronic device 1802 or 1804 or the server 1806) instead of or in addition to executing the function or service by itself. The other electronic device (for example, the external electronic device 1802 or 1804 or the server 1806) may execute a requested function or an additional function and may deliver an execution result to the electronic device 1801. The electronic device 1801 may provide the requested function or service as it is or by processing the received result additionally. For this, for example, cloud computing, distributed computing, or client-server computing technology may be used.

Figure 19:
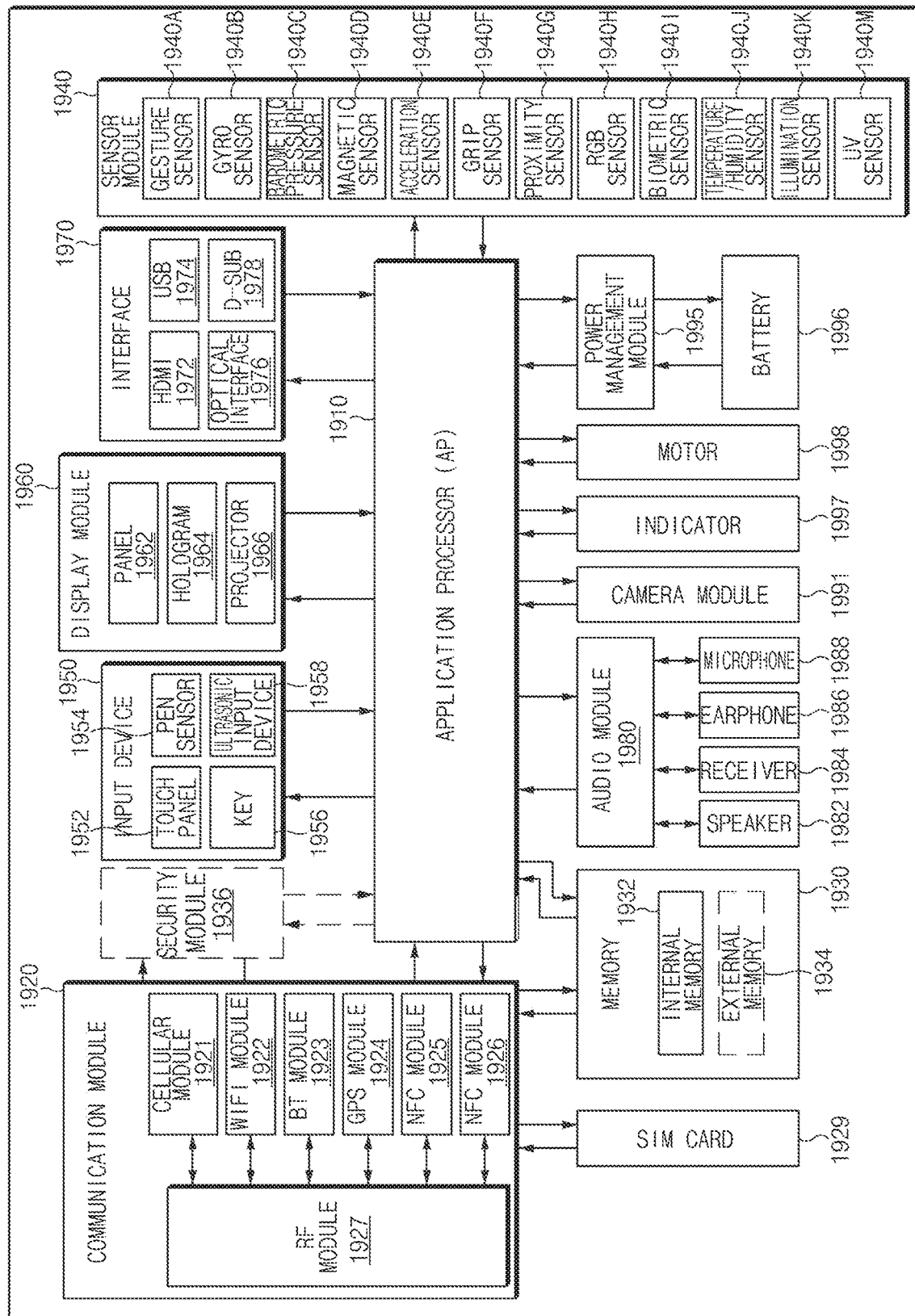
FIG. 19 is a block diagram of an electronic device according to various embodiments of the present disclosure.

FIG. 19 is a block diagram of an electronic device according to various embodiments of the present disclosure.

Referring to FIG. 19, an electronic device 1901, for example, may include all or part of the electronic device 1801 shown in FIG. 18. The electronic device 1901 may include at least one processor (for example, an AP 1910), a communication module 1920, a SIM 1929, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may control a plurality of hardware or software components connected thereto and also may perform various data processing and operations by executing an operating system or an application program. The processor 1910 may be implemented with a system on chip (SoC), for example. According to an embodiment of the present disclosure, the processor 1910 may further include a graphics processing unit (GPU) (not shown) and/or an image signal processor. The processor 1910 may include at least part (for example, the cellular module 1921) of components shown in FIG. 19. The processor 1910 may load commands or data received from at least one of other components (for example, nonvolatile memory) and process them and may store various data in a nonvolatile memory.

The communication module 1920 may have the same or similar configuration to the communication interface 1870 of FIG. 18. The communication module 1920 may include a cellular module 1921, a Wi-Fi module 1922, a Bluetooth module 1923, a GNSS module 1924 (for example, a GPS module, a GLONASS module, a BeiDou module, or a Galileo module), an NFC module 1925, an MST module 1926, and a radio frequency (RF) module 1927.

The cellular module 1921, for example, may provide voice call, video call, text service, or Internet service through communication network. According to an embodiment of the present disclosure, the cellular module 1921 may perform a distinction and authentication operation on the electronic device 1901 in a communication network by using a SIM (for example, the SIM card 1929). According to an embodiment of the present disclosure, the cellular module 1921 may perform at least part of a function that the processor 1910 provides. According to an embodiment of the present disclosure, the cellular module 1921 may further include a CP.

Each of the Wi-Fi module 1922, the Bluetooth module 1923, the GNSS module 1924, the NFC module 1925, and the MST module 1926 may include a processor for processing data transmitted/received through a corresponding module. According to an embodiment of the present disclosure, at least part (for example, two or more) of the cellular module 1921, Wi-Fi module 1922, the Bluetooth module 1923, the GNSS module 1924, the NFC module 1925, and the MST module 1926 may be included in one IC or IC package.

The RF module 1927, for example, may transmit/receive communication signals (for example, RF signals). The RF module 1927, for example, may include a transceiver, a power amp module (PAM), a frequency filter, a low noise amplifier (LNA), or an antenna. According to an embodiment of the present disclosure, at least one of the cellular module 1921, the Wi-Fi module 1922, the Bluetooth module 1923, the GNSS module 1924, the NFC module 1925, and the MST module 1926 may transmit/receive RF signals through a separate RF module.

The SIM 1929, for example, may include a card including a SIM and/or an embedded SIM and also may include unique identification information (for example, an IC card identifier (ICCID)) or subscriber information (for example, an international mobile subscriber identity (IMSI)).

The memory 1930 (for example, the memory 1830) may include an internal memory 1932 or an external memory 1934. The internal memory 1932 may include at least one of a volatile memory (for example, a dynamic random access memory (DRAM), a static RAM (SRAM), a synchronous DRAM (SDRAM)) and a non-volatile memory (for example, a one-time programmable read only memory (OT-PROM), a PROM, an erasable and programmable ROM (EPROM), an electrically erasable and programmable ROM (EEPROM), a mask ROM, a flash ROM, a flash memory (for example, NAND flash or NOR flash), a hard drive, and a solid state drive (SSD)).

The external memory 1934 may further include flash drive, for example, compact flash (CF), secure digital (SD), micro-SD, mini-SD, extreme digital (xD), multi-media card (MMC) or a memory stick. The external memory 1934 may be functionally and/or physically connected to the electronic device 1901 through various interfaces.

A security module 1936, as a module including a storage space having a relatively higher security level than the memory 1930, may be a circuit for securing safe data storage and protected execution environment. The security module 1936 may be implemented as a separate circuit and may include an additional processor. The security module 1936, for example, may be in a detachable smart chip or a SD card or may include an eSE embedded in a fixed chip of the electronic device 1901. Additionally, the security module 1936 may run on a different OS from the electronic device 1901. For example, it may run based on java card open platform (JCOP) OS.

The sensor module 1940 measures physical quantities or detects an operating state of the electronic device 1901, thereby converting the measured or detected information into electrical signals. The sensor module 1940 may include at least one of a gesture sensor 1940A, a gyro sensor 1940B, a barometric pressure sensor 1940C, a magnetic sensor 1940D, an acceleration sensor 1940E, a grip sensor 1940F, a proximity sensor 1940G, a color sensor 1940H (for example, a red, green, blue (RGB) sensor), a biometric sensor 1940I, a temperature/humidity sensor 1940J, an illumination sensor 1940K, and an ultra violet (UV) sensor 1940M. Additionally or alternatively, the sensor module 1940 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1940 may further include a control circuit for controlling at least one sensor therein. According to an embodiment of the present disclosure, the electronic device 1901 may further include a processor configured to control the sensor module 1940 as part of or separately from the processor 1910 and thus may control the sensor module 1940 while the processor 1910 is in a sleep state.

The input device 1950 may include a touch panel 1952, a (digital) pen sensor 1954, a key 1956, or an ultrasonic input device 1958. The touch panel 1952 may use at least one of capacitive, resistive, infrared, or ultrasonic methods, for example. Additionally, the touch panel 1952 may further include a control circuit. The touch panel 1952 may further include a tactile layer to provide tactile response to a user.

The (digital) pen sensor 1954, for example, may include a sheet for recognition as part of a touch panel or a separate sheet for recognition. The key 1956 may include a physical button, an optical key, or a keypad, for example. The ultrasonic input device 1958 may detect ultrasonic waves generated from an input tool through a microphone (for example, the microphone 1988) in order to determine data corresponding to the detected ultrasonic waves.

The display 1960 (for example, the display 1860) may include a panel 1962, a hologram device 1964, or a projector 1966. The panel 1962 may have the same or similar configuration to the display 1860 of FIG. 18. The panel 1962 may be implemented to be flexible, transparent, or wearable, for example. The panel 1962 and the touch panel 1952 may be configured with one module. The hologram 1964 may show three-dimensional images in the air by using the interference of light. The projector 1966 may display an image by projecting light on a screen. The screen, for example, may be placed inside or outside the electronic device 1901. According to an embodiment of the present disclosure, the display 1960 may further include a control circuit for controlling the panel 1962, the hologram device 1964, or the projector 1966.

The interface 1970 may include an HDMI 1972, a USB 1974, an optical interface 1976, or a D-subminiature (D-sub) 1978, for example. The interface 1970, for example, may be included in the communication interface 170 shown in FIG. 18. Additionally or alternatively, the interface 1970 may include a mobile high-definition link (MHL) interface, an SD card/MMC interface, or an infrared data association (IrDA) standard interface.

The audio module 1980 may convert sound into electrical signals and convert electrical signals into sounds. At least some components of the audio module 1980, for example, may be included in the input/output interface 145 shown in FIG. 18. The audio module 1980 may process sound information inputted/outputted through a speaker 1982, a receiver 1984, an earphone 1986, or a microphone 1988.

The camera module 1991, as a device for capturing a still image and a video, may include at least one image sensor (for example, a front sensor or a rear sensor), a lens, an image signal processor (ISP), or a flash (for example, an LED or a xenon lamp).

The power management module 1995 may manage the power of the electronic device 1901. According to an embodiment of the present disclosure, the power management module 1995 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit, such as a coil loop, a resonant circuit, a rectifier circuit, and the like, may be added. The battery gauge may measure the remaining amount of the battery 1996, or a voltage, current, or temperature thereof during charging. The battery 1996, for example, may include a rechargeable battery and/or a solar battery.

The indicator 1997 may display a specific state of the electronic device 1901 or part thereof (for example, the processor 1910), for example, a booting state, a message state, or a charging state. The motor 1998 may convert electrical signals into mechanical vibration and may generate vibration or haptic effect. Although not shown in the drawings, the electronic device 1901 may include a processing device (for example, a GPU) for mobile TV support. A processing device for mobile TV support may process media data according to the standards, such as digital multimedia broadcasting (DMB), digital video broadcasting (DVB), mediaFLO™, and the like.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 20:
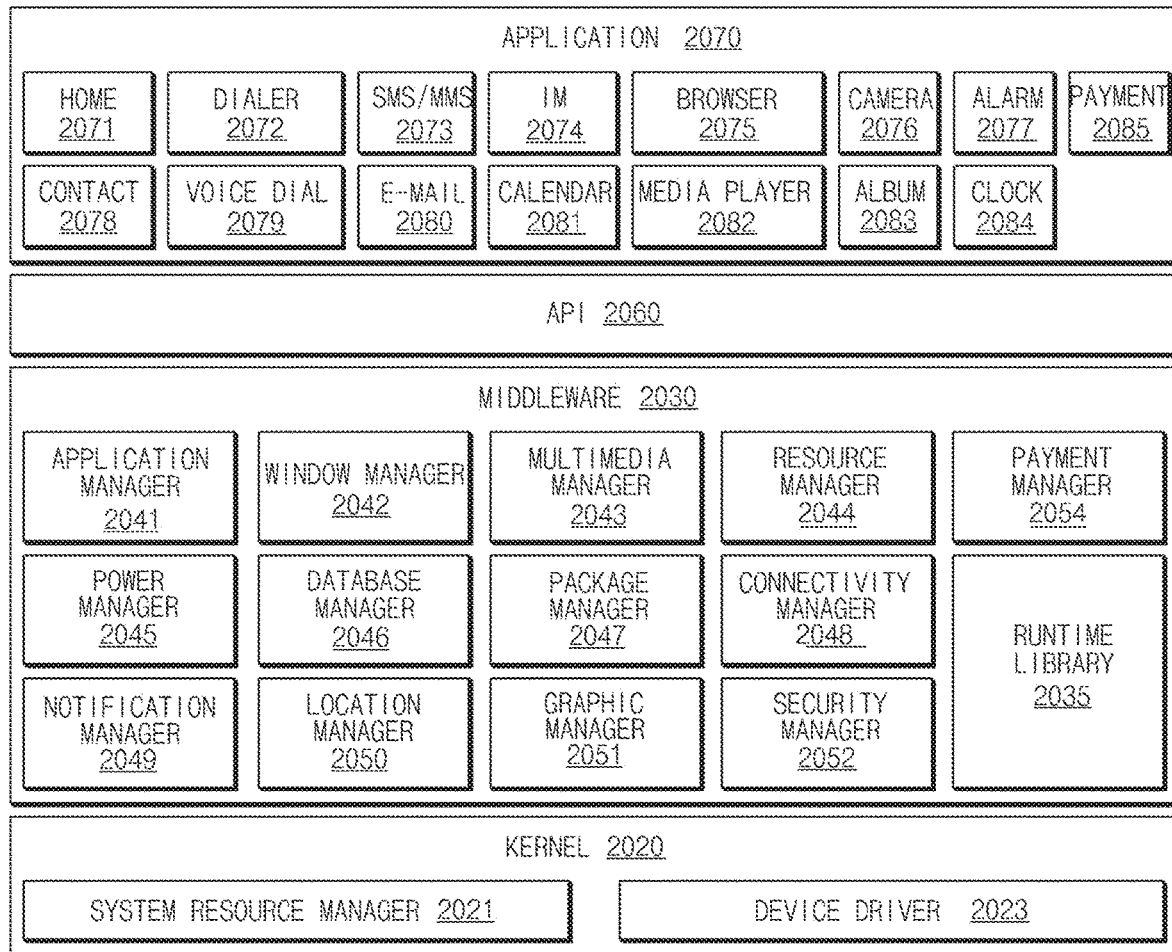
FIG. 20 is a block diagram of a program module according to various embodiments of the present disclosure.

FIG. 20 is a block diagram of a program module according to various embodiments of the present disclosure.

Referring to FIG. 20, according to an embodiment of the present disclosure, a program module 2010 (for example, a program 1840) may include an OS for controlling a resource relating to an electronic device (for example, the electronic device 1801) and/or various applications (for example, the application program 1847) running on the OS. The OS, for example, may include android, iOS, windows, symbian, tizen, or bada.

The programs may include a kernel 2020, a middleware 2030, an API 2060, and/or an application program (or an application) 2070. At least part of the program module 2010 may be preloaded on an electronic device or may be downloaded from a server (for example, the electronic devices 1802 and 1804 and the server 1806).

The kernel 2020 (for example, the kernel 1841), for example, may include a system resource manager 2021, or a device driver 2023. The system resource manager 2021 may perform the control, allocation, or retrieval of a system resource. According to an embodiment of the disclosure, the system resource manager 2021 may include a process management unit, a memory management unit, or a file system management unit. The device driver 2023, for example, a display driver, a camera driver, a Bluetooth driver, a sharing memory driver, a USB driver, a keypad driver, a Wi-Fi driver, an audio driver, or an inter-process communication (IPC) driver.

The middleware 2030, for example, may provide a function that the application 2070 requires commonly, or may provide various functions to the application 2070 through the API 2060 in order to allow the application 2070 to efficiently use a limited system resource inside the electronic device. According to an embodiment of the present disclosure, the middleware 2030 (for example, the middleware 1843) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, a security manager 2052, and a payment manager 2054.

The runtime library 2035, for example, may include a library module that a complier uses to add a new function through a programming language while the application 2070 is running. The runtime library 2035 may perform a function on input/output management, memory management, or an arithmetic function.

The application manager 2041, for example, may mange the life cycle of at least one application among the applications 2070. The window manager 2042 may manage a graphical user interface (GUI) resource used in a screen. The multimedia manager 2043 may recognize a format for playing various media files and may encode or decode a media file by using the codec corresponding to a corresponding format. The resource manager 2044 may manage a resource, such as a source code, a memory, a storage space, and the like, of at least any one of the applications 2070.

The power manager 2045, for example, may operate together with a basic input/output system (BIOS) to manage the battery or power and may provide power information necessary for an operation of the electronic device. The database manager 2046 may create, search, or modify a database used in at least one application among the applications 2070. The package manager 2047 may manage the installation or update of an application distributed in a package file format.

The connectivity manager 2048 may manage a wireless connection, such as Wi-Fi or Bluetooth. The notification manager 2049 may display or provide an event, such as arrival messages, appointments, and proximity alerts to a user in a manner of not interrupting the user. The location manager 2050 may manage location information on an electronic device. The graphic manager 2051 may manage a graphic effect to be provided to a user or a user interface relating thereto. The security manager 2052 may provide various security functions necessary for system security or user authentication. According to an embodiment of the present disclosure, when an electronic device (for example, the electronic device 1801) includes a phone function, the middleware 2030 may further include a telephony manager for managing a voice or video call function of the electronic device. The payment manager 2054 may relay information for payment from the application 2070 to the application 2070 or the kernel 2020. Additionally, information relating to payment received from an external device may be stored in the electronic device or information stored therein may be delivered to an external device.

The middleware 2030 may include a middleware module for forming a combination of various functions of the above-mentioned components. The middleware 2030 may provide a module specialized for each type of OS to provide differentiated functions. Additionally, the middleware 2030 may delete part of existing components or add new components dynamically.

The API 2060 (for example, the API 1845), for example, as a set of API programming functions, may be provided as another configuration according to OS. For example, in the case of android or iOS, one API set may be provided for each platform and in the case of tizen, at least two API sets may be provided for each platform.

The application 2070 (for example, the application program 1847) may include at least one application for providing functions, such as a home 2071, a dialer 2072, an SMS/MMS 2073, an instant message 2074, a browser 2075, a camera 2076, an alarm 2077, a contact 2078, a voice dial 2079, an e-mail 2080, a calendar 2081, a media player 2082, an album 2083, a clock 2084, payment 2085, health care (for example, measure an exercise amount or blood sugar), or environmental information provision (for example, provide air pressure, humidity, or temperature information).

According to an embodiment of the present disclosure, the application 2070 may include an application (hereinafter referred to as "information exchange application") for supporting information exchange between the electronic device (for example, the electronic device 1801) and an external electronic device (for example, the electronic device 1802 or 1804). The information exchange application, for example, may include a notification relay application for relaying specific information to the external device or a device management application for managing the external electronic device.

For example, the notification relay application may have a function for relaying to an external electronic device (for example, electronic devices 1802 and 1804) notification information occurring from another application (for example, an SMS/MMS application, an e-mail application, a health care application, or an environmental information application) of the electronic device. Additionally, the notification relay application may receive notification information from an external electronic device and may provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 1802 and 1804) communicating with the electronic device, an application operating in the external electronic device, or a service (for example, call service or message service) provided from the external device.

According to an embodiment of the present disclosure, the application 2070 may include a specified application (for example, a health care application of a mobile medical device) according to the property of an external electronic device (for example, the electronic devices 1802 and 1804). According to an embodiment of the present disclosure, the application 2070 may include an application received from an external electronic device (for example, the server 1086 or the electronic device 1802 or 1804). According to an embodiment of the disclosure, the application 2070 may include a preloaded application or a third party application downloadable from a server. The names of components in the program module 2010 according to the shown embodiment may vary depending on the type of OS.

According to various embodiments of the present disclosure, at least part of the program module 2010 may be implemented with software, firmware, hardware, or a combination thereof. At least part of the programming module 2010, for example, may be implemented (for example, executed) by a processor (for example, the processor 1820). At least part of the programming module 2010 may include a module, a program, a routine, sets of instructions, or a process to perform at least one function, for example.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific IC (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 1820) executes an instruction, it may perform a function corresponding to the instruction. The non-transitory computer-readable storage media may include the memory 1830, for example.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Alternatively, other operations may be added. Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

Figure 21:
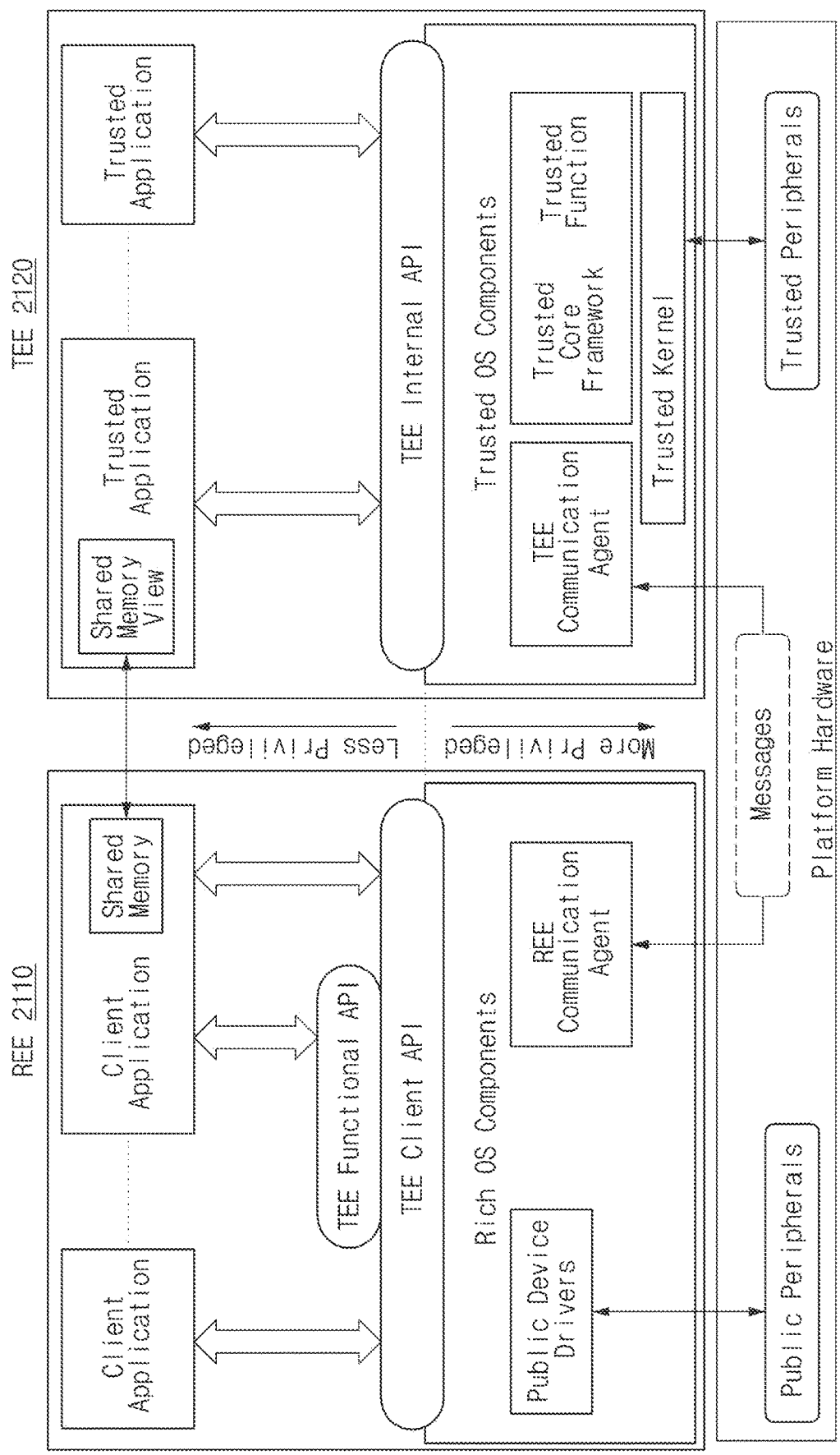
FIG. 21 is a block diagram illustrating a rich execution environment (REE) and a trusted execution environment (TEE) operating in an electronic device according to various embodiments of the present disclosure.

FIG. 21 is a block diagram illustrating an REE and a TEE operating in an electronic device according to various embodiments of the present disclosure.

Referring to FIG. 21, according to various embodiments of the present disclosure, an electronic device may operate an execution environment having a plurality of security levels for security enhancement. A plurality of execution environments, for example, may include an REE 2110 and a TEE 2120. The REE 2110, for example, may be a first execution environment having a first security level. The TEE 2120, for example, may be a second execution environment having a second security level different from (for example, higher than) the first security level. According to an embodiment of the present disclosure, the electronic device 1802 may include an additional another execution environment (for example, a third execution environment) having a third security level and the present disclosure is not limited thereto.

The TEE 2120 may store data, which requires a relatively high security level, in a safe environment and perform a related operation. The TEE 2120 may operate on an application processor of an electronic device and may operate based on a reliable hardware structure determined during a manufacturing process. The TEE 2120 may divide an application processor or a memory into a general area and a security area and operate in the security area. The TEE 2120 may set software or hardware, which requires security, to operate only in a security area. The electronic device may operate the TEE 2120 through a physical change of hardware or a logical change of software.

The TEE 2120 may be separated from the REE 2110 through hardware restriction or may be separated from the REE 2110 in the same hardware in terms of software and operate. At least one application (for example, payment, contact, e-mail or browser) operating in the REE 2110 may use an API (for example, TEE functional API or TEE client API) allowed to access the TEE 2120. The at least one application may deliver a message to a communication agent (for example, a TEE communication agent) of the TEE 2120 from a communication agent (for example, an REE communication agent) of the TEE 2120 by using the API. The message may be implemented to be delivered to only the TEE 2120. The communication agent of the TEE 2120 may receive the message and deliver the message to a trusted application (TA) (for example, digital rights management (DRM), a security payment module, or a security bio information module) relating to the message. The TA may perform an operation relating to the message and deliver a result on the operation to the communication agent of the REE 2110 through the communication agent of the TEE 2120. The communication agent of the REE 2110 may deliver the result to at least one application operating in the REE 2110.

Figures 22A, 22B:
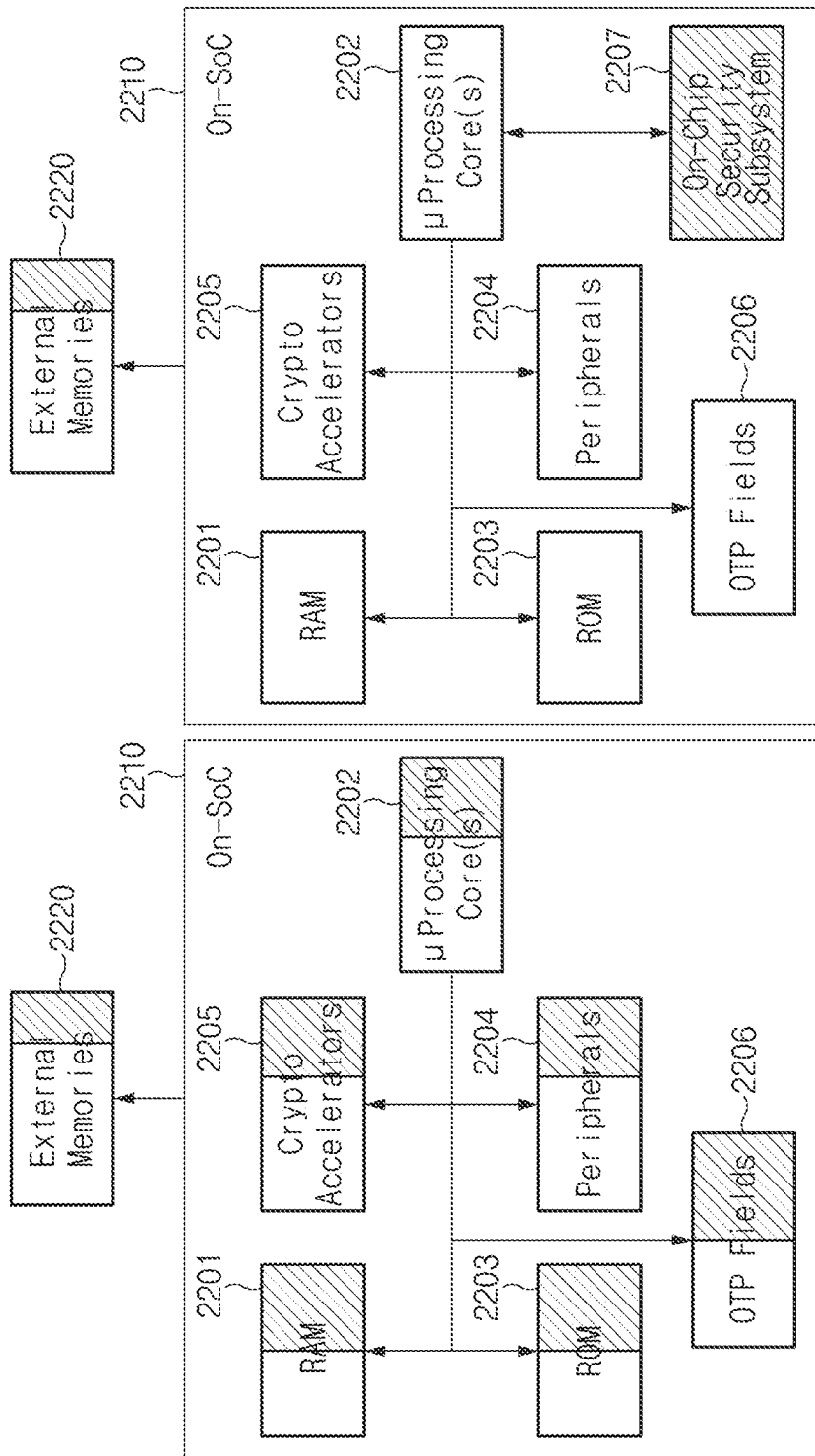
FIGS. 22A, 22B, and 22C are block diagrams illustrating a hardware structure of a TEE according to various embodiments of the present disclosure.
Figure 22C:
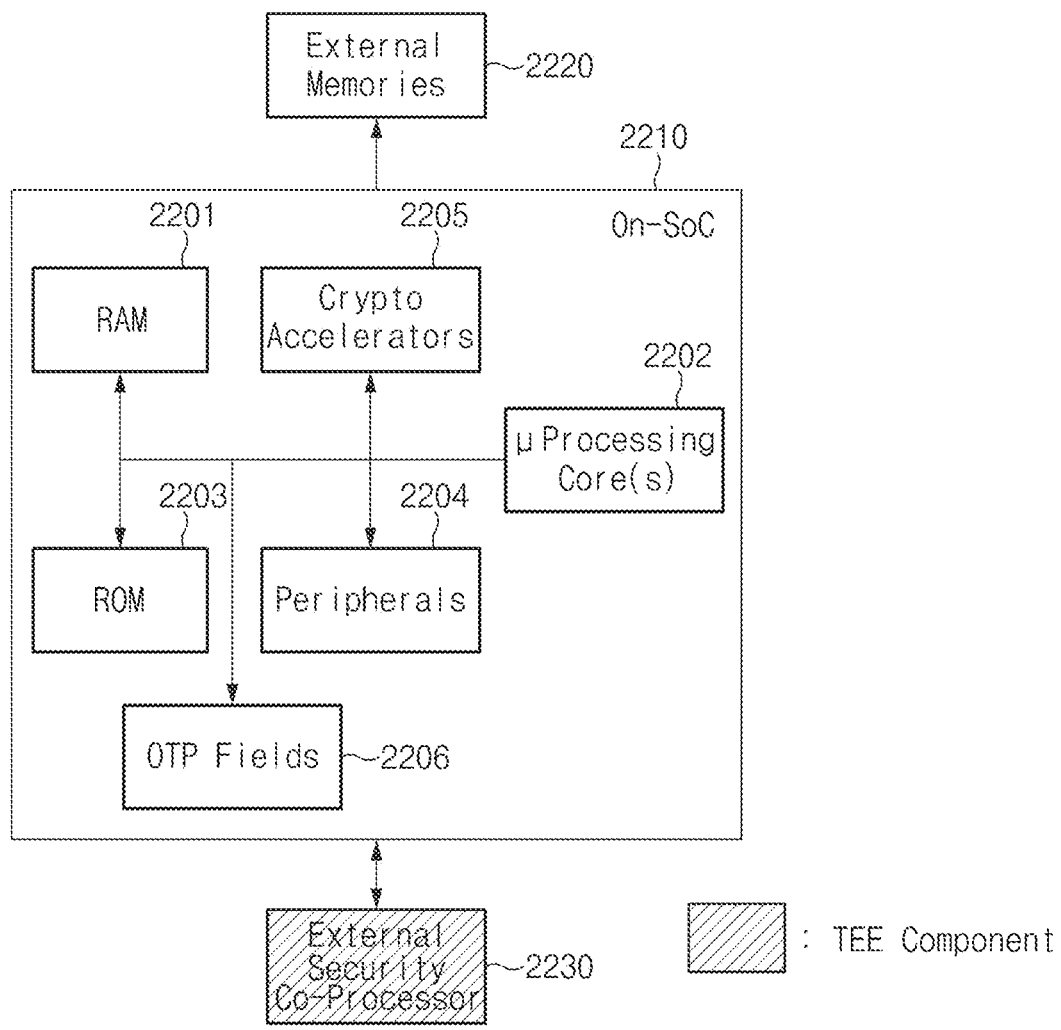

FIGS. 22A, 22B, and 22C are block diagrams illustrating a hardware structure of a TEE according to various embodiments of the present disclosure.

Referring to FIG. 22A, a case (for example, a TrustZone® (TZ) of ARM®) that one processor and one memory are divided into an REE and a TEE in terms of hardware and used is illustrated. According to an embodiment of the present disclosure, a hardware structure of the TEE may include an On-SoC 2210 and external memories 2220. The On-SoC 2210 may include a RAM 2201, a micro processing core 2202, a ROM 2203, a peripheral 2204, a crypto accelerator 2205, or one-time password (OTP) fields 2206. The TZ may distinguish the REE from the REE and use them by dividing a processor temporally in order to operate two or more execution environments. Additionally, the TZ may divide one memory into an area accessible from the REE and an area accessible from the TEE and use them.

Referring to FIG. 22B, a case that a processor for TEE is implemented in an on-chip form like a processor for operating an REE but implemented with an additional processing core set is illustrated. According to an embodiment of the present disclosure, an On-SoC 2210 may additionally include an On-chip security subsystem 2207 including at least one processor in addition to a micro processing core 2202. In such a case, the On-SoC 2210 may be set to operate an REE and the On-chip security subsystem 2207 may be set to operate a TEE. In the case of FIG. 22B, like FIG. 22A, one memory may be divided into an area accessible from the REE and an area accessible from the TEE and use them.

Referring to FIG. 22C, a case that a processor for TEE is implemented with an additional chip in terms of hardware is illustrated, so that it is separated from a chip in which a processor for operating an REE is implemented.

Referring to FIG. 22C, the On-Soc 2210 may be set to operate the REE and at least one external security co-processor 2230 equipped outside the On-Soc 2210 may be set to operate the TEE.

Figure 23:
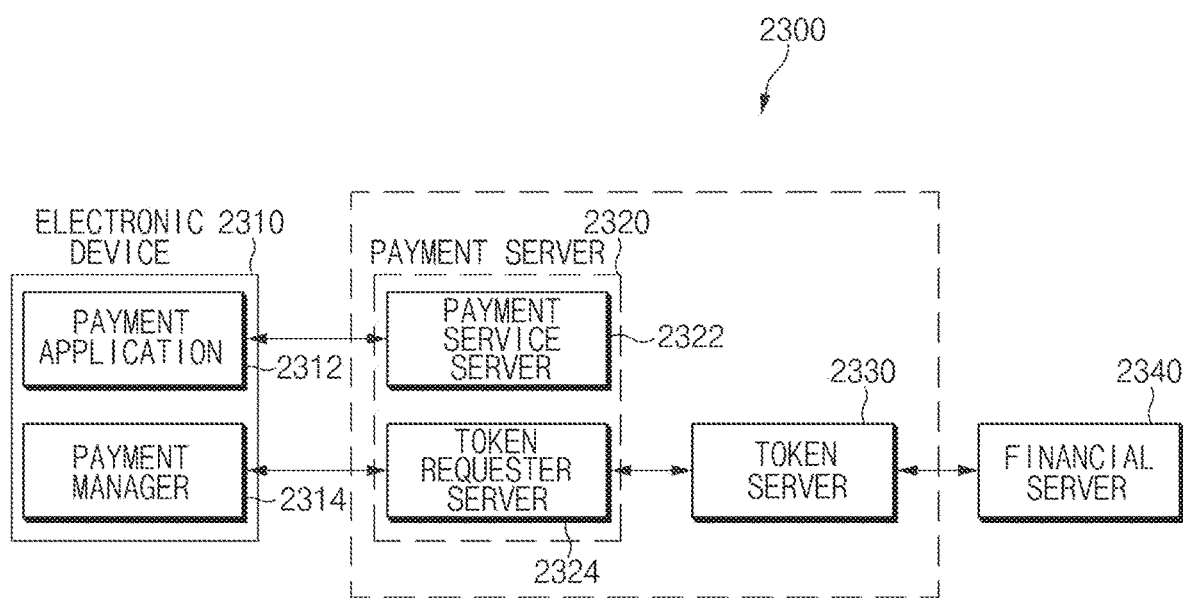
FIG. 23 illustrates a payment system according to various embodiments of the present disclosure.

FIG. 23 illustrates a payment system according to various embodiments of the present disclosure.

Referring to FIG. 23, according to various embodiments of the present disclosure, a payment system 2300 may include an electronic device 2310 and/or a server. Additionally, for example, the server may include a payment server 2320, a token server (for example, a token service provider) 2330, or a financial server (for example, an issuer) 2340. The electronic device 2310, for example, may include a payment application (for example, a wallet application) 2312 and/or a payment manager 2314. The payment server 2320, for example, may include a payment service server 2322 and/or a token requester or a token requester server 2324.

According to various embodiments of the present disclosure, the payment application 2312, for example, may include a Samsung Pay™ Application. The payment application 2312, for example, may provide a payment related user interface (for example, user interface (UI) or user experience (UX)). The payment related UI may include wallet UI/UX. For example, the payment application 2312 may provide a UI relating to card registration, payment, or transaction. For example, the payment application 2312, for example, may provide an interface relating to a character reader (for example, an optical character reader/recognition (OCR)) or an external input (for example, a user input). Additionally, the payment application 2312, for example, may provide a user authentication related interface through identification and verification (ID&V).

According to various embodiments of the present disclosure, the payment application 2312 may perform payment transaction. For example, the payment application 2312 may provide a payment function to a user through simple pay, quick pay, or specified application execution. A user may perform a payment function by using the payment application 2312 and receive information relating to the payment function.

According to various embodiments of the present disclosure, the payment manager 2314 may include card company related information. For example, the payment manager 2314 may include a card company software development kit (SDK).

According to various embodiments of the present disclosure, the payment server 2320 may include a management server for electronic payment or mobile payment. The payment server 2320, for example, may receive payment related information from the electronic device 2310 and transmit the payment related information to the outside or process the payment related information in the payment server 2320.

According to various embodiments of the present disclosure, the payment server 2320 may transmit/receive information between the electronic device 2310 and the token server 2330 by using the payment service server 2322 and/or the token requester server 2324. The payment service server 2322, for example, may include the payment server 2320 (for example, a Samsung payment server). The payment service server 2322, for example, may manage card information in linkage with service account or user account. Additionally, the payment service server 2322 may include an API server relating to the payment application 2312. Additionally, the payment service server 2322, for example, may provide the payment management module (for example, account integration or Samsung account integration).

According to various embodiments of the present disclosure, the token requester server 2324 may provide an interface for processing payment related information. For example, the token requester server 2324 may perform the issue, deletion, or activation of payment related information (for example, a token). Alternatively, it may be functionally connected to the payment manager 2314 and control information necessary for the payment.

According to various embodiments of the present disclosure, the payment application 2312 in the electronic device 2310 may be functionally connected to the payment service server 2322 in the payment server 2320. For example, the payment application 2312 may transmit/receive payment related information to/from the payment server 2320. According to an embodiment of the present disclosure, the payment manager 2314 in the electronic device 2310 may be functionally connected to the token requester server 2324 in the payment server 2320. For example, the payment manager 2314 may transmit/receive payment related information to/from the token requester server 2324.

According to various embodiments of the present disclosure, the token server 2330 may issue payment related information (for example, a token) or manage payment related information. For example, the token server 2330 may control the life cycle of a token. The life cycle may include a generation, modification, or deletion cycle. Additionally, the token server 2330, for example, may include a token management server and may perform token provisioning, identification and verification (ID&V), replenishment, or life cycle management. Additionally, the token server 2330 may perform the integration of information relating to a financial server.

According to various embodiments of the present disclosure, the payment server 2320 and/or the token server 2330 may be located in the same or similar area or located in separated areas. For example, the payment manager 2320 may be included in a first server and the token server 2330 may be included in a second server. Additionally, for example, the payment manager 2320 and/or the token server 2330 may be separately implemented in one server (for example, a first server or a second server.

According to various embodiments of the present disclosure, the financial server 2340 may perform card issue. For example, the financial server 2340 may include a card issue bank. Additionally, the financial server 2340 may generate information necessary for payment provided to a user. The user may store the information necessary for payment, which is generated from the financial server 2340, in the electronic device 2310 by using the payment application 2312. Additionally, the financial server 2340 may be functionally connected to the token server 2330 and transmit/receive the information necessary for payment to/from the token server 2330.

Figure 24:
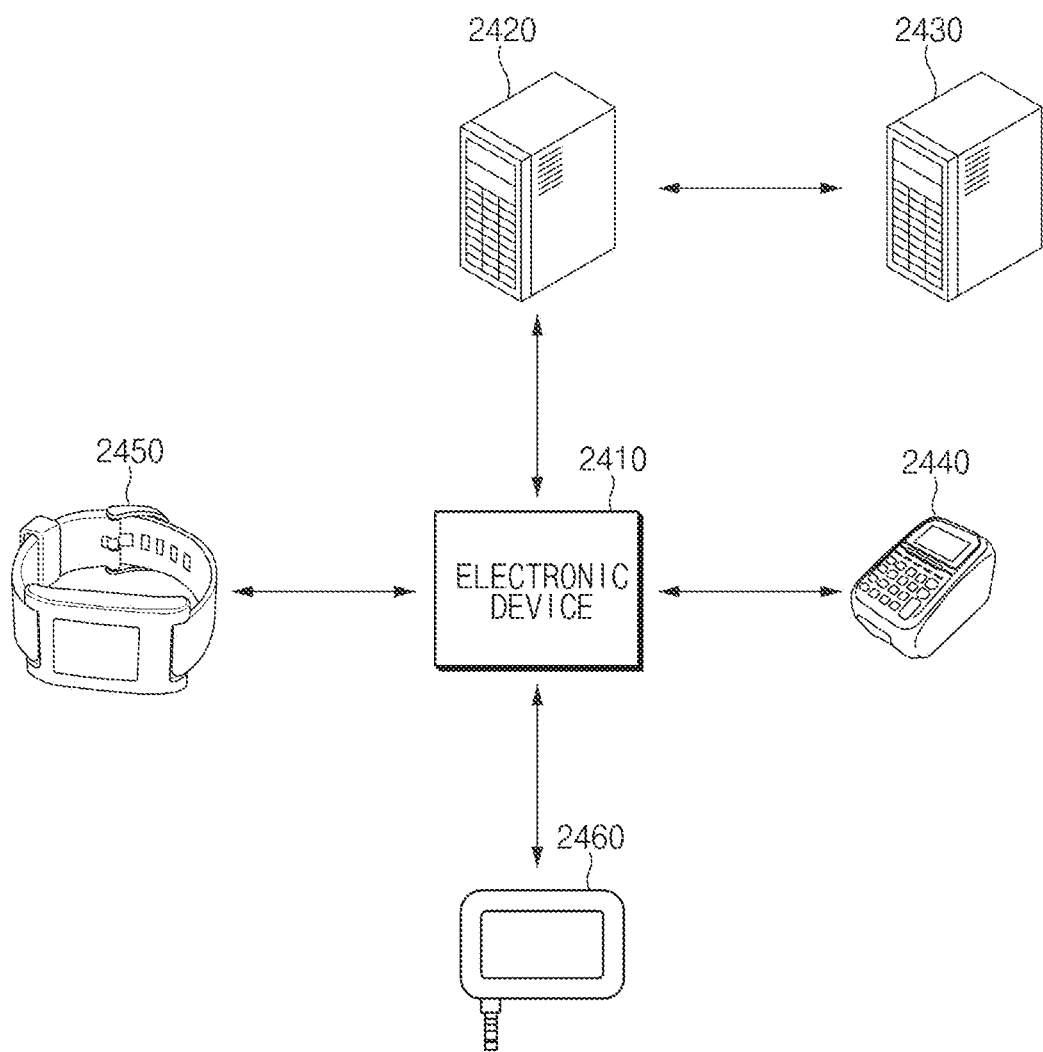
FIG. 24 is a block diagram illustrating a payment system for performing payment according to various embodiments of the present disclosure.

FIG. 24 is a block diagram illustrating a payment system for performing payment according to various embodiments of the present disclosure.

Referring to FIG. 24, the payment system may include an electronic device 2410 (for example, the electronic device 1801), a payment server 2420 (for example, the server 1806), a TSP 2430 (for example, the server 1806 or another server (not shown)), and a POS 2440 (for example, the electronic device 1802). According to an embodiment of the present disclosure, a payment system may include at least one additional electrode device 2450 or 2460. The at least one additional electronic device may include a wearable device 2450 (for example, a smart watch) or an accessory 2460 (for example, a fob form device from LoopPay™), which is functionally (for example, communication) connectable to the electronic device 2410. According to an embodiment of the present disclosure, the fob form device from LoopPay™ may include an external payment module connected to the electronic device 2410 through a microphone.

According to an embodiment of the present disclosure, the electronic device 2410 may operate a payment function. The electronic device 2410 may register a card (for example, credit cards, such as MasterCard or Visa) in the electronic device 2410 or the payment server 2420. The payment server 2420 may manage information on a card registered through another electronic device (for example, the electronic device 2450) of a user corresponding to the electronic device 2410 or a plurality of registered cards including other cards registered through another user's electronic device in addition to a card registered through the electronic device 2410.

According to an embodiment of the present disclosure, the payment server 2420 may obtain token information corresponding to registered card information from the token service provider 2430 and deliver token information to the electronic device 2410. The payment server 2420, for example, may include a payment service server or a token requester server. The payment service server may manage user's card information. The payment service server may provide payment related service based on account. The token requester server may obtain token information by requesting token information necessary for payment operation from the token service provider 2430.

The token service provider 2430 may issue a token used during a payment process. According to an embodiment of the present disclosure, the token may be a value for replacing a primary account number (PAN) that is card information. According to an embodiment of the present disclosure, the token may be generated by using a bank identification number (BIN). Additionally, the generated token may be encrypted by the token service provider 2430 or after the generated token is transmitted in an unencrypted state to the payment server 2420, the generated token may be encrypted by the payment server 2420. After the encrypted token information is delivered to the electronic device 2410 through the payment server 2420, the encrypted token information may be decoded in the electronic device 2410. According to an embodiment of the present disclosure, the token may be generated from the token service provider 2430 and encoded, and delivered to the electronic device 2410 without going through the payment server 2420. According to an embodiment of the present disclosure, the payment server 2420 may include a token generation function and in this case, an additional token service provider 2430 may not be used in a payment system.

The electronic device 2410, for example, may perform payment by using at least one of at least one another electronic device 2450 or 760 that is functionally connected based on short-range communication (for example, Bluetooth or Wi-Fi). According to an embodiment of the present disclosure, the other electronic device 2450 may be a wearable device (for example, a smart watch) and in this case, the electronic device 2410 may deliver a token delivered from the token service provider 2430 to a wearable device. According to an embodiment of the present disclosure, the other electronic device 2450 may be an accessory (for example, a fob form device from LoopPay™) and in this case, the electronic device 2410 may be functionally connected to the accessory for example, a fob form device from LoopPay™) through the input/output interface 1850 (for example, the earphone 1986).

Figure 25:
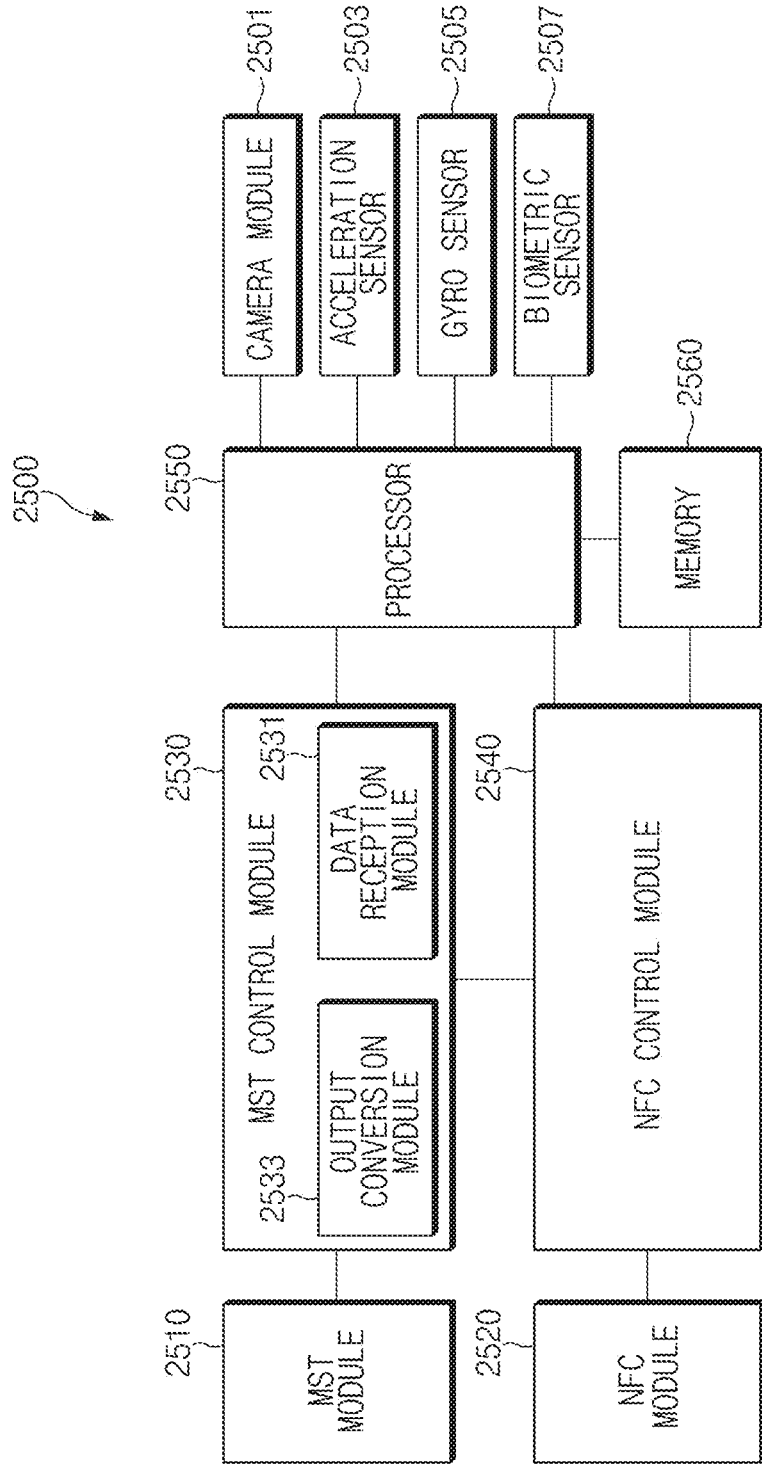
FIG. 25 is a block diagram illustrating a hardware structure of an electronic device for performing a payment function according to various embodiments of the present disclosure.

FIG. 25 is a block diagram illustrating a hardware structure of an electronic device for performing a payment function according to various embodiments of the present disclosure.

Referring to FIG. 25, according to an embodiment of the present disclosure, an electronic device 2500, for example, may include a camera module 2501, an acceleration sensor 2503, a gyro sensor 2505, a biometric sensor 2507, an MST module 2510, an NFC module 2520, an MST control module 2530, an NFC control module 2540, a processor 2550, and a memory 2560. The camera module 2501 may obtain card information by capturing a card necessary for payment. The camera module 2501 may recognize card information (for example, a card company, a card number, a card expiration date, or a card holder) indicated on a card through an OCR function. Alternatively, a user may input necessary card information to an electronic device by using an input device (for example, a touch panel, a pen sensor, a key, an ultrasonic input device, or a microphone input device) in the electronic device 2500.

According to an embodiment of the present disclosure, the acceleration sensor 2503 or the gyro sensor 2505 may obtain the position state of the electronic device 2500 during payment. The obtained position information of the electronic device 2500 (for example, the electronic device 1801) may be delivered to the processor 2550 and the processor 2550 may adjust the intensity of a magnetic field transmitted from the MST module 2510 to a POS based on the obtained position state of the electronic device 2500. When there are a plurality of coil antennas, the processor 2550 may select a coil antenna to be used. According to an embodiment of the present disclosure, the MST control module 2350 may include a data reception module 2531 and an output conversion module 2533. The data reception module 2531 may receive a pulse signal in a logical low/high form including payment information transmitted by the processor 2550 or a security module (for example, an eSE).

The output conversion module 2533 may include a circuit converted into a necessary form in order to deliver data recognized by the data reception module 2531 to the MST module 2510. The circuit may include an H-Bridge for controlling a direction of a voltage supplied to the both ends of the MST module 2510 The H-Bridge may have a circuit structure connected in an H form by using four switch structures.

According to an embodiment of the present disclosure, based on card information inputted through the camera module 2501 or an input device (for example, a touch panel, a pen sensor, and the like), the electronic device 2500 may receive payment information (for example, track 1/2/3 or token information) included in the magnetic stripe of a magnetic card from a card company/bank server through a communication module (not shown). The electronic device 2500 may store the received payment information in the memory 2560 or an additional security module (for example, an eSE) in a necessary form.

Figure 26A:
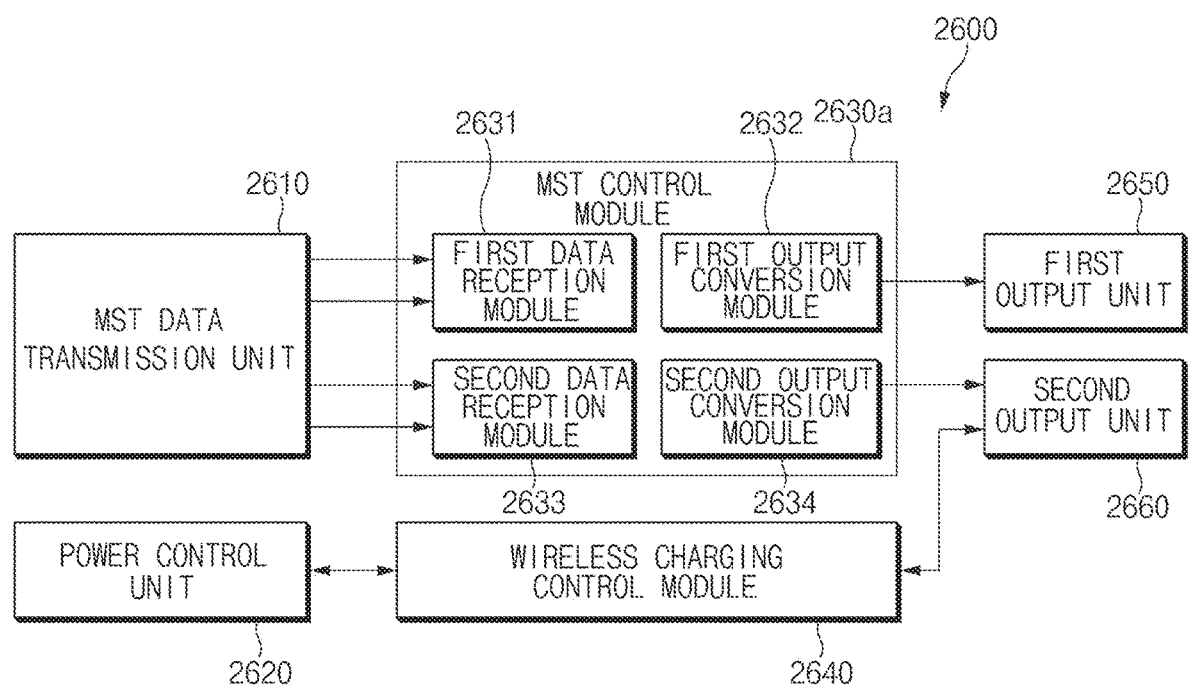
FIG. 26A is a hardware (H/W) block diagram illustrating an inside of an electronic device for commonly using a wireless short-range communication with at least one of a plurality of MST modules according to various embodiments of the present disclosure.
Figure 26B:
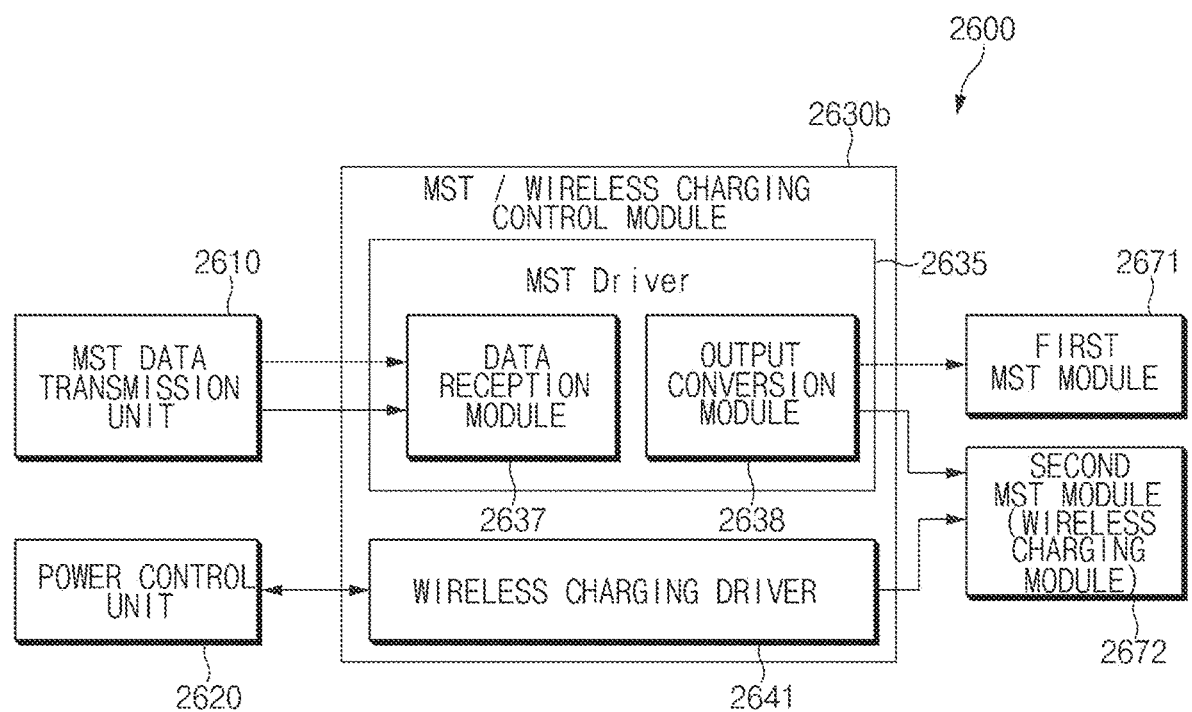
FIG. 26B is an H/W block diagram illustrating an inside of an electronic device for commonly using a wireless short-range communication with at least one of a plurality of MST modules according to various embodiments of the present disclosure.
Figure 26C:
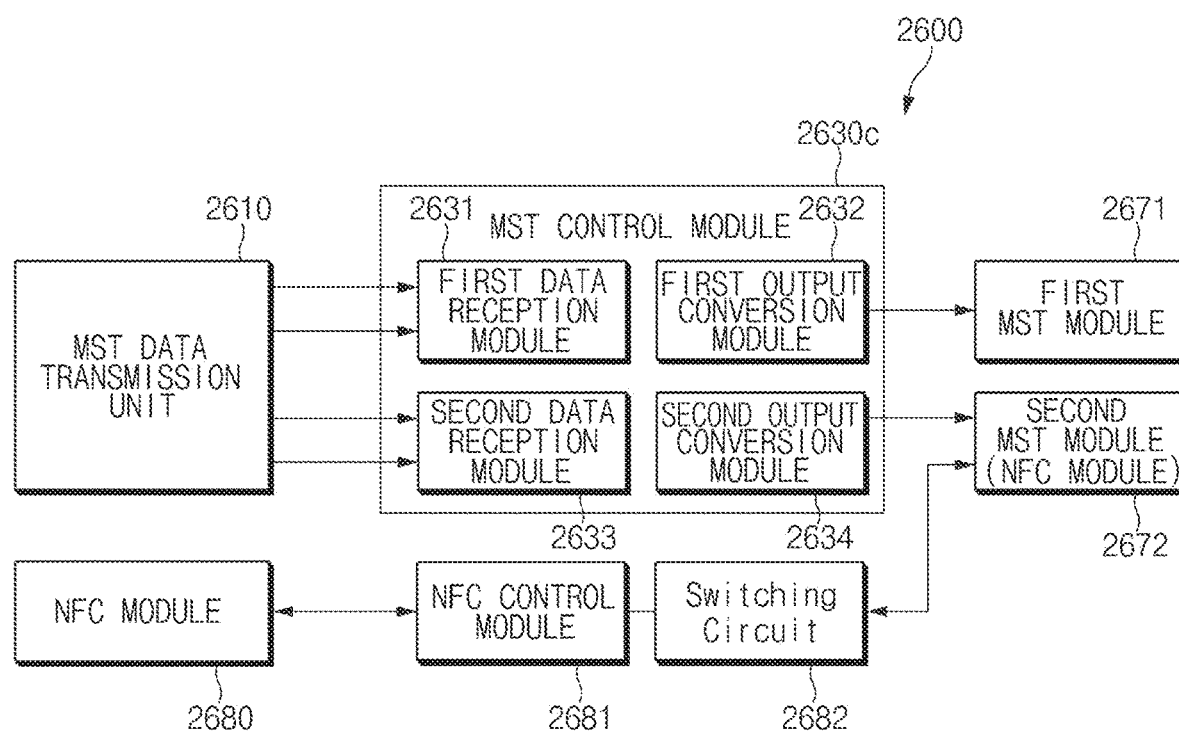
FIG. 26C is an H/W block diagram illustrating an inside of an electronic device for commonly using a wireless short-range communication with at least one of a plurality of MST modules according to various embodiments of the present disclosure.

FIGS. 26A, 26B, and 26C are hardware (H/W) block diagrams illustrating an inside of an electronic device for commonly using a wireless short-range communication with at least one of a plurality of MST modules according to various embodiments of the present disclosure.

Referring to FIG. 26A, an electronic device 2600 may include an MST data transmission unit 2610, an MST control module 2630a, a first output unit 2650, a power control unit 2620, a wireless charging control module 2640, and a second output unit 2660. The MST data transmission unit 2610 may include a first data reception module 2631, a first output conversion module 2632, a second data reception module 2633, and a second output conversion module 2634. The MST data transmission unit 2610 may deliver signals to one of the first data reception module 2631 and the second data reception module 2633 and a corresponding signal may be converted by the first output conversion module 2632 and the second output conversion module 2634 and transmitted through the first output unit 2650 or the second output unit 2660. The second output unit 2660 may be connected to the wireless charging control module 2650 and used for wireless power charring. The power control module 2620 may include a power management module 1995 in a terminal. According to an embodiment of the present disclosure, an MST module corresponding to the first output 2650, for example, may include a coil antenna having an about 10 uH inductance value. The wireless charging control module 2640 may include an alternating current/direct current (AC/DC) converter or a rectifier.

Referring to FIG. 26B, the electronic device 2600 may include an MST data transmission unit 2610, an MST/wireless charging control module 2630b, a power control unit 2620, a first MST module 2671, and a second MST module 2672. The MST/wireless charging control module 2630b may include an MST driver 2635 and a wireless charging driver 2641. The MST driver 2635 may include a data reception module 2637 and an output conversion module 2638. The wireless charging control driver 2641 may include an AC/DC converter or a rectifier. The electronic device 2600 may use at least one MST module among the plurality of MST output units 2671 and 2672 as a wireless charging dedicated coil antenna. When the second MST module 2672 is connected to the wireless charging driver 2641 and operates as a wireless charging module (for example, a wireless charging coil antenna), a switching unit may be further disposed between the second MST module 2672 and the MST driver 2635 in order to form a selective connection.

Referring to FIG. 26C, the electronic device 2600 may include an MST data transmission unit 2610, an MST control module 2630c, a first MST module 2671, a second MST module 2672, an NFC module 2680, an NFC control module 2681, and a switching circuit 2682. The MST control module 2630c may include a first data reception module 2631, a second data reception module 2633, and output conversion modules 2632 and 2634 like the MST control module 2630a shown in FIG. 26A. The second MST module 2672 may be selectively used for MST data transmission or NFC data transmission. When the second MST module 2672 is used as an NFC coil antenna, in order to adjust the turn number of a coil antenna or an inductance value, the electronic device 2600 may operate the switching circuit 2682.

Figure 27:
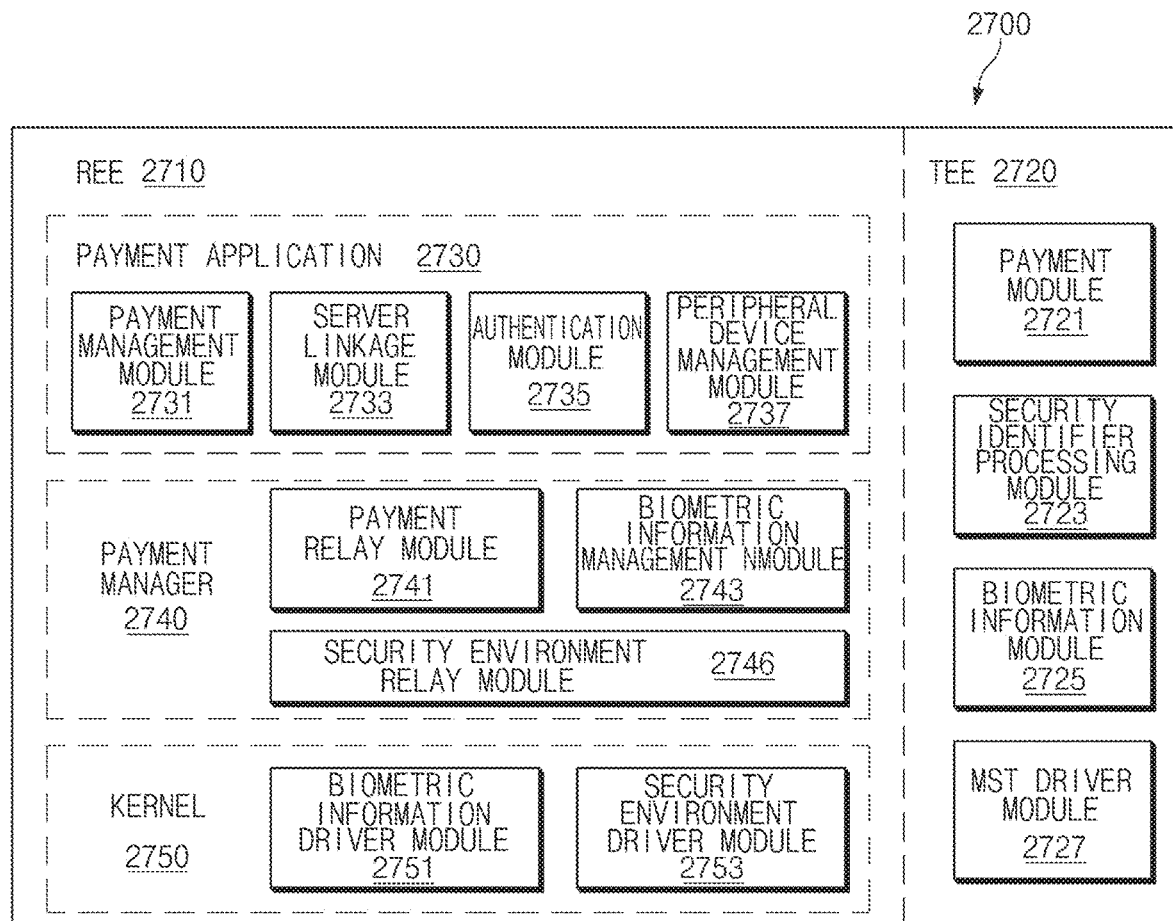
FIG. 27 is a block diagram illustrating program modules executed in an execution environment of an electronic device for performing a payment function according to various embodiments of the present disclosure.

FIG. 27 is a block diagram illustrating program modules executed in an execution environment of an electronic device for performing a payment function according to various embodiments of the present disclosure.

Referring to FIG. 27, the execution environment of an electronic device 2700, for example, may include an REE 2710 and a TEE 2720.

According to an embodiment of the present disclosure, in order for payment, for example, the REE 2710 may include a payment application 2730 (for example, the payment application 2085), a payment manager 2740 (for example, the payment manager 2054), and a kernel 2750 (for example, the kernel 2020). According to an embodiment of the present disclosure, the payment application 2730 may include a payment management module 2731, a server linkage module 2733, an authentication module 2735, and a peripheral device management module 2737.

According to an embodiment of the present disclosure, the payment management module 2731 may perform an operation for card registration, card authentication, card deletion, and payment. The payment management module 2731 may register a user's card. The electronic device 2700 (for example, the electronic device 1801) may receive a card registration request from a user. The electronic device 2700 may obtain a card image by using a camera module. The payment management module 2731 may obtain a card image through an OCR module. The payment management module 2731 may receive card information related information (for example, password, home address, e-mail address, phone number, or account ID) from a user or obtain the card information related information from the payment server 2420.

According to an embodiment of the present disclosure, the payment management module 2731 may display a registered card to a user through a display (for example, the display 1860). A user may modify at least some of information (for example, card name, home address, phone number, the number of payment tries, or whether payment notification information is received) in the registered card. The payment management module 2731 may display a transaction history according to each card. The payment management module 2731 may display card information registered in a wearable device (for example, a smart watch) functionally connected to an electronic device.

According to an embodiment of the present disclosure, the payment management module 2731 may perform a payment operation by using a registered card. A user may select one of a plurality of cards registered for payment. A user may take the electronic device 2700 to a POS 1400. The payment management module 2731 may display product information (for example, price) delivered from the POS 1400 through the display 1860. The payment management module 2731 may perform user authentication (for example, fingerprint authentication) through the authentication module 2735 for payment. When authentication is completed, the payment management module 2731 may display notification information that payment is completed, through the display 1860.

According to an embodiment of the present disclosure, the electronic device 2700 may transmit payment information to the POS 1400 by using at least one of an MST module and an NFC module. In order to increase a recognition rate, payment information may be transmitted to the POS 1400 by using both the MST module and the NFC module. Alternatively, when payment information is transmitted by using the MST module and payment is failed, the electronic device 2700 may transmit payment information by using the NFC module. A method of recognizing that payment is failed may include a case that notification is received from the POS 1400 or a third party (for example, financial institution) or a case of exceeding a specified time elapses. According to various embodiments are not limited to the order and its reversal order is possible.

According to an embodiment of the present disclosure, the electronic device 2700 may receive a request that a user deletes at least one card among pre-registered cards. The payment management module 2731 may delete information corresponding to a corresponding card from the memory 1830. The payment management module 2731 may request the payment server 2420 to delete information corresponding to the at least one card.

According to an embodiment of the present disclosure, the payment management module 2731 may determine whether a card's holder is identical to a user who registers a card. The payment management module 2731, for example, may include an ID&V module. The payment management module 2731 may perform user authentication through an SMS, an e-mail, ARS, or phone call. Additionally, authentication may be performed through an application issued by a card company or a bank. A card registered through the payment management module 2731 may be used after authentication.

According to an embodiment of the present disclosure, the payment management module 2731 may include an OCR module. The OCR module may obtain an image of characters written by a person or printed by a machine and convert the image of characters into machine readable characters. The electronic device 2700 may obtain an image of a card owned by a user through a camera module. The OCR module may convert images, characters, or numbers written on a card in a card image into machine readable characters. The OCR module may obtain user's card information (for example, card number, user name, or expiration period) through the converted characters. The electronic device 2700 may perform a card registration process by obtaining user's card information through an OCR module.

According to an embodiment of the present disclosure, the payment management module 2731 may display a barcode generated for payment through the display 1860. For example, the payment management module 2731 may receive a command for generating a barcode, through which payment is performed by using a barcode reader, from the POS 2440. The payment management module 2731 may generate a barcode based on the command.

According to an embodiment of the present disclosure, the server linkage module 2733 may receive a payment related message, a device related message, or a service related message from the payment server 2420 or the token service provider 2430. The server linkage module 2733 may deliver the message to the payment management module 2731.

According to an embodiment of the present disclosure, the server linkage module 2733, for example, may include a push management module and an account management module. For example, when a message received from the payment server 2420 is in a token related push notification form, the push management module processes the received message and when the received message is account related information (for example, Samsung account), the account management module may process the received message.

According to an embodiment of the present disclosure, the push management module may calculate and handle push notification or push message (for example, push notification or push message) information received from the payment server 2420. The push message may be delivered to the server linkage module 2733 in the payment application 2730 through a payment relay module 2741 in the payment manager 2740 or 2054, or may be directly delivered to the payment application 2730. At least part of the delivered push message may be delivered to the payment management module 2731 to update card related information and to be synchronized with the payment server 2420.

According to an embodiment of the present disclosure, the payment server 2420 may include an account server for managing account related information or a token requester server for providing payment related information. The account server and the token requester server may be implemented with an additional device (for example, the server 1806) and be included in one device.

According to an embodiment of the present disclosure, message information received by a push management module, as shown in Table 1, may include token and payment related information, such as authority setting (for example, token provisioning), suspension (for example, token suspension), discard (for example, token disposal), state switch (for example, token status change), additional issue (for example, token replenishment), and payment determination (for example, transaction notification).

A message transmitted/received from/by an account management module may include at least part of electronic device related information, such as lost electronic device determination function (for example, lost device, find my mobile), remote shutdown (for example, remote lock/unlock), membership management (for example, loyalty/membership cards), and web linkage function (for example, website portal-online).

TABLE 1

| Push management | Use case | Details |
| --- | --- | --- |
| Token | Token provisioning with ID & V | Download card information for Identification, verification in order for token installation and authentication, from an external server to a push management module in an electronic device |
| | Token suspension | Deliver it for stopping token use, from an external server to a push management module in an electronic device |
| | Token resume | Deliver it for resuming token use, from an external server to a push management module in an electronic device |
| | Token disposal | Deliver it for token disposal, from an external server to a push management module in an electronic device |
| | Token status change | Deliver it for changing card state, from an external server to a push management module in an electronic device |
| | Token Replenishment | Deliver it for issuing an additional token, from an external server to a push management module in an electronic device |
| | Transaction Notification | Deliver a token payment history, from an external server (for example, a payment server) to a push management module in an electronic device |
| Device | Lost Device (Find my mobile) | Deliver lost history information between an external server (for example, a service server) and an account management module in an electronic device |
| | Remote lock/unlock | Deliver a remote device blocking instruction between an external server (for example, a service server) and an account management module in an electronic device |
| | Loyalty/ Membership cards | Deliver membership information between an external server (for example, a service server) and an account management module in an electronic device |
| | Website (online) | Support a web linkage function between an external server (for example, a service server) and an account management module in an electronic |

According to an embodiment of present disclosure, when token provisioning ID & V information obtained by the payment management module is successfully delivered to an outside server through the payment server 2420 and delivered token related information is valid, the message "push token {id} status changed" may be received by the server linkage module 2733 and delivered to the payment management module 2731.

According to an embodiment of the present disclosure, card information temporary suspension (for example, token suspension) information obtained from the payment management module 2731 of the electronic device 2700 may deliver a use suspension instruction of the payment server 2420 to the payment application 2730 so that the payment application 2730 may change a card setting state for mobile payment from an active state to an inactive state.

According to an embodiment of the present disclosure, when the electronic device 2700 is lost, the payment server 2420 may delete or temporarily suspend all token information relating to the electronic device 2700 stored in the payment server 2420. The payment server 2420 may transmit a push message in order to synchronize the deleted or paused information with the payment application 2730. For example, the payment server 2420 may deliver information necessary for the synchronization to the payment application 2730 through the payment relay module 2731 or the server linkage module 2733 (for example, a push management module and an account management module).

Referring to Table 2, the content of push API supported by an electronic device and the payment relay module 2731 may be divided according to the payment relay module 2731 and implemented separately.

TABLE 2

| API | Description | type | validation |
|---|---|---|---|
| device.push | Contains push platform | Json | required |
| device.push.spp.id | Samsung Push Id. | String | required |
| device.push.gcm.id | Google Push Id. | String | optional |

According to an embodiment of the present disclosure, an account management module may deliver information, such as a user's unique identifier (for example, Samsung account id or device id), a card, or a membership, which exchanged with the payment server 2420, to the payment application 2730, and the payment application 2730 may manage the received information. The user identifier may include a user subscribed account, an electronic device related portal account, or an electronic device's unique identifier (for example, MAC address, international mobile equipment identity (IMEI), serial number, universally unique identifier (UUID), or ID), in order to manage several company's cards (for example, Visa or MasterCard). Furthermore, the unique identifier may be a value generated from the payment server 2420 through the account and received from the payment server 2420.

The account management module may manage the registration, addition, deletion, duplicate registration, use suspension, or use resume of a card by using the user's account or the electronic device identifier. Besides that, even when card information is imported/exported between an electronic device and a wearable device, the registration, addition, deletion, duplicate registration determination, use suspension, or use resume of a card may be managed based on the generated account or the electronic device identifier.

At this point, in relation to an account based management method, as a plurality of electronic devices or a plurality of users, which or who share one account, are managed, an electronic device specific unique account (for example, Samsung account) may be used or a plurality of electronic devices may be integrally managed by using one account.

According to an embodiment of the present disclosure, when information on a first card (for example, Visa) and a second card (for example, MasterCard), which are generated through an optical character recognition module (for example, an OCR module) of the payment management module 2731, may be registered based on an account (for example, registration02@samsung.com) generated when a user sings up Samsung account. At this point, the registered information may be synchronized with the payment server 2420 based on the generated account.

According to an embodiment of the present disclosure, membership information generated through a barcode interface may register a first card (for example, a Samsung points card) and a second card (for example, a CJ membership points card) based on the account (for example, registration02@samsung.com) generated when a user sings up for a Samsung account. The registered information may be synchronized with the payment server 2420 based on the generated account.

Additionally, a user may determine an active/inactive state of an account based card after logging into a payment application and deliver the active/inactive state of the account based card to the payment server 2320 or 2420 by using the account management module 2731, and on the other hand, may manage and switch an account based card state on a server management web page (for example, a server portal).

Additionally, the account management module may manage card information (for example, Visa card ID&V) and membership information (for example, CJ membership points and registration001@Cj.com), which relate to a service account (for example, registration01@samsung.com), in linkage with a server. The membership information may automatically save or deduct during card payment in linkage with payment processing information (for example, payment amount) and membership cumulative information (for example, points, mileages, and the like).

Once a payment application including an account management module is installed, the account management method supports to use the payment application with only a user's account log-in or sign-in process once at any device in continuous linkage with a setting state of the entire or part of an existing registered card. Additionally, the account management method may reduce an additional authentication process as membership information having a relatively low authentication security level is registered and linked based on the account.

According to an embodiment of the present disclosure, the authentication module 2735 may display a UI for performing the authentication of a card or a user for payment through the display 1860. The authentication module, for example, may include a biometric information module.

According to an embodiment of the present disclosure, the biometric information module may obtain user's biometric information. The user's biometric information, for example, may include fingerprint, iris, face image, voice, heart rate, or blood pressure information. An electronic device may obtain user's biometric information through a sensor module. For example, an electronic device may obtain user's fingerprint information through a fingerprint sensor. Alternatively, an electronic device may obtain user's iris information through a camera module. The biometric information module may display a UI for obtaining user's biometric information through the display 1860.

According to an embodiment of the present disclosure, when a user attempts to process payment by using card information registered in an electronic device, the biometric information module may perform authentication in order to obtain security data (for example, a token) from a security memory (for example, eSE or memory accessible from security environment) functionally connected to the electronic device. The electronic device may obtain user's biometric information (for example, fingerprint or iris) through the biometric information module in order for user authentication. The obtained biometric information may be delivered to the biometric information management module 2743 of the payment manager 2740. According to an embodiment of the present disclosure, the security memory may be a memory storing data with an encrypted key.

According to an embodiment of the present disclosure, the biometric information module 2743 may process a payment by using card information and biometric information, which are registered in an electronic device, when a user processes an electronic payment on an internet webpage. A user may perform authentication in order to obtain security data (for example, a token) from a memory or security module (for example, an eSE or memory accessible from security environment), which are functionally connected to an electronic device. When the user authentication progresses successfully, the electronic device may link the progressed authentication information with an external server to provide a fast auto authentication (for example, fast identity online (FIDO)) without an electronic payment process on an additional internet webpage. For example, the electronic device may process fast authentication by linking an authentication process necessary for online payment with the biometric information module 2743.

According to an embodiment of the present disclosure, an electronic device may specify a user's fingerprint and a card for payment. For example, when performing authentication in payment application by using a fingerprint, a user may specify the right thumb for Visa and the right index finger for MasterCard and the electronic device 2700 may classify information types according to user authentication and based on this, support payment with a related card.

According to an embodiment of the present disclosure, the peripheral device management module 2737 may manage an external device functionally connected to an electronic device. The peripheral device management module 2737 may include an MST peripheral device module and a wearable device module.

According to an embodiment of the present disclosure, the MST peripheral device module may determine whether there is a wired/wireless connection between an MST accessory (for example, a fob form device from LoopPay™) and an electronic device and based on this, provide a UI appropriate for a user. When the MST accessory is connected, the UI may output information relating to a progress of a card registration, deletion, or payment process. When being connected to the MST accessory, the MST peripheral device module may store a variety of card information necessary for payment in an additional memory in an electronic device or the MST accessory. This allows the electronic device or the MST accessory to process payment independently when the electronic device is not connected to the MST accessory.

The wearable device module may determine whether there is a wired/wireless connection between a wearable device (for example, a watch, a headset, a glasses, or ring) and an electronic device and based on this, provide a UI appropriate for a user. The wired/wireless connection may include various interface connections, such as Bluetooth, BLE, Wi-Fi, ZigBee, or Z-wave and may be implemented by applying a specific accessory protocol (for example, Samsung accessory protocol (SAP)). When a wearable device is connected, the UI may output information relating to a card registration, deletion, or payment execution process. During the card registration, deletion, or payment execution process, the wearable device module may output whether a short-range based session with a wearable device is established, transmit/receive a user input value on the electronic device or the wearable device, and display a transmission/reception result. The user input may include a variety of card information necessary for payment and additional authentication information other than that (for example, PIN, user unique pattern related data, fingerprint recognition related data, and a touch input value of a wearable device's bezel unit or the display 1860).

According to an embodiment of the present disclosure, the electronic device may share one payment information with a wearable device or an accessory. For example, information on one Visa card may be stored in both the wearable device and the electronic device. According to an embodiment of the present disclosure, the electronic device may store different card information, which are generated from one card information, in each of the wearable device and the accessory. For example, one of different tokens issued from one Visa card information may be stored in the electronic device and the other one may be stored in the wearable device. According to an embodiment of the present disclosure, when one of different tokens issued from one card information is stored in the electronic device and the other one is stored in the accessory or the wearable device, as a payment module of one device is activated, a payment module of another device may be deactivated. For example, when one of different tokens issued from one Visa card information is stored in the electronic device and the other one is stored in the accessory or the wearable device, as payment is processed by the wearable device, the payment of the electronic device may be deactivated. Furthermore, when payment is processed by the electronic device, the payment of the wearable device may be deactivated.

According to an embodiment of the present disclosure, the payment manager 2740, for example, may include a payment relay module 2741, a biometric information management module 2743, and a security environment relay module 2746. According to various embodiments of the present disclosure, the payment relay module 2741 may relay a card or information (for example, a token) corresponding to the card to a payment application, a kernel, or the payment server 2420. The payment relay module 2741 may process an off-line payment through a communication module (for example, an NFC module and an MST module). A payment method using NFC may be executable through a POS and a payment method using MST may be executed by a user input. Additionally, the payment relay module 2741 may process on-line payment through a communication module (for example, a cellular module, an RF module, a Wi-Fi module, and the like).

According to an embodiment of the present disclosure, the payment relay module 2741 may manage (for example, manage a card/token lifecycle) a state of a card or information (for example, a token) corresponding to the card. The payment relay module 2741 may provide at least one API relating to payment to the payment application 2730.

According to an embodiment of the present disclosure, the payment relay module 2741 may further include system service interfaces for providing an interface provided by system services relating to at least one payment, payment service for accessing a payment module, Trustzone-based integrity measurement architecture (TIMA) for kernel integrity authentication, fingerprint recognition result views (for example, supporting both security and non-security mode), and a security UI for primary identification number (PIN) or PAN. The payment relay module 2741 may include an encryption library in order to deliver a message or an instruction to the TEE 2720. The payment relay module 2741 may exchange a message or an instruction with the TEE 2720 through the encryption library.

According to an embodiment of the present disclosure, the payment relay module 2741 may process a card management function for providing functions of card addition, deletion, and update as a general card management function. The payment relay module 2741 may include a first payment SDK or a second payment SDK. The first payment SDK (for example, Samsung SDK) may be embedded in an electronic device. The second payment SDK may be provided from a card company or a bank, and may be installed on the electronic device. The payment relay module 2741 may select a corresponding payment SDK according to card information by using the first payment SDK or the second payment SDK. Additionally, the payment relay module 2741 may set a default card or another card other than the default card.

According to an embodiment of the present disclosure, the payment relay module 2741 may transmit, to the payment server 2320 or 2420, as a general token and key management function, a message of an initial authority setting (for example, token provisioning), an additional issue (for example, token replenishment), suspension (for example, token suspension), resume (for example, token resume), and disposal (for example, token disposal).

According to an embodiment of the present disclosure, a payment module 2721 may obtain a token and a token cryptogram from an electronic device or an external another electronic device. A key (for example, limited used key (LUK) or single used key) for generating the token and the token cryptogram may be stored in the REE 2710 or the TEE 2720. Furthermore, when the token and the key are stored in the REE 2710, the payment module of the TEE 2720 may encrypt or store them by using a key (for example, a device root key (DRK)) of the TEE 2720. When the electronic device processes payment, the payment relay module 2741 may obtain the encrypted token in a decrypted state through a payment module. When a key or a token for generating the token cryptogram is stored in the TEE 2720, the electronic device may store the key or token in an encrypted form by using the key of the TEE 2720.

According to an embodiment of the present disclosure, the payment relay module 2741 may receive a push message from the TSP 2430 and deliver the push message to the payment application 2730.

According to an embodiment of the present disclosure, when the first payment SDK (provided from a card company or a bank) provides a self-token management function, upon the receipt of a token management function request, the payment relay module 2741 may further include a function for relaying the function to the second payment SDK. For example, a payment relay module, which obtains a token or a key by using the SDK of a Visa card, may deliver the key or token to the payment module in the TEE 2720. According to an embodiment of the present disclosure, the payment relay module 2741 may further include, on a payment framework, a host card emulation function for allowing a virtual card to be used in an electronic device without an additional hardware device (for example, a secure module or an SE) during payment. The HCE function may deliver a token and a token cryptogram through a communication module (for example, NFC) by using a POS related message standard (for example, application protocol data unit (APDU)).

According to an embodiment of the present disclosure, the payment relay module 2741 may include a function for processing a message received from a POS. The POS related message processing function may include a function for managing payment data to response to the POS. The POS related message interpretation function may further include a function for relaying the POS related message to the first payment SDK when the first payment SDK provides a self POS related message processing function. According to an embodiment of the present disclosure, the payment relay module 2741 may include at least one database for storing the card data, token data, or transaction data.

According to an embodiment of the present disclosure, the payment relay module 2741 may select one of a payment method using NFC and a payment method using MST. For example, the payment relay module 2741 may select one of a method of performing payment by using NFC first and using MST, a method of performing payment by using MST first and using NFC, and a method of performing payment by using both NFC and MST. According to an embodiment of the present disclosure, after performing payment through one communication module and through another communication module, if there is no respond to a result from the one communication module that performs the payment first or a specified time elapses, the payment relay module 2741 may perform the payment through the other communication module.

According to an embodiment of the present disclosure, when owning both a token and PAN information for one card, the payment relay module 2741 may perform payment by using at least one of the owned information. The payment relay module 2741 may determine whether payment is completed at a POS with the PAN or the token. For example, the electronic device may receive payment available information through BLE and the payment relay module 2741 may determine the information. When payment is possible with a token based on the confirmed information, the payment relay module 2741 may perform the payment with the token and when the payment is possible with a PAN, perform the payment with the PAN.

According to an embodiment of the present disclosure, the payment relay module 2741 may further include SDK provided from payment network. The SDK may include token management, POS related message processing, or token/card database.

According to an embodiment of the present disclosure, the security environment relay module 2746 may further include a function for performing relay to allow payment information to access a biometric information driver module 2751 or a security environment driver module 2753 in order to use functions provided from the payment module 2721 or a biometric information module 2725. The payment relay module 2741 may include an encryption library in order to deliver a message or an instruction to the security environment relay module 2746. The payment relay module 2741 may exchange a message or an instruction with the security environment relay module 2746 through the encryption library.

According to various embodiments of the present disclosure, the payment manager 2740 may further include a security environment relay module 2746 connected to allow a function of a security identifier processing module in the TEE 2720 to be used in payment application.

According to an embodiment of the present disclosure, the payment relay module 2741 may include a function for relaying an authentication request through a PIN input of the payment application 2730 to a security identifier processing module 2723 in the TEE 2720.

General application may obtain whether fingerprint recognition is successful or failed at the fingerprint recognition request. Security payment application (for example, payment trusted app) may obtain a secure biometric result (for example, a secure fingerprint result). The secure biometric result may be in an encrypted form by combining one-time random number and whether it is successful/failed. The one-time random number may be encrypted through a hardware key (for example, a DRK).

According to an embodiment of the present disclosure, the payment relay module 2714 may deliver a message for payment processing to the payment module 2721 through the security environment driver module 2753 in order to perform payment. The payment module 2721 may notify the payment relay module 2741 that an authentication operation is necessary, through the security environment driver module 2753. The payment relay module 2714 may issue an instruction to the biometric sensor 1940I to obtain biometric information through the biometric information management module 2743 and the biometric information driver module 2741, in order for an authentication operation. Furthermore, the payment relay module 2714 may deliver an authentication determination message to the biometric information module 2725 in the TEE 2720 through the biometric information management module 2743 and the security environment driver module 2753.

The biometric sensor 1940I may be obtained from the biometric information module 2725 in the TEE 2720. The biometric information module 2725 may determine whether there is the same user by comparing user's biometric information and information obtained from a biometric sensor. Based on the confirmed information, the biometric information module 2725 may deliver whether the user's biometric information and information obtained from a biometric sensor is authenticated to the biometric information management module 2743 through the security environment driver module 2753 and the biometric information management module 2743 may deliver the user's biometric information and information obtained from a biometric sensor to the payment relay module 2741. The payment relay module 2741 and the biometric information management module 2743 may be configured as one or may be configured as separate modules.

According to an embodiment of the present disclosure, the payment relay module 2741 may perform authentication through an external device. For example, the electronic device 2700 may request an authentication on biometric information (for example, fingerprint or iris) from the payment server 2420 (for example, a Samsung account server or a token requester server). The payment server 2420 may perform an authentication on user's biometric information and deliver a corresponding result to the electronic device 2700. When the authentication is completed, the payment relay module 2741 may deliver data including information on that the authentication is completed to the token service provider and perform a token provisioning process. Furthermore, when the authentication is completed according to the authentication result, the electronic device may perform payment and if the authentication is not completed or is not made, may not perform payment.

According to an embodiment of the present disclosure, the kernel 2750, for example, may include a biometric information driver module 2751 and a security environment driver module 2753. The biometric information driver module 2751 may deliver a message, which is delivered from the biometric information management module 2743 of the payment manager 2740, to the biometric sensor 1940I. Biometric information obtained from a biometric sensor may not be delivered to a module in the REE 2710 but may be delivered to the biometric information module 2725 in the TEE 2720.

According to an embodiment of the present disclosure, the security environment driver module 2753 may serve as an interface for delivering information from a module in the REE 2710 to a module in the TEE 2720. For example, in the case of TrustZone® of ARM® that is one embodiment of TEE, when performing an operation of REE and TEE by time division, an application processor may implement an additional data path for delivering a message from REE to TEE in terms of hardware. In this case, a driver module for accessing this hardware may be the security environment driver module 2753. The security environment driver module 2753 may deliver a message on an operation of a module in TEE to a module in REE.

According to an embodiment of the present disclosure, the TEE 2720 may include a payment module 2721, a security identifier processing module 2723, a biometric information module 2725, and an MST driver module 272. The electronic device 2401 may store data requiring a relatively high security in a safe environment through the TEE 2720 and perform a related operation. In relation to the TEE 2720, a reliable TEE, which operates on an application processor of an electronic device and is determined during a manufacturing process of an electronic device, may refer to a security area in an electronic device. The electronic device may operate data requiring a relatively high security through TEE based on a safe hardware structure. The TEE 2720 may divide an application processor and a memory area into a general area and a security area and operate them. Furthermore, the TEE 2720 may allow software or hardware requiring security to operate only in a security area. When an electronic device is required to perform an operation relating to sensitive information, the electronic device may access the TEE 2720 only through APIs and drivers accessible to the TEE 2720. The TEE 2720 may hand over limited data on related information to REE. The TEE 2720 may encrypt internally stored data through a hardware key (for example, a DRK). Data in the TEE 2720 may not be interpreted in REE if there is no additional decryption process.

In relation to the TEE 2720, an application (for example, security application (for example, trusted application) or a payment module) in TEE may deliver a message to another electronic device (for example, the token service provider 243) outside an electronic device.

According to an embodiment of the present disclosure, the TEE 2720 may include trusted OS and security application (for example, trusted application). Furthermore, the TEE 2720 may include a security related encryption module and a driver for collecting data from security required hardware. Security application (for example, trusted application) may include a payment module. Furthermore, payment information may be delivered to the outside through a communication module. For example, payment information may be transmitted to an MST controller through an MST driver or to an NFC controller through an NFC driver in order to transmit to a POS.

According to an embodiment of the present disclosure, it is determined whether integrity on the REE 271 is provided. An electronic device may store whether integrity on an image in REE is provided in the TEE 2720. In the case of REE booting supporting TEE, when a boot loader is executed, the order of booting may be to boot TEE first and REE. If TEE is booted, integrity information of REE in TEE is determined and provided to a user after REE booting. According to an embodiment of the present disclosure, if an image of REE is damaged by hacking or routing, it is determined that there is an issue in the integrity. If there is an issue in the integrity, TEE may not be accessed. For example, when the payment relay module 2741 is to deliver a message or an instruction to TEE through the security environment driver module 2753, the kernel in TEE may ignore the message or the instruction or refuse the message reception.

According to an embodiment of the present disclosure, the payment module 2721 may be an application installed from a bank or a card company (for example, Visa or MasterCard). The payment module 2721 may be at least one. When a user of an electronic device accesses the payment server 2420 (for example, a mobile application platform, a payment gateway, a token requestor, a token service provider, a trusted service manager, or a bank server) or the token service provider 243 via internet by using the payment management module 2731 and it is approved that the payment module 2721 is installed, the token service provider 2430 may perform an installation related operation. For example, the payment management module 2731 may perform a card registration operation for installing the payment module 2721 on the server by obtaining the card number and expiration period information of a plastic card through OCR. By receiving an installation file in connection to the token service provider 2430 in network through the payment relay module 2741 having connection information of each token service provider 2430 according to a card/bank company, the payment relay module 2741 may install the payment module 2721 by delivering the information to TEE. Such a process may be called a provisioning process or a card registration process. The payment module 2721 in TEE may be several modules. Each payment module may not exchange data in TEE and may be configured in a separated form.

According to an embodiment of the present disclosure, the payment module 2721 may be an application used for data communication with the payment server 2420. The payment module may include information on credit card, debit card, and membership card. The payment module may exchange communication with another external electronic device through encryption. The encryption process may vary according to a card manufacturer that delivers the payment module. The server may control a state of the payment module. For example, the server may activate, temporarily suspend, resume, or delete the payment module.

According to an embodiment of the present disclosure, the payment module 2721 may store information relating to card information. For example, it may be at least one of token corresponding to the card information (for example, a PAN), a token reference ID, a part of a PAN, a PAN product ID, a token requestor ID, a token assurance level, token assurance data, an expiration period of a token, an encryption key, and a value (for example, one time password (OPT)) provided from the token service provider 2430. The token may be controlled by a state of the token service provider 2430. For example, the token may be activated, temporarily suspended, resumed, or deleted. The token may be static information basically corresponding to card information (for example, a PAN).

According to an embodiment of the present disclosure, when performing payment, the payment module 2721 may determine a card for payment. For example, a payment module corresponding to a card selected by a user may be determined in at least one payment management module 2731 according to a user's selection. The payment management module may deliver the determined card to the payment relay module 2741. The payment relay module may deliver the determined card information to the payment module 2721 through the security environment driver module 2753. The payment module may manage a list of cards for actual payments in holding card information. Based on the determined card information, the list of cards for actual payment may be changed. The change may be a method of increasing the priority in the card list with respect to the determined card information or deleting other card information other than the determined card information.

According to an embodiment of the present disclosure, when performing payment, based on card information related information, a payment module may create information sued for payment. Information used for payment, as shown in Table 3, may be a token, a token reference ID, a part of a PAN, a PAN product ID, a token requestor ID, a token assurance level, token assurance data, an expiration period of a token, a token cryptogram, a POS entry mode, and a token requestor indicator.

TABLE 3

| Field Name | Comment |
| --- | --- |
| Payment Token | The Payment Token number refers to a surrogate value for a PAN that is a 13 to 19-digit numeric value that passes basic validation rules of an account number, including the Luhn determination digit. Payment Tokens are generated within a BIN range or Card range that has been designated as a Token BIN Range and flagged accordingly in all appropriate BIN tables. Payment Tokens are generated such that they will not have the same value as or conflict with a real PAN. Transaction messages The Payment Token number will be passed through the authorization, capture, clearing, and exception messages in lieu of the PAN. The Payment Token number may optionally be passed from the Token Service Provider to the Card Issuer as part of the authorization request. |
| Token Expiry Date | The expiration date of the Payment Token that is generated by and maintained in the Token Vault. The Token Expiry Date field carries a 4-digit numeric value that is consistent with the ISO 8583 format. Transaction messages The Token Expiry Date is passed in lieu of PAN Expiry Date. The value is replaced by the Token Service Provider with the PAN Expiry Date which is passed to the Card Issuer as part of the authorization request. |
| Last 4 Digits of PAN | The last four digits of the PAN to be provided optionally through the Acquirer to the Merchant for customer service usage, such as being printed on the consumer receipt. |
| PAN Product ID | The PAN Product ID is an optional identifier used for determining the type of Card product that was tokenized. It may be included in cases where transparency of this information is necessary. Transaction messages The PAN Product ID may optionally be passed from the Token Service Provider to the Acquirer as part of the authorization response. |
| POS Entry Mode | This specification uses the POS Entry Mode field to indicate the mode through which the Payment Token is presented for payment. Each Payment Network will define and publish any new POS Entry Mode values as part of its existing message specifications and customer notification procedures. Transaction messages POS Entry Mode is an existing field that will be passed through the authorization, capture, clearing, and exception messages. |

TABLE 3-continued

| Field Name | Comment |
|---|---|
| Token Requestor ID | This value uniquely identifies the pairing of Token Requestor with the Token Domain. Thus, if a given Token Requestor needs Tokens for multiple domains, it will have multiple Token Requestor IDs, one for each domain. It is an 11-digit numeric value assigned by the Token Service Provider and is unique within the Token Vault:<br>Positions 1-3: Token Service Provider Code, unique to each Token Service Provider<br>Positions 4-11: Assigned by the Token Service Provider for each requesting entity and Token Domain<br>Transaction messages<br>Token Requestor ID can be optionally passed through the authorization, capture, clearing, and exception messages. |
| Token Assurance Level | Token Assurance Level is a value that allows the Token Service Provider to indicate the confidence level of the Payment Token to PAN/Cardholder binding. It is determined as a result of the type of ID&V performed and the entity that performed it.<br>The Token Assurance Level is set when issuing a Payment Token and may be updated if additional ID&V is performed. It is a two-digit value ranging from 00 which indicates the Payment Token has no ID&V that has been performed to a value of 99 indicating the highest possible assurance. The specific method to produce the value is defined by the Token Service Provider.<br>Transaction messages<br>Token Assurance Level will be provided by the Token Service Provider.<br>The value may be optionally passed to the Card Issuer as part of the authorization request.<br>The value may optionally be passed to the Acquirer/Merchant in the authorization response, capture, clearing, and exception processing messages. |
| Token Assurance Data | This data provided by the Token Service Provider contains supporting information for the Token Assurance Level.<br>Transaction messages<br>This data may be optionally passed to the Card Issuer as part of the authorization request. |
| Token Cryptogram | This cryptogram is uniquely generated by the Token Requestor to validate authorized use of the Token. The cryptogram will be carried in different fields in the transaction message based on the type of transaction and associated use case:<br>NFC contactless transactions will carry the Token Cryptogram in existing chip data fields.<br>Other transactions, such as those originating from a digital wallet, may carry the Token Cryptogram in an existing field.<br>Transaction messages<br>The Token Cryptogram will be passed in the authorization request and validated by the Token Service Provider and/or the Card Issuer. |
| Token Request Indicator | An indicator used to indicate that the message is intended to authenticate the Cardholder during a Payment Token Request. |

According to an embodiment of the present disclosure, the payment module 2721 may receive a key (for example, an LUK or a single used key) for generating token cryptogram through the token service provider 2430 or the payment server 2420 (for example, a payment service server or a token requestor server). The key may be received through data network or SMS.

The key may be exchanged between an electronic device and the token service provider 2430 through a secure channel. The secure channel may be a logical channel that encrypts data that is exchanged by an additional key (for example, a method of using public key and private key) other than the key. Furthermore, the secure channel may include a module that generates a key for generating token cryptogram in the payment module. The electronic device may receive a module for generating the key through the token service provider 2430 or the payment server 2420. Alternatively, the key may be included during manufacturing process of an electronic device.

According to an embodiment of the present disclosure, a payment module may generate token cryptogram by using a key (for example, limited used key or single used key) for generating the token cryptogram. A payment module may use a different key according to a certain rule, such as each transaction, transactions of a specific number of times, transaction within a certain time, and the like. The token service provider 2430 may own a key paired with the above key. The token service provider 2430 may decode the encrypted token cryptogram through the above pair of keys.

According to an embodiment of the present disclosure, the payment module 2721 may generate token cryptogram by using a key for generating the token cryptogram. Further description is provided below with reference to FIG. 29.

According to an embodiment of the present disclosure, when performing payment, the electronic device 2700 may deliver a message that the payment is processed in payment application to the payment relay module 2741. The payment relay module 2741 may determine whether to process the payment by using MST or NFC. When the payment is processed by MST, information necessary for a payment process (for example, a token, a token cryptogram, a part of PAN information, a token expiration period, and the like) may be obtained from a payment module in TEE and delivered to an MST driver module 2727 in TEE. The MST driver module 2727 may deliver the information to an MST controller. The MST controller may transmit the information in order for a payment process.

According to an embodiment of the present disclosure, when payment is processed by NFC, the electronic device 2700 may transmit the information necessary for a payment process to an NFC driver module in TEE. The NFC driver module may deliver the information necessary for a payment process to an NFC controller. The NFC controller may perform payment based on the information.

According to an embodiment of the present disclosure, in a case that payment is processed by NFC, when a specified message is delivered from a POS, the electronic device 2700 may perform the payment. For example, when a specified message is delivered from a POS and detected by an NFC module, an NFC controller may deliver this to an NFC driver module. The NFC driver module may notify the payment relay module 2741 in REE that the message is delivered from the POS. The payment relay module 2741 may generate a token cryptogram for performing payment. The token cryptogram may be generated from the payment module 2721 in TEE by using a key (for example, limited used key or single used key) for generating token cryptogram. The generated token cryptogram may be delivered to REE. The payment relay module 2741 may deliver payment related information including the token and token cryptogram through a network module (for example, an NFC related host card emulation). The network module may deliver the payment related information to a POS through an NFC module.

According to an embodiment of the present disclosure, the payment module 1821 may deliver, to an external electronic device, information including the token, token expiration period, token requester ID, and token cryptogram. For example, the payment module 1821 may deliver the payment information to a POS 2450 through an MST communication module. Furthermore, the payment module 1821 may deliver payment information to the POS through an NFC communication module.

According to an embodiment of the present disclosure, the payment module 1821 may transmit/receive specified information to/from a POS during a payment operation. In the case of NFC, the payment module 1821 may perform a payment operation by receiving information from a POS first. In the case of MST, based on a user's explicit input or an algorithm in an electronic device, payment related information including token and token cryptogram may be transmitted to a POS.

According to an embodiment of the present disclosure, the biometric information module 2725 may store biometric information of a user using an electronic device and by comparing the biometric information with information received from a biometric sensor, may authenticate the user. The biometric information module 2725 may include a fingerprint information module and an iris information module. The biometric information module may collect information from the biometric sensor 1940I. When payment application displays content to authenticate user's biometric information on the display 1860, a user may deliver biometric information through a biometric sensor. An authentication module of the payment application may deliver a message for collecting biometric information to the biometric information driver module 2751 through a biometric information management module. The biometric information driver module 2751 may deliver the message to a biometric sensor. The biometric sensor may collect biometric information and deliver the biometric information to TEE. A biometric information module in the TEE may deliver whether it is authenticated after comparing the delivered biometric information with the stored user's biometric information, to an authentication module of a payment application through a security environment driver module and a biometric information management module in REE. The payment application may display whether it is authenticated on a display. The user's biometric information may be stored in TEE, or stored in an encrypted state in REE, or stored in the security module 236 (for example, eSE).

According to an embodiment of the present disclosure, the security identifier processing module 2723 may obtain an input value, which is necessary from an electronic device or relates to a payment related authentication, through a user input. For example, the input value may be personal identification number during a payment process. Furthermore, the input value may be card related information. For example, the input value may be a primary account number, an expiration date, or a card verification value (CVV). Furthermore, the input value may be a chip PIN or an ATM PIN. The security identifier processing module 2723 may be provided in an application form. A graphic library necessary for drawing an application of the security identifier processing module 2723 on a screen may be stored in the TEE 2720. A graphic library stored in the TEE 2720 may be different from that in the REE 2710. The security identifier processing module 2723 may perform user authentication by an input value, such as PIN and deliver the user authentication result to the payment management module 2731 through the payment relay module 2741. According to an embodiment of the present disclosure, the security identifier processing module 2723 may receive a one-time random number (for example, nonce) delivered from the security environment relay module 2746 through the security environment driver module 2753. The security identifier processing module 2723 may encrypt the input value obtained from the user input and the one-time random number by using an encryption key (for example, a device root key) in TEE and deliver the encrypted information to the security environment relay module 2746. The security environment relay module 2746 may deliver the encrypted input value and one-time random number to the payment module 2721 through the security environment driver module 2753. The payment module 2721 may decode the input value and one-time random number by using a hardware key in TEE. The payment module 2721 may determine that the input value delivered through REE is integrity by using the fact that the generated value and the received value of the one-time random number are the same. Based on that the input value is integrity, the payment module 2721 may perform user authentication through an input value. The payment module 2721 may perform payment through user authentication. According to an embodiment of the present disclosure, factory reset is an operation for restoring a software image of an electronic device to a state in which the electronic device is shipped from an existing factory. The operation may be performed through application by a user's explicit operation. Furthermore, under a specified condition (for example, it is determined that system is hacked), a monitoring module may perform factory rest by determining the hacking. In a case that the operation is performed, since data stored in an electronic device is reset, user's payment related information may be reset also. The payment related information may be stored in the payment server 2420. When a user accesses the payment server 2420 based on an account, the electronic device 2700 may perform card registration and an operation for installing a payment module based on the payment related information. When reset, a payment related module stored in an electronic device may notify it to the token service provider 2430 through the payment server 2420 in order for deactivation. When the network of the electronic device is deactivated, the notification operation may not be performed. In this case, after performing factory reset, an electronic device may access the payment server 2420 based on an account. The electronic device 2700 may determine a pre-registered card list through the payment server 2420 and deactivate a card module or a token of an electronic device pre-registered in the token service provider 2430. Furthermore, based on a card list of the payment server 2420, an electronic device may receive a payment module or a token by performing card registration again.

FIGS. 28A, 28B, 28C, 28D, 28E, 28F, 28G, 28H, 28I, and 28J illustrate a payment user interface of an electronic device according to various embodiments of the present disclosure.

Figure 28:
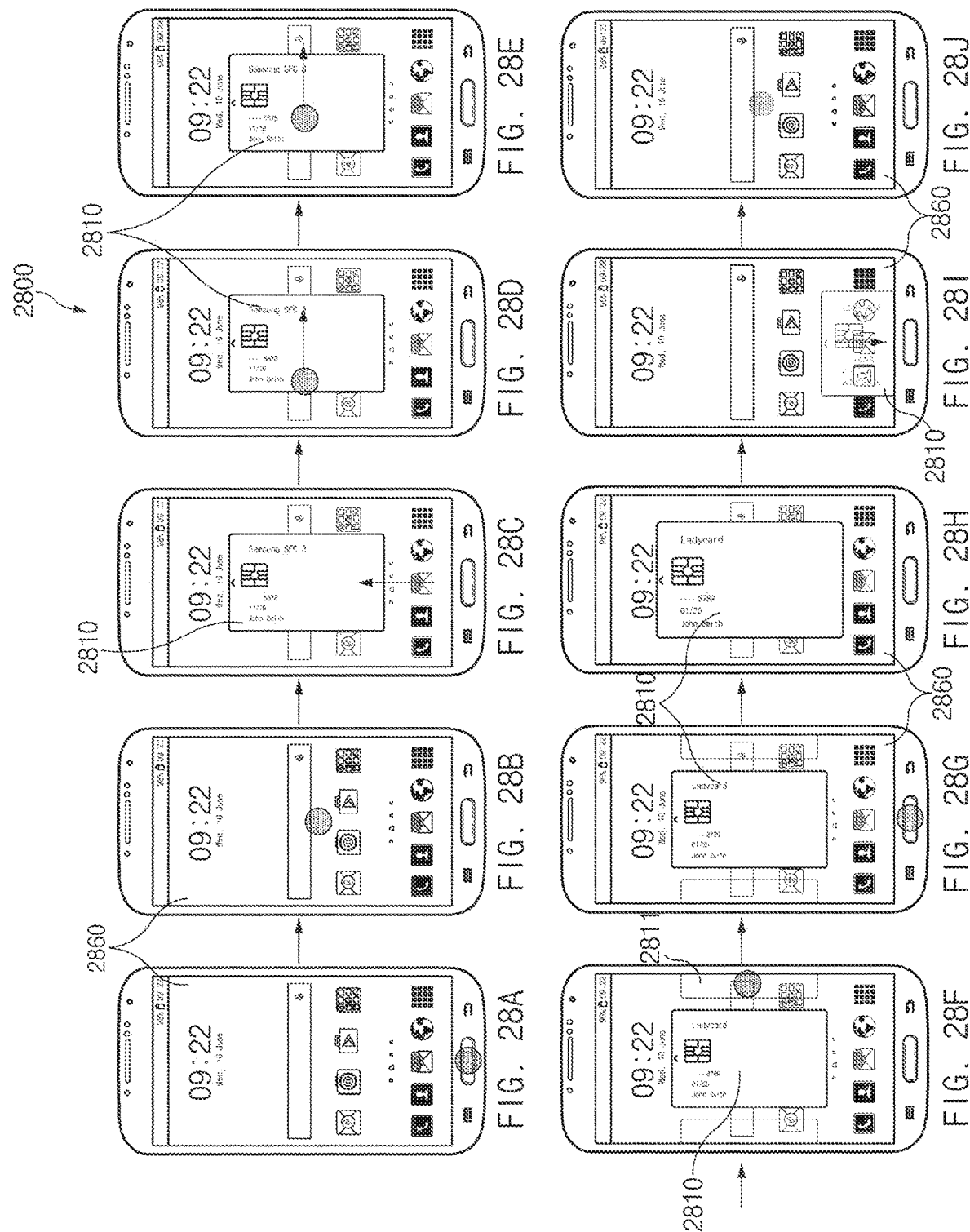
FIGS. 28A, 28B, 28C, 28D, 28E, 28F, 28G, 28H, 28I, and 28J illustrate a payment user interface of an electronic device according to various embodiments of the present disclosure.

Referring to FIGS. 28A, 28B, 28C, 28D, 28E, 28F, 28G, 28H, 28I, and 28J, according to an embodiment of the present disclosure, an electronic device 2800 may execute payment application by receiving a user input. For example, as shown in FIGS. 28A and 28B, when a user input swiping from a lower end bezel area of the electronic device 2800 toward a display direction occurs, the electronic device 2800 may execute an payment application (for example, Samsung pay). In response to the user input, the electronic device 2800, as shown in FIG. 28C, may display at least one card 2810 among cards pre-registered in the electronic device 2800, through the display 2860.

According to an embodiment of the present disclosure, the electronic device 2800 may select a card to be used for payment among a plurality of pre-registered cards by receiving a user input. For example, the electronic device 2800, as shown in in FIG. 28D or 28E, may support to select a card to be used for payment among a plurality of cards through a user input scrolling to the left/right. Alternatively, the electronic device 2800, as shown in FIG. 28F, may output a partial image 2820 relating to another card in an area adjacent to the card 2810 and when the partial image 2820 is selected, support to operate a card corresponding to the selected image.

The electronic device 2800, as shown in FIG. 28G, may request authentication from a user in order for the payment of the selected card. An authentication method, for example, may use user's biometric information. For example, an electronic device may perform a payment operation by scanning a user's fingerprint through a fingerprint detection module. When the payment is in progress or standby, the electronic device 2800, as shown in FIG. 28H, may display the card 2810 on the display 2860. When a payment cancel event (for example, a swipe event or a back key event for removing the card 2810) occurs, as shown in FIG. 28I, the electronic device 2800 may remove the card 2810 from the display 2860. As the card 2810 is removed, the electronic device 2800, as shown in FIG. 28J, may output a screen where the card 2810 is removed.

Figure 29:
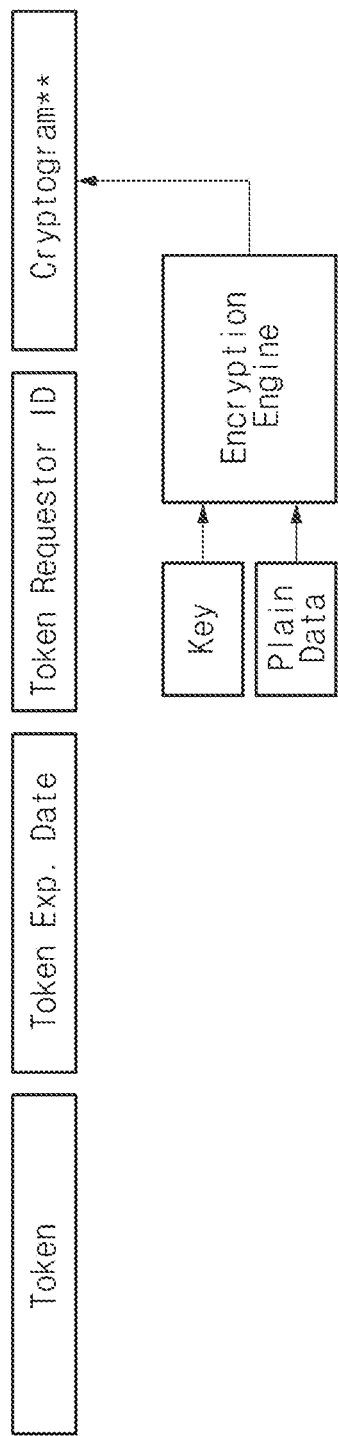
FIG. 29 illustrates a token cryptogram generating method according to various embodiments of the present disclosure.

FIG. 29 illustrates a token cryptogram generating method according to various embodiments of the present disclosure.

Referring to FIG. 29, according to an embodiment of the present disclosure, a payment module (for example, the payment module 2721) may generate token cryptogram by using a key for generating the token cryptogram. A payment module may use a different key according to a certain rule, such as each transaction, transactions of a specific number of times, transaction within a certain time, and the like. The token service provider 2430 may own a key paired with the above key. The token service provider 2430 may decode the encrypted token cryptogram through the above pair of keys.

When the payment module generates token cryptogram by using the key, data encrypted by a key and an encryption engine may vary according to an encryption method (for example, advanced encryption standard (AES), temporal key integrity protocol (TKIP), and the like).

Figure 30:
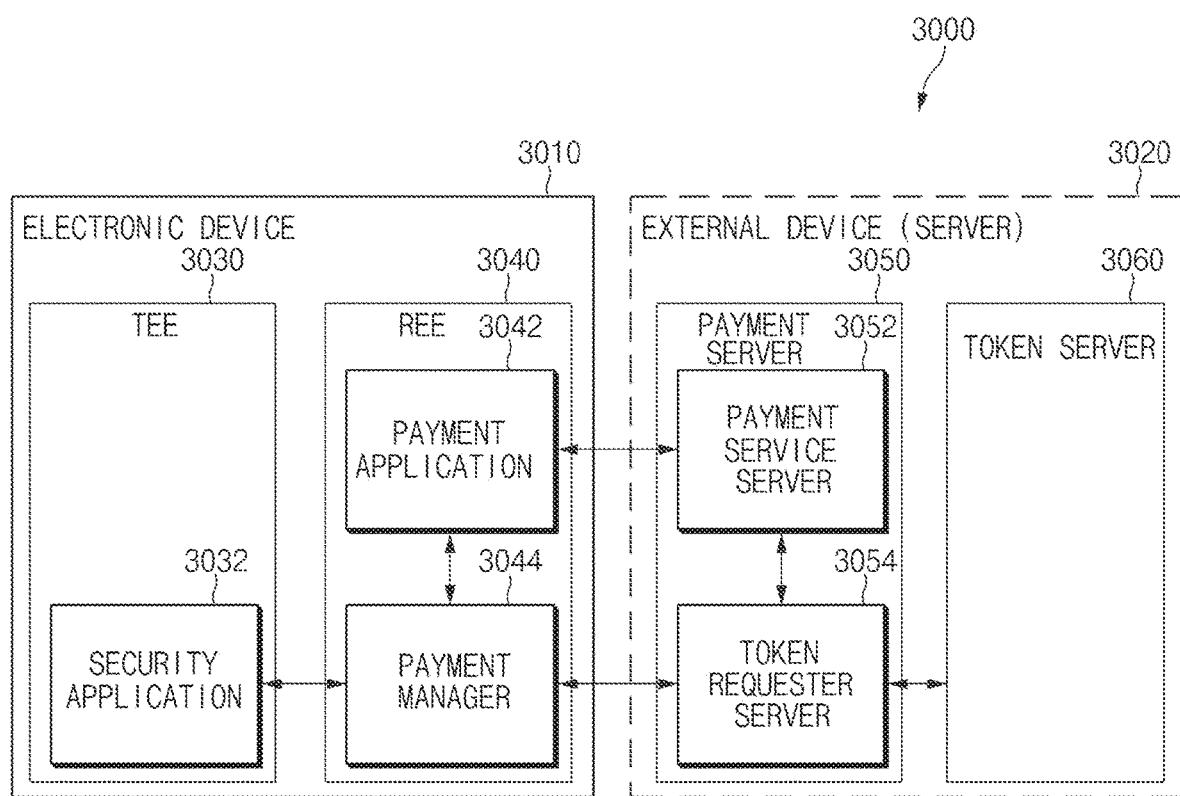
FIG. 30 illustrates a payment system according to various embodiments of the present disclosure.

FIG. 30 illustrates a payment system according to various embodiments of the present disclosure.

Referring to FIG. 30, according to various embodiments of the present disclosure, a payment system 3000, for example, may include an electronic device 3010 and/or an external device 3020 (for example, a server). The electronic device 3010, for example, may include a TEE 3030 and/or a REE 3040. The external device 3020, for example, may include a server, and the server, for example, may include a payment server 3050 and/or a token server 3060. The payment server 3050, for example, may include a payment service server 3052 or a token requester server 3054.

According to various embodiments of the present disclosure, the TEE 3030 may include a security system relating to the electronic device 3010. For example, the electronic device 3010 may protect information included or stored in the TEE 3030 from a control relating to an external request, modification, or input by using the TEE 3030.

According to an embodiment of the present disclosure, the TEE 3030, for example, may include a security enhanced program mode. For example, a normal world may be distinguished from a secure world b using TEE 3030. The normal world may be referred to as an REE 3040. Additionally, the TEE 3030, for example, may execute reliable application or manage encrypted information. For example, the encrypted information may include token or key information.

According to an embodiment of the present disclosure, the TEE 3030 may protect the encrypted information from the outside. The token or key information may be used for encrypting card information. For example, in providing card information to a device for payment, in relation to the token or key information, at least part of the card information may be changed and provided instead of directly providing the card information to the device for payment. In changing the card information, the token or key information may be used. The key, for example, may be obtained from a service provider that provides payment service. Additionally, the key may be managed by the electronic device 3010 or the server. According to an embodiment of the present disclosure, the TEE 3030 may include a security application 3032 (for example, a trusted application). The TEE 3030, for example, may provide an environment in which the security application 3032 is executable.

According to various embodiments of the present disclosure, the security application 3032, for example, may include information relating to a card company included in the TEE 3030. The information relating to the card company, for example, may include an application relating to the card company and the application may be provided in a packaged form. The packaged form may be provided as an SDK.

According to various embodiments of the present disclosure, the security application 3032, for example, may include an application or an applet, which is required to be executed in a security enhanced mode, such as the TEE 3030. Additionally, the security application 3032, for example, may include an encryption related function. For example, the security application 3032 may perform a cryptogram generation, modification, or deletion function relating to the payment.

According to various embodiments of the present disclosure, the REE 3040 may include an application layer. For example, the REE 3040 may include an application and/or a framework. The REE 3040 may allow an access and/or a control from the outside unlike the TEE 3030. The REE 3040, for example, may include a payment application (for example, a wallet application) 3042 and/or a payment manager 3044. The payment application 3042, for example, may perform a function of an interface, OCR, or identification function for payment using the payment application 3042. Additionally, the payment application 3042, for example, may perform a function relating to card registration or payment.

According to various embodiments of the present disclosure, the payment manager 3044, for example, may include information relating to a card company included in the REE 3040. The information relating to the card company, for example, may include an application relating to the card company and the application may be provided in a packaged form. The packaged form may be provided as an SDK. The payment manager 3044, for example, may include an encryption related function. For example, the payment manager 3044 may perform a token ID management or card company channel establishment function. Additionally, the payment manager 3044, for example, may perform an interface with an external device 3020 (for example, a server). For example, the payment manager 3044 may provide an interface with a server (for example, the payment server 3050) for tokenization service.

According to various embodiments of the present disclosure, the payment manager 3044, for example, may be functionally connected to the security application 3032 so that the payment manager 3044 may share information. For example, the payment manager 3044 may perform an interface with the security application 3032 for using (or storing) the token or the key. Additionally, the security application 3032 may include information relating to a network service provider.

According to various embodiments of the present disclosure, the payment application 3042 and the payment manager 3044 may be functionally connected to each other and the security application 3032 and the payment manager 3044 may be functionally connected to each other. For example, the payment manager 3044 may deliver information received from the outside to the payment application 3042 or the security application 3032 or deliver information received from the payment application 3042 or the security application 3032 to the outside. According to an embodiment of the present disclosure, the payment manager 3044 may share payment related information with the security application 3032 or the payment application 3042.

According to various embodiments of the present disclosure, the electronic device 3010 may include additional configurations or modules in addition to the TEE 3030, the security application 3032, the REE 3040, the payment application 3042, or the payment manager 3044.

According to various embodiments of the present disclosure, the payment server 3050 may transmit payment related information (for example, a token or a key) from the electronic device 3010 to a management server for electronic payment or mobile payment. Additionally, the payment service server 3052 and the token requester server 3054, which are included in the payment server 3050, are functionally connected to each other so that they may share the payment related information.

According to various embodiments of the present disclosure, the token server 3060 is functionally connected to the token requester server 3054, so that they may transmit/receive payment related information. For example, the token requester server 3054 and the token server 3060 may provide an interface for delivering the token or the key.

Figure 31:
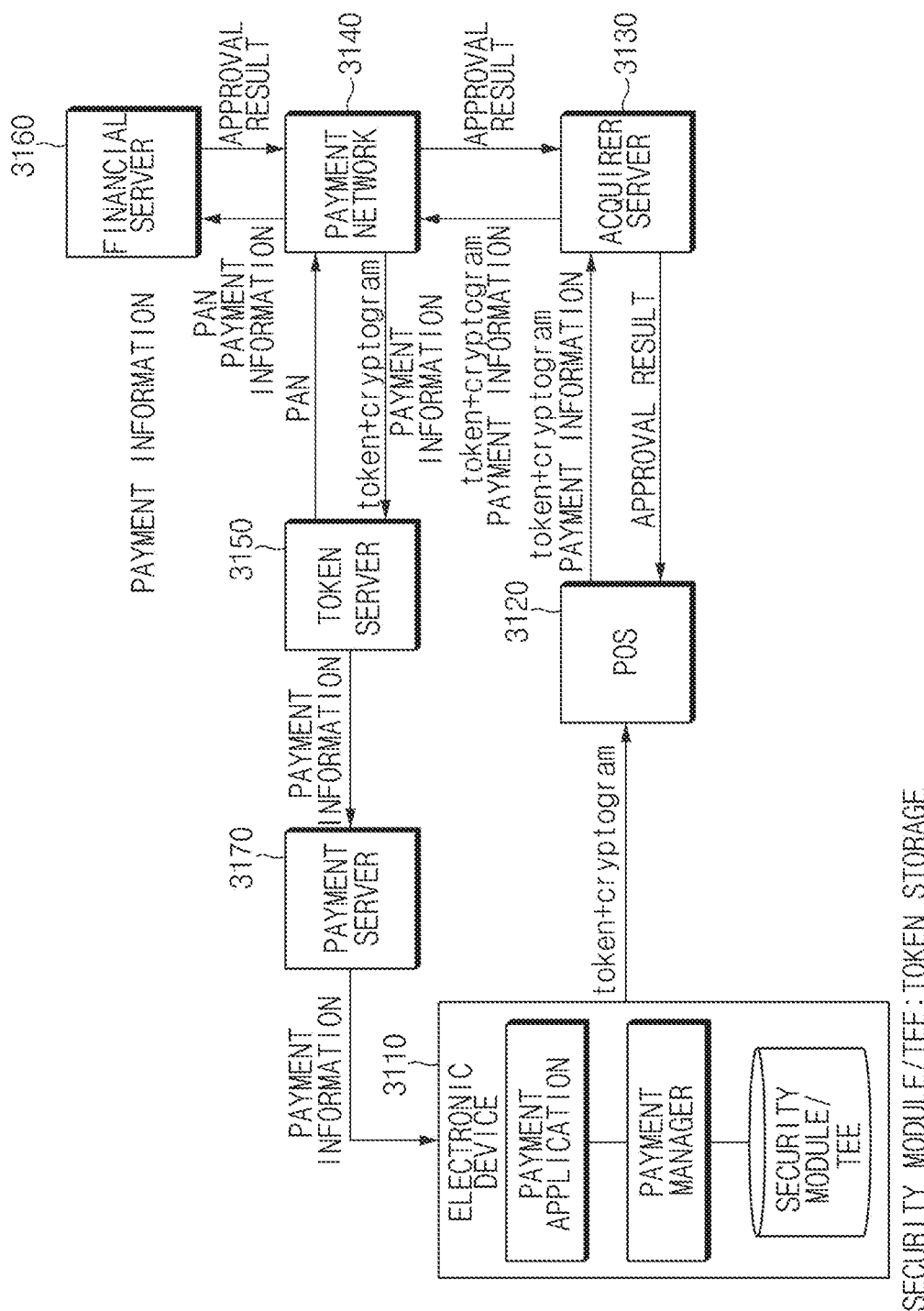
FIG. 31 is a flow diagram of token payment according to various embodiments of the present disclosure.

FIG. 31 is a flow diagram of a token payment according to various embodiments of the present disclosure.

Referring to FIG. 31, according to various embodiments of the present disclosure, a payment system may include an electronic device 3110, a payment server 3170, a token server 3150, a POS 3120, a financial server 3160, an acquirer server 3130, or a payment network 3140. The electronic device 3110, for example, may include a payment application, a payment manager, or a security area (for example, a security module or TEE). The POS 3120, for example, may include a POS information management system. The POS 3120, for example, combines the functions of a cash register and a computer electronic device and a user may perform a payment function by using the POS 3120. The financial server 3160, for example, may include a bank or a financial company for issuing a card and may perform identification determination on the card. Additionally, during payment, the approval on the card may be processed. The acquirer server 3130, for example, may include a bank or a financial company, which purchases a voucher for card transaction completed at a store (for example, the POS 3120). The payment network 3140, for example, may include card network.

According to various embodiments of the present disclosure, the electronic device 3110 may deliver token and/or encryption information (for example, cryptogram) to the POS 3120. The token, for example, may be stored in the electronic device 3110. Additionally, the token may be stored in an encrypted area (for example, a security module or TEE). For example, the electronic device 3110 may generate encryption information by using a key received from the outside or a key generated from the electronic device 3110. The encryption information may include cryptogram. Additionally, the electronic device 3110 may deliver the cryptogram and/or the token to the POS 3120.

According to various embodiments of the present disclosure, the electronic device 3110 may use various communication connection in delivering the cryptogram and/or the token to the POS 3120. The communication connection, for example, may include NFC, MST, barcode, or quick response (QR) code.

According to various embodiments of the present disclosure, the POS 3120 may deliver at least one of a token, encryption information, and payment information to the acquirer server 3130. For example, the POS 3120 may deliver, to the acquirer server 3130, the token and/or the cryptogram received from the electronic device 3110 and/or the payment information (for example, a payment history) obtained from the POS 3120. Additionally, the payment information, for example, may be obtained from the POS 3120 or received from an external device and may include a payment history that the user requests a payment function. Additionally, the payment information, for example, may include a payment history performed using the payment system.

According to various embodiments of the present disclosure, the acquirer server 3130 may deliver at least one of token, encryption information, and payment information to the payment network 3140. For example, the acquirer server 3130 may deliver at least one of the token, the cryptogram, and the payment information, which are received from the POS 3120, to the payment network 3140.

According to various embodiments of the present disclosure, the payment network 3140 may include a card company related network. The card company, for example, may include VISA™, MasterCard™, or Amex™. According to an embodiment of the present disclosure, the payment network 3140 may include or operate the token server 3150. For example, the payment network 3140, may deliver at least one of the token, the cryptogram, and the payment information from the payment network 3140 to the token server 3150, or may perform a function of the token server 3150.

According to various embodiments of the present disclosure, the token server 3150 may determine information on a token received from the payment network 3140. For example, the token server 3150 may determine card information (for example, a PAN) corresponding to the token by using the token. For example, the token server 3150 may determine a PAN corresponding to the financial server 3160 by using information (for example, data) included in the token. The token server 3150, for example, may determine a PAN corresponding to the financial server 3160 and perform processing to receive a payment authentication by using the PAN from the financial server 3160. According to various embodiments of the present disclosure, the token server 3150 may use the cryptogram in determining the PAN. According to an embodiment of the present disclosure, the token server 3150 may deliver the PAN to the payment network 3140.

According to various embodiments of the present disclosure, the payment network 3140 may deliver the PAN and the payment information to the financial server 3160. For example, the payment network 3140 may deliver the PAN and/or the payment information received from the acquirer server 3130 to the financial server 3160. According to various embodiments of the present disclosure, the payment network 3140 may deliver whether the approval is completed to the payment network 3140.

According to various embodiments of the present disclosure, the financial server 3160 may determine the payment approval by using the PAN and/or the payment information. For example, when the PAN and/or the payment information are identical to information included in the financial server 3160 (for example, a valid PAN), the financial server 3160 may perform a payment approval. Additionally, when the PAN and/or the payment information are not identical to information included in the financial server 3160 (for example, an invalid PAN), the financial server 3160 may perform a payment rejection. According to various embodiments of the present disclosure, the financial server 3160 may deliver whether the approval is completed to the payment network 3140. According to various embodiments of the present disclosure, the payment network 3140 may deliver whether the approval is completed to the payment network 3140.

According to various embodiments of the present disclosure, the financial server 3160 may deliver whether the approval is completed to the acquirer server 3130. According to various embodiments of the present disclosure, the acquirer server 3130 may deliver whether the approval is completed to the POS 3120. According to various embodiments of the present disclosure, when the approval is completed, the payment network 3140 may deliver the payment information to the token server 3150. According to various embodiments of the present disclosure, the token server 3150 may deliver the payment information to the payment server 3170. According to various embodiments of the present disclosure, the payment server 3170 may deliver the payment information to the electronic device 3110. For example, the payment server 3170 may deliver the payment information to the electronic device 3110 by using a specified instruction (for example, push message).

According to various embodiments of the present disclosure, the electronic device 3110 may display the payment information through the electronic device 3110. For example, the electronic device 3110 may display the payment information by using the payment application included in the electronic device 3110 or display the payment information through a payment function related interface. The payment function related interface may include a notification bar.

According to various embodiments of the present disclosure, the electronic device 3110 may display the payment information or the payment related information (for example, a payment state, a payment history, or an accumulated amount) through a display functionally connected to the electronic device 3110. For example, the electronic device 3110 may display the payment information or the payment related information by using a notification module (for example, the notification manager 2049 of FIG. 20) of the electronic device 3110. Additionally, the electronic device 3110, for example, may display the payment information or the payment related information by at least one of a notification, an indicator, a state bar, a task bar, an icon, a floating icon, a tile, and a widget and may display the payment information in at least a partial area of a home screen, a lock screen, or a bended display.

According to various embodiments of the present disclosure, the electronic device 3110 may output a notification relating to the payment information or the payment related information, through sound, vibration or haptic effects by using an audio module (for example, the audio module 1980 of FIG. 199), a motor (for example, the motor 1998 of FIG. 19), a tactile feedback device (not shown), and/or a friction display (not shown).

Figure 32:
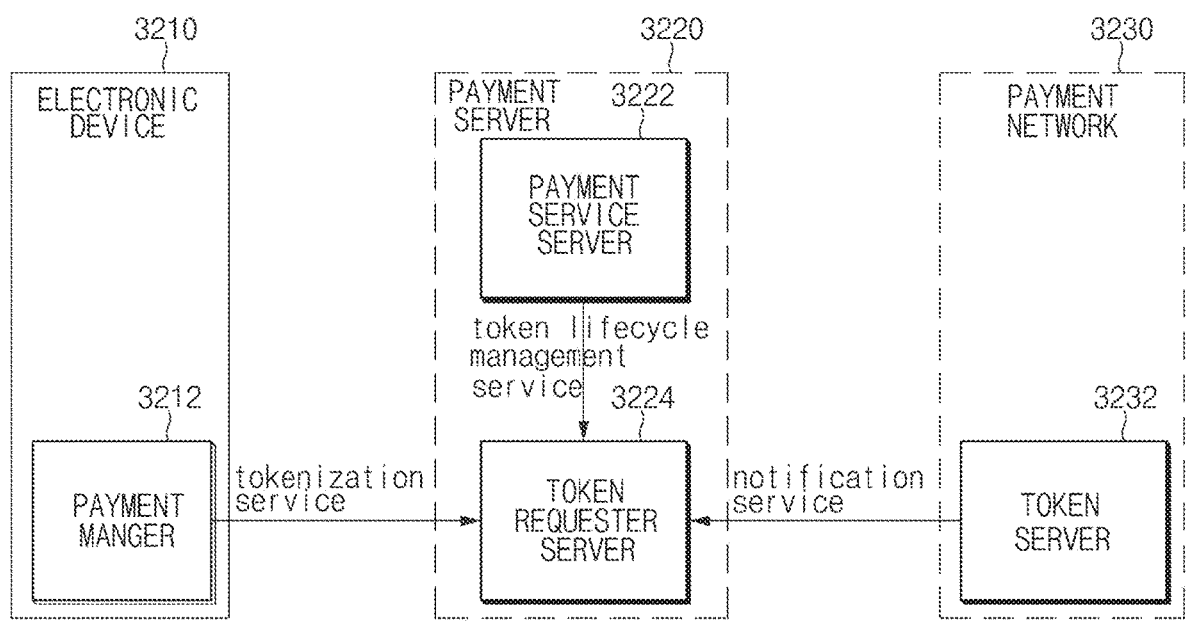
FIG. 32 illustrates operations of payment system components according to various embodiments of the present disclosure.

FIG. 32 illustrates operations of payment system components according to various embodiments of the present disclosure.

Referring to FIG. 32, according to various embodiments of the present disclosure, a payment system may include an electronic device 3210, a payment server 3220, and/or a payment network 3230. The electronic device 3210, for example, may include a payment manager 3212. The payment server 3220, for example, may include a payment service server 3222 and/or a token requester server 3224. The payment network 3230, for example, may include a token server 3232. In relation to the payment system, the token may be used for a function performed by each of the electronic device 3210, the payment server 3220, and/or the payment network 3230.

According to various embodiments of the present disclosure, the electronic device 3210 may provide a tokenization service relating to the token by using the payment manager 3212 in the electronic device 3210 and the token requester server 3224 in the payment server 3220.

According to various embodiments of the present disclosure, the payment service server 3222 may provide an operating period relating to the token (for example, token life management) by using the token requester server 3224 included in the payment server 3220.

According to various embodiments of the present disclosure, the token server 3232 may provide a notification service relating to the token by using the token requester server 3224.

According to various embodiments of the present disclosure, the token requester server 3224 may provide a payment method to the electronic device 3210 by using a payment network solution. For example, the token requester server 3224 may determine a payment method fit for a user by using the tokenization service, the token related operating period, and/or the token related notification service.

Figure 33A:
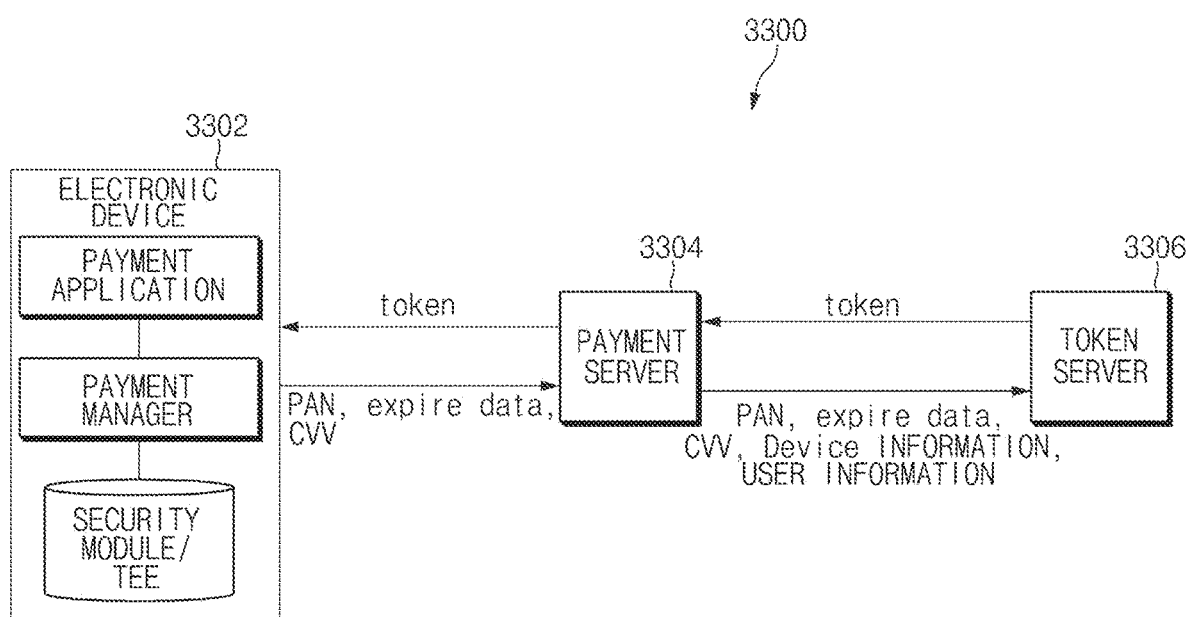
FIG. 33A illustrates a flow diagram for a first token issue operation of an electronic device according to various embodiments of the present disclosure.
Figure 33B:
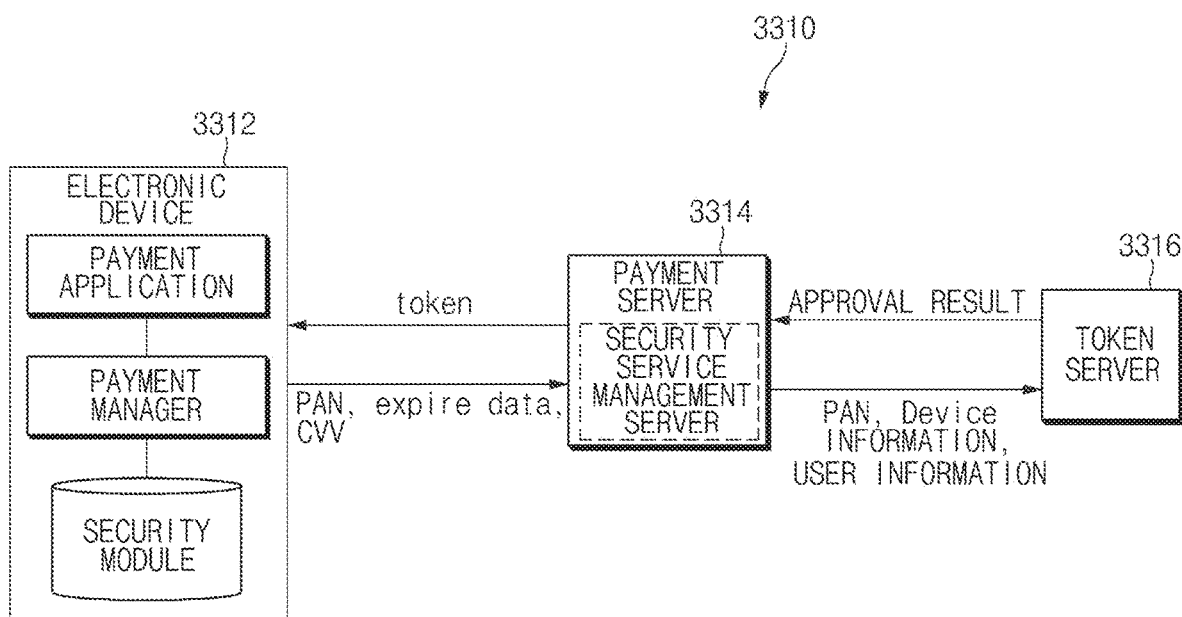
FIG. 33B illustrates a flow diagram for a second token issue operation of an electronic device according to various embodiments of the present disclosure.
Figure 33C:
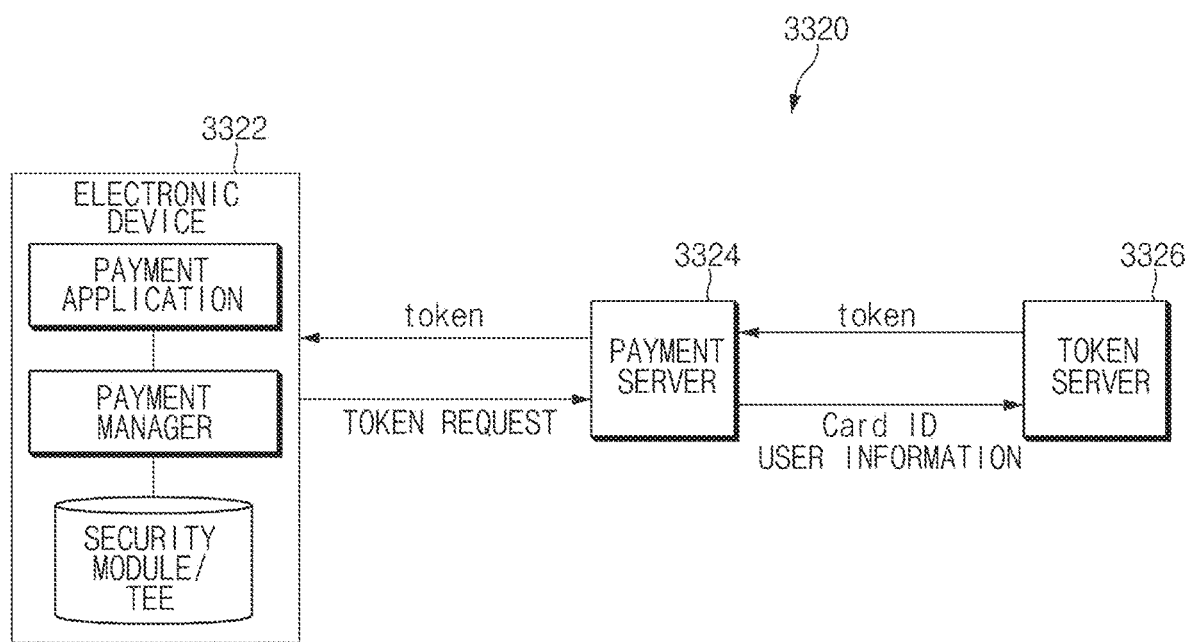
FIG. 33C illustrates a flow diagram for a third token issue operation of an electronic device according to various embodiments of the present disclosure.

FIGS. 33A, 33B, and 33C illustrate flow diagrams for a token issue operation of an electronic device according to various embodiments of the present disclosure.

According to various embodiments of the present disclosure, a token issue operation may be changed based on country. For example, the token issue operation may be changed based on the United States, Europe, or Korea.

Referring to FIG. 33A, a flow diagram 3300 for a first token issue operation of an electronic device is illustrated according to various embodiments of the present disclosure.

Referring to FIG. 33A, the first token issue operation, for example, may include an electronic device 3302, a payment server 3304, or a token server 3306. The electronic device 3302, for example, may include at least one of a payment application, a payment manager, a security module, and TEE.

According to various embodiments of the present disclosure, the electronic device 3302 may obtain card related information through a sensor functionally connected to the electronic device 3302. The card related information, for example, may be used for a card registration operation. The sensor, for example, may include OCR. The card related information, for example, may include at least one of a PAN, an expiration period, and a CVV. The sensor, for example, may be performed by using the payment application included in the electronic device 3302.

According to various embodiments of the present disclosure, the payment application included in the electronic device 3302 may deliver the card related information to the payment server 3304. The payment server 3304, for example, may include a payment service server or a token requester server, and the card related information may be delivered between the payment service server and the token requester server.

According to an embodiment of the present disclosure, the payment server 3304 (for example, the token requester server) may deliver, to the token server 3306, the card related information and/or information relating to the electronic device 3302 (for example, device information or user information). The information relating to the electronic device 3302, for example, may include a device that requests the first token issue operation.

According to an embodiment of the present disclosure, the token server 3306 may issue (or generate) a token based on information received from the payment server 3304. According to an embodiment of the present disclosure, the token server 3306 may deliver a token based on information received from the payment server 3304. The token server 3306, for example, may deliver the token to the token requester server included in the payment server 3304.

According to an embodiment of the present disclosure, the payment server 3304 may deliver the token to the electronic device 3302. The payment server 3304, for example, may deliver the token from the token requester server included in the payment server 3304 to the electronic device 3302.

According to an embodiment of the present disclosure, the electronic device 3302 may store the token received from the payment server 3304 in the security module or the TEE. For example, the electronic device 3302 may store the token in the security module or the TEE, that is, a security area, so that the electronic device 3302 may control an access from the outside.

According to an embodiment of the present disclosure, the electronic device 3302 may store the token received from the payment server 3304 in the normal memory (for example, a memory in REE).

According to an embodiment of the present disclosure, in relation to the token, at least one token may be issued (or generated) based on a payment method (for example, OTP or call center) performed in the electronic device 3302.

According to an embodiment of the present disclosure, in relation to the token, one token may be issued (or generated) in correspondence to the electronic device 3302. For example, a first token may be included in a first electronic device and a second token may be included in a second electronic device. The first and second tokens are different from each other.

According to an embodiment of the present disclosure, the token may be activated based on an authentication operation (for example, ID&V). For example, the token may be stored in the electronic device 3302 and may be activated based on the authentication operation. The authentication operation, for example, may include identification determination. The identification determination, for example, may be performed through a financial server.

Referring to FIG. 33B, a flow diagram 3310 for a second token issue operation of an electronic device is illustrated according to various embodiments of the present disclosure.

Referring to FIG. 33B, the second token issue operation, for example, may include an electronic device 3312, a payment server 3314, or a token server 3316. The electronic device 3312, for example, may include at least one of a payment application, a payment manager, and a security module. Additionally, the payment server 3314, for example, may include a security service management server.

According to various embodiments of the present disclosure, the electronic device or another electronic device may obtain card related information through a sensor functionally connected to the electronic device or the other electronic device. The card related information, for example, may be used for a card registration operation. The sensor, for example, may include OCR. The card related information, for example, may include at least one of a PAN, an expiration period, and a CVV. The sensor, for example, may be performed by using the payment application included in the electronic device or the other electronic device.

According to various embodiments of the present disclosure, the payment application included in the electronic device 3312 may deliver the card related information to the payment server 3314. The payment server 3314, for example, may include a payment service server or a token requester server, and the card related information may be delivered between the payment service server and the token requester server.

According to an embodiment of the present disclosure, the payment server 3314 may deliver the card related information to the security service management server included in the payment server 3314. The security service management server, for example, may be included in the payment server 3314 and operate internally or may be included in the outside of the payment server 3314. For example, the security service management server may be included in a device (for example, an external device) that is different from the payment server 3314 and may be functionally connected to the payment server 3314 and exchange the card related information.

According to an embodiment of the present disclosure, the security service management server may deliver, to the token server 3316, the card related information and/or information relating to the electronic device 3312 (for example, device information or user information). The information relating to the electronic device 3312, for example, may include a device that requests the second token issue operation.

According to an embodiment of the present disclosure, the token server 3316 may perform an authentication operation based on information received from the payment server 3314. The token server 3316, for example, may perform an authentication operation based on the card related information and/or the information relating to the electronic device 3312.

According to an embodiment of the present disclosure, the token server 3316 may deliver a result (for example, successful or failed) on the authentication operation to the security service management server included in the payment server 3314.

According to an embodiment of the present disclosure, the security service management server may issue (or generate) a token based on the card related information and/or the information relating to the electronic device 3312.

According to an embodiment of the present disclosure, the security service management server may store the token in a security area (for example, a security module) included in the electronic device 3312. For example, the security service management server may have an access permission (for example, security module access permission) for the security area of the electronic device 3312. Additionally, the security service management server may store the token in the security area of the electronic device 3312 by using the access permission. Additionally, the token may be delivered from the security service management server to the electronic device 3312.

According to an embodiment of the present disclosure, the electronic device 3312 may store the token in the security module, that is, a security area, and may control an access from the outside.

According to an embodiment of the present disclosure, in relation to the token, at least one token may be issued (or generated) based on a payment method (for example, OTP or call center) performed in the electronic device 3312.

According to an embodiment of the present disclosure, in relation to the token, one token may be issued (or generated) in correspondence to the electronic device 3312. For example, a first token may be included in a first electronic device and a second token may be included in a second electronic device. The first and second tokens are different from each other.

According to an embodiment of the present disclosure, the token may be activated based on an authentication operation (for example, ID&V). For example, the token may be stored in the electronic device 3312 and may be activated based on the authentication operation. The authentication operation, for example, may include identification determination. The identification determination, for example, may be performed through a financial server.

Referring to FIG. 33C, a flow diagram 3320 for a third token issue operation of an electronic device is illustrated according to various embodiments of the present disclosure.

Referring to FIG. 33C, the third token issue operation, for example, may include an electronic device 3322, a payment server 3324, or a token server 3326. The electronic device 3322, for example, may include at least one of a payment application, a payment manager, a security module, and TEE.

According to various embodiments of the present disclosure, the electronic device or another electronic device may obtain card related information through a sensor functionally connected to the electronic device or the other electronic device. The card related information, for example, may be used for a card registration operation. The sensor, for example, may include OCR. The card related information, for example, may include at least one of a PAN, an expiration period, and a CVV. The sensor, for example, may be performed by using the payment application included in the electronic device or the other electronic device.

According to an embodiment of the present disclosure, the electronic device or the other electronic device may perform an authentication operation (for example, ID&V). The authentication operation, for example, identification determination, may be performed by using the payment application.

According to an embodiment of the present disclosure, the electronic device 3322 may perform the card registration and/or the identification determination when performing a payment function. For example, in order to perform a payment function, the electronic device 3322 may perform the card registration and the identification determination and also, the card registration and the identification determination may refer to a standby (or preparation) state for a payment function.

According to an embodiment of the present disclosure, the electronic device 3322, the payment server 3324, or the token server 3326 may share information relating to the card registration and the identification determination. For example, the electronic device 3322, the payment server 3324, or the token server 3326 may share at least one of a PAN, an expiration period, a CVV, device information, and user information.

According to an embodiment of the present disclosure, a token relating to the third token issue operation may be issued (or generated) during payment by using the payment function.

According to various embodiments of the present disclosure, the payment application included in the electronic device 3322 may perform user authentication in order to perform the payment function. For example, the user authentication may include a password, pattern authentication, or biometric information authentication.

According to an embodiment of the present disclosure, when the user authentication is successful (for example, authentication completion), the payment application may perform a third token issue operation by the payment server 3324. The third token issue operation, for example, may include a token request.

According to an embodiment of the present disclosure, the payment server 3324 may deliver card information (for example, a card identifier) and/or user information to the token server 3326 based on the token request. The information relating to the electronic device 3322, for example, may include a device that requests the third token issue operation.

According to an embodiment of the present disclosure, the token server 3326 may issue (or generate) a token based on information received from the payment server 3324.

According to an embodiment of the present disclosure, the token server 3326 may deliver a token based on information received from the payment server 3324.

According to an embodiment of the present disclosure, the payment server 3324 may deliver the token to the electronic device 3322.

According to an embodiment of the present disclosure, the electronic device 3322 may store the token received from the payment server 3324 in the security module or the TEE. For example, the electronic device 3322 may store the token in the security module or the TEE, that is, a security area, so that the token may control an access from the outside.

According to an embodiment of the present disclosure, the electronic device 3322 may store the token received from the payment server 3324 in the normal memory (for example, a memory in REE).

According to an embodiment of the present disclosure, the electronic device 3322 may not store the token received from the payment server 3324 in a storage area (for example, memory) in the electronic device 3322. For example, the electronic device 3322 may not store the token in the storage area and may use the token for a payment function.

According to an embodiment of the present disclosure, in relation to the token, the storage area of the token may be changed based on a payment method (for example, OTP or call center) performed in the electronic device 3322. For example, when the payment method is OTP, the token may be stored in the security module or the TEE, and when the payment method is call center, the token may not be stored in the electronic device 3322.

According to various embodiments of the present disclosure, the token may include a use time or an expiration time. For example, the token may be limited for use when a specified time (for example, 3 hours or one day) elapses after the token is issued (or generated).

According to various embodiments of the present disclosure, the token may include card information. For example, the token may include one time card (OTC) information.

According to various embodiments of the present disclosure, an electronic device may include a sensor configured to detect a position state or a direction state thereof, a memory configured to store a payment application, and a processor functionally connected to the sensor and the memory. The processor may be set to detect the direction of the electronic device by using the sensor when the execution of the payment application is requested, generate and output a display object for instructing the direction of the electronic device to be in a specified direction, or read a display object corresponding to the specified direction from the memory and output the read object.

When the payment application is terminated or an error occurs, the processor may be set to stop the display object output and output a message corresponding to the termination of the payment application or the error.

When receiving an event relating to the payment completion, the processor may be set to stop the display object output or replace the display object with a payment completion related message and display the message.

After the payment application is executed, when an object approach is detected or a specified first gesture event (for example, a gesture event corresponding to an operation for moving an electronic device to a POS) occurs, the processor may be set to output the display object.

When the electronic device is away from the detected object, the specified pattern image disappears for more than a specified time, or a specified second gesture event (for example, a gesture event corresponding to an operation for withdrawing an electronic device from a POS) occurs, the processor may be set to stop the display object output.

The processor may be set to output magnetic signals relating to a payment progress for at least part of an output period of the display object and stop the magnetic signal output when the display object output stops.

When a specified SMS instructing the payment completion is received or a specified message (for example, a message received through data network or cellular network) is received from a server, the processor may set to stop the display object output.

After the display object output, when the electronic device has a specified direction state, the processor may be set to stop the display object output.

The processor may output audio data corresponding to the display object.

The processor may control the emission of a lamp disposed at a camera in correspondence to a direction to be taken by the electronic device.

According to various embodiments of the present disclosure, an electronic device may include a memory configured to store an object for instructing an orientation of the electronic device and a processor functionally connected to the memory. The processor may be set to detect the direction of the electronic device by using the sensor when the execution of the payment application is requested and output the object for instructing the direction of the electronic device to be in a specified direction.

According to various embodiments of the present disclosure, an electronic device may include a memory configured to store payment related information of the electronic device and a processor functionally connected to the memory. The processor may be set to determine the integrity of the payment related information, determine the integrity of device components for processing the payment related information, and determine whether to output the payment related information as magnetic signals according to a determination result.

When the integrity is damaged, the processor may be set to output a message according to the damaged integrity and stop payment progress.

When the integrity is damaged, the processor may be set to output a message for requesting the update of the payment related information.

When the integrity is damaged, the processor may be set to transmit damaged integrity related information to a specified server automatically.

According to various embodiments of the present disclosure, an electronic device may include a memory configured to store payment related information of the electronic device and a processor functionally connected to the memory. The processor may be set to output a plurality of images relating to cards for payment, display one among the plurality of images to be relatively larger than the other images, and display the remaining images with the same size and not to overlap them with a relatively largely displayed image.

The processor may be set to display card images having a use frequency of more than a certain value not to overlap each other and display a card image having a relatively high use frequency to be larger.

The processor may be set to display card images having a use history of more than a certain value not to overlap each other and display a card image having a relatively recently used card history to be larger.

The processor may be set to display card images having a use frequency or a use history of more than a certain value not to overlap each other, display a specified card image with a fixed size, and display the remaining card images with a different size in the order of a relatively high use frequency or a recent use history.

As mentioned above, various embodiments may support payment processing more conveniently and easily regardless of characteristics of a payment request device by operating a multiple payment method.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a security memory configured to store predetermined fingerprint information;

a display; and a processor functionally connected with the security memory and the display, the processor configured to:

obtain user fingerprint information from a user of the electronic device, compare the user fingerprint information with the predetermined fingerprint information, and when the user fingerprint information is valid, control a multiple payment operation including a payment operation associated with a near field communication (NFC) method and a payment operation associated with a magnetic security transmit (MST) method, wherein the processor is further configured to differently display an object indicating the NFC method operation and an NFC signal transmission direction according to the NFC method operation and an object indicating the MST method operation and an MST signal transmission direction according to the MST method operation while the NFC method operation and the MST method operation are operating alternatively, wherein the NFC signal transmission direction according to the NFC method operation and the MST signal transmission direction according to the MST method operation each indicate a direction of transmission of the respective signals from the electronic device, and wherein the processor is further configured to:

activate a camera during the multiple payment operation, automatically display a barcode object when an image including an object relating to barcode recognition for a barcode method is captured, determine whether a distance between the object and the camera is more than a specified distance away, or whether the object disappears from the image, and when the object is more that the specified distance away or when the object disappears from the image, determine that payment completion of the multiple payment operation has occurred.

2. The electronic device of claim 1, wherein the processor is further configured to display an object for instructing a signal transmission start guide for payment processing.

3. The electronic device of claim 1, wherein the processor is further configured to:

determine whether an approach of a specified object is located within a specified distance through a sensor during the NFC method operation, and transmit an MST signal according to the MST method operation when the object is located within the specified distance.

4. The electronic device of claim 1, wherein the processor is further configured to display, on a screen interface, at least one of:

an object to initiate a handover function, the handover function upon execution is configured to maintain a display state of at least part of objects included in the screen interface and prohibit switching to another function or switching to the barcode method, an object including operation guide information relating to payment execution, or a signature object relating to signature entry.

5. The electronic device of claim 4, wherein the processor is further configured to control the screen interface including at least one of an object for switching to a multiple payment operation screen according to the barcode method switch object selection.

6. The electronic device of claim 5, wherein the processor is further configured to output fingerprint detection guide information to halt execution of the handover function during the handover function execution.

7. The electronic device of claim 1, wherein the processor is further configured to activate a camera and execute a handover function configured to maintain a display state of at least part of objects included in a screen interface and prohibit switching to another function unless a user face captured by a camera is recognized.

8. The electronic device of claim 1, wherein the signal is transmitted through an NFC antenna and an MST coil.

* * * * *